United States Patent
Bone

(10) Patent No.: US 9,864,168 B2
(45) Date of Patent: Jan. 9, 2018

(54) NEAR-INFRARED LENS FOR CAMERAS IN MOBILE DEVICES

(71) Applicant: GENIUS ELECTRONIC OPTICAL CO., LTD., Taichung (TW)

(72) Inventor: Matthew Bone, Fremont, CA (US)

(73) Assignee: GENIUS ELECTRONIC OPTICAL CO., LTD., Taichung (TW)

( * ) Notice: Subject to any disclaimer, the term of this patent is extended or adjusted under 35 U.S.C. 154(b) by 150 days.

(21) Appl. No.: 14/746,772

(22) Filed: Jun. 22, 2015

(65) Prior Publication Data

US 2015/0370039 A1   Dec. 24, 2015

Related U.S. Application Data

(60) Provisional application No. 62/015,867, filed on Jun. 23, 2014, provisional application No. 62/052,181, filed on Sep. 18, 2014, provisional application No. 62/061,516, filed on Oct. 8, 2014.

(51) Int. Cl.
  *G02B 9/34* (2006.01)
  *G02B 13/00* (2006.01)
  *G02B 13/14* (2006.01)

(52) U.S. Cl.
  CPC ............ *G02B 13/004* (2013.01); *G02B 9/34* (2013.01); *G02B 13/0035* (2013.01); *G02B 13/14* (2013.01)

(58) Field of Classification Search
  CPC .................................. G02B 13/004; G02B 9/34
  See application file for complete search history.

(56) References Cited

U.S. PATENT DOCUMENTS

| 2006/0285223 A1 | 12/2006 | Watanabe et al. |
| 2009/0067052 A1 | 3/2009 | Seesselberg |
| 2013/0279024 A1* | 10/2013 | Kubota ............... G02B 13/004 359/715 |

FOREIGN PATENT DOCUMENTS

| CN | 102422197 | 4/2012 |
| JP | 2006091718 | 4/2006 |

OTHER PUBLICATIONS

Chinese Application No. 201510393444.0, Office Action dated Jun. 5, 2017, 5 pages.

* cited by examiner

*Primary Examiner* — Joseph P Martinez
(74) *Attorney, Agent, or Firm* — Kilpatrick Townsend & Stockton LLP

(57) ABSTRACT

A first optical imaging system includes, in order from the object side to the image side, a first lens element, a second lens element, and a third lens element, arranged along an optical axis. A second optical imaging system includes, in order from the object side to the image side, a first lens element, a second lens element, a third lens element, and a fourth lens element, arranged along an optical axis. A third optical imaging system is a telecentric lens system having only lens elements having a refractive power and a chief ray angle smaller than 1 degree. The lens elements of the optical imaging systems may be made of the same material having absorption in visible wavelengths and high transmission in near infrared radiation. The lens elements may be coated with an antireflective coating that is optimized for near infrared radiation.

12 Claims, 30 Drawing Sheets

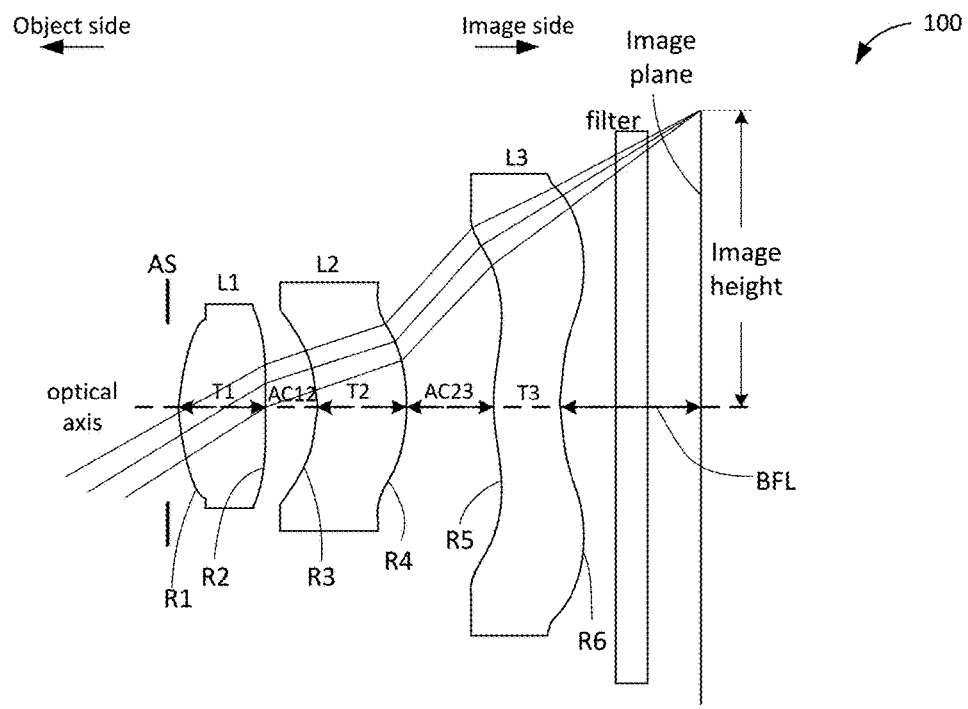
Figure 2A
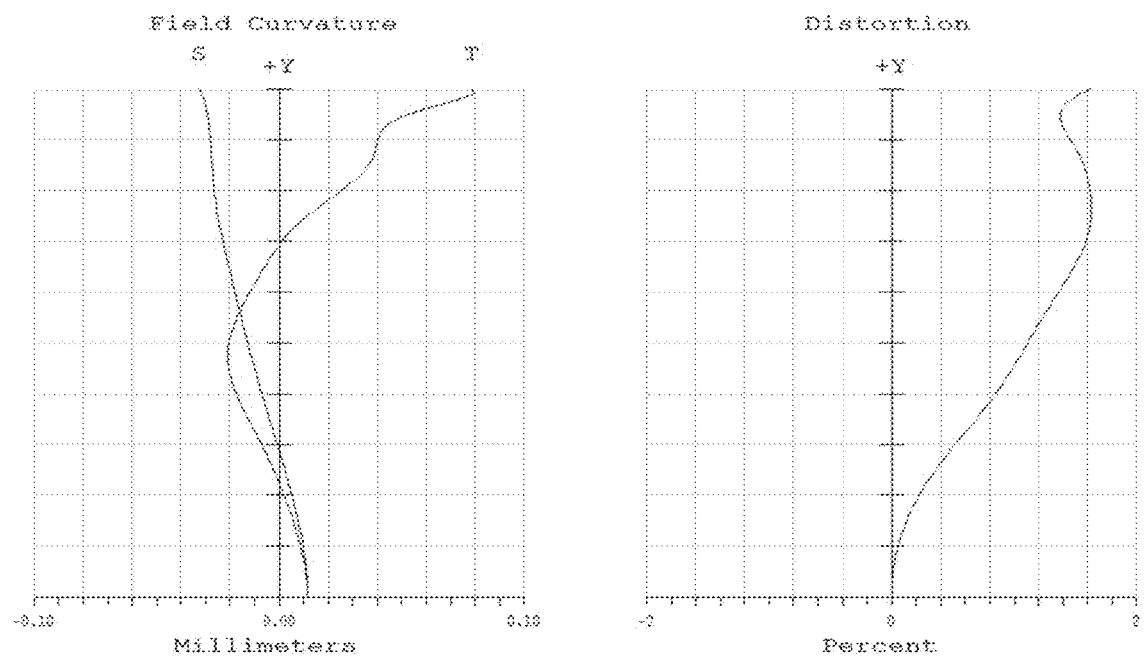
Figure 2B
Figure 2C

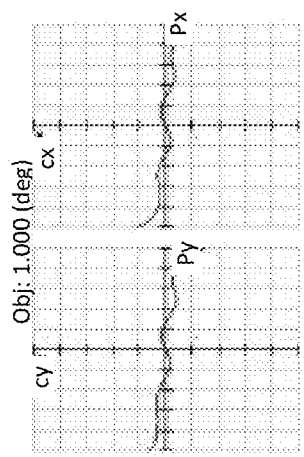
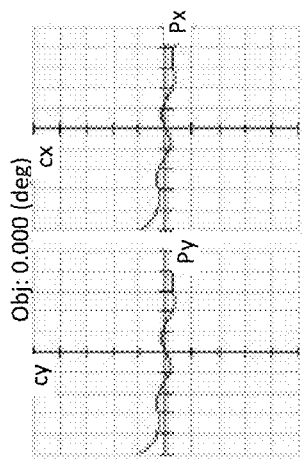
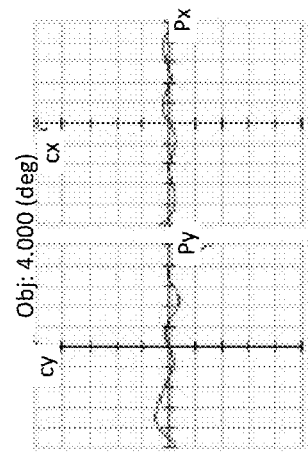
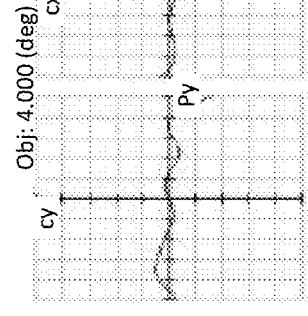
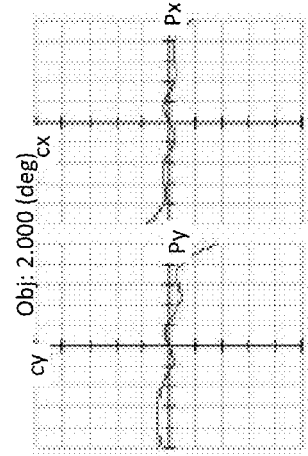
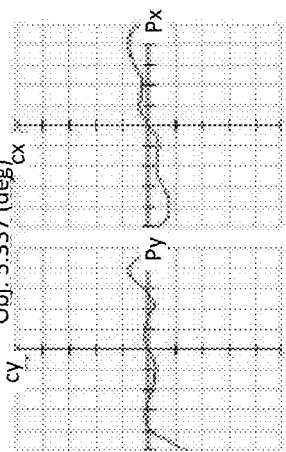
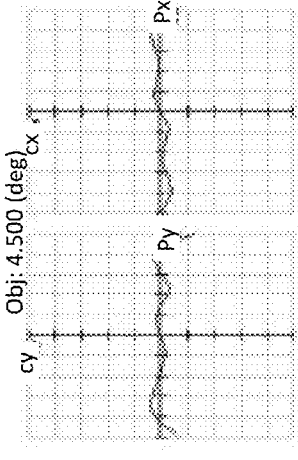

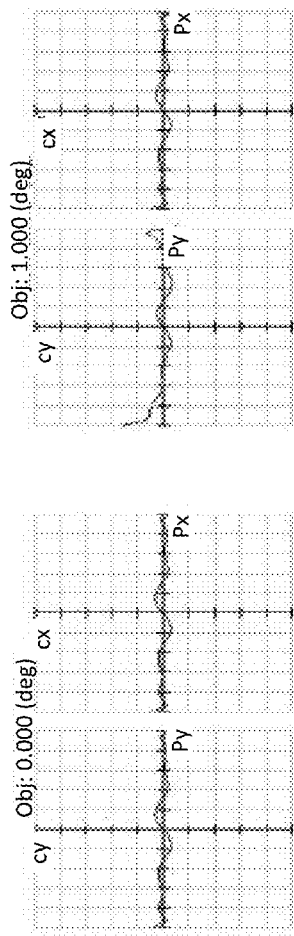
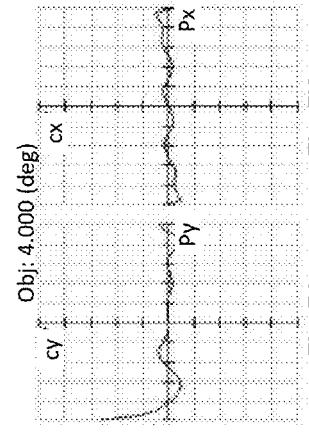
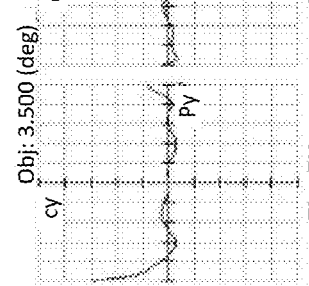
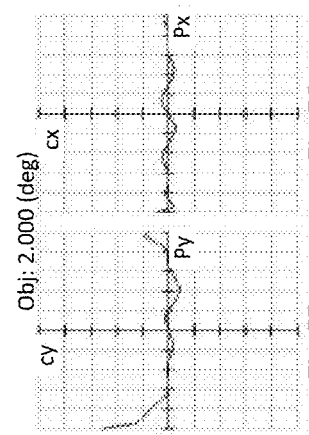
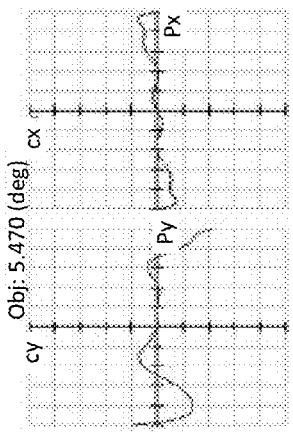
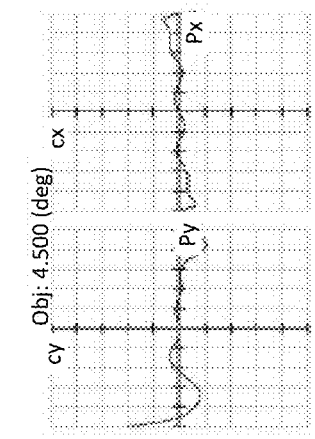

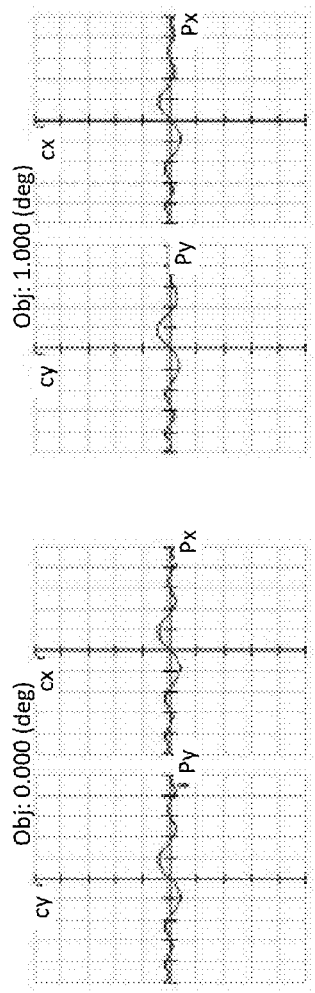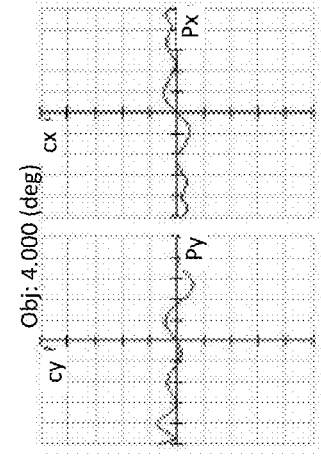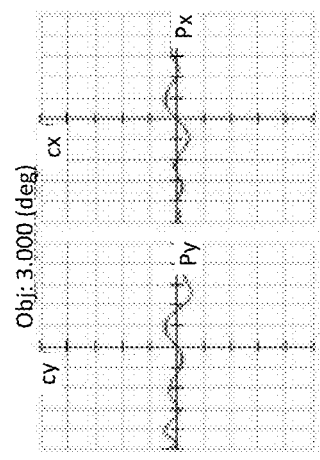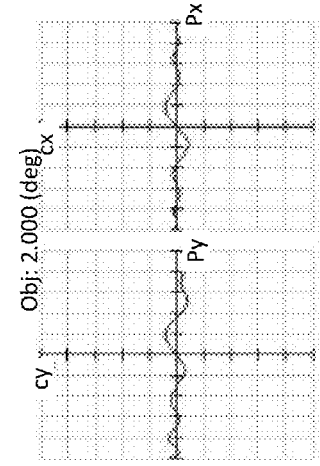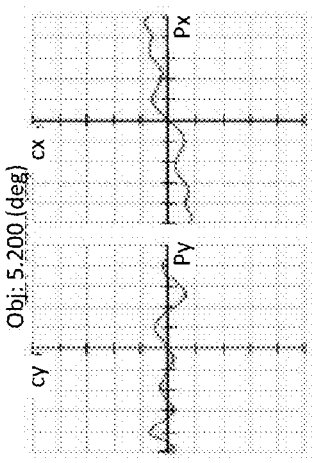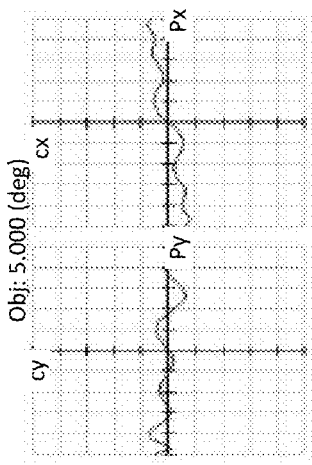

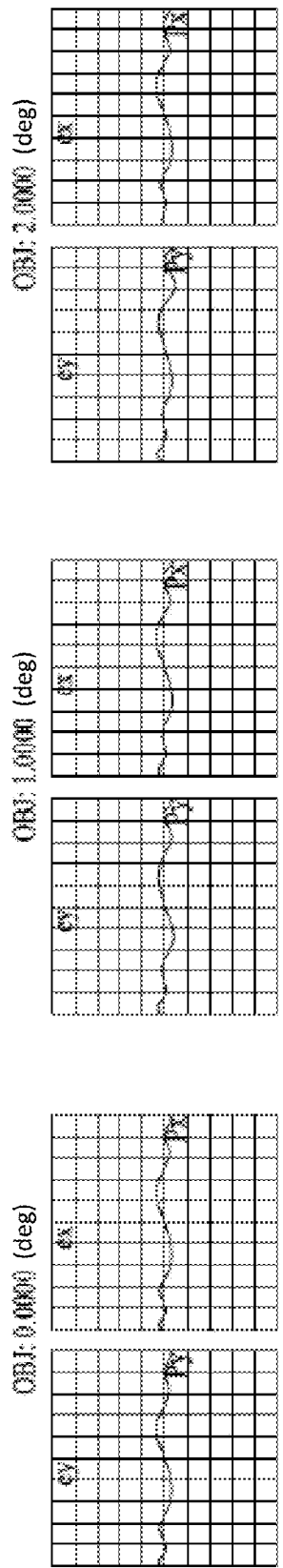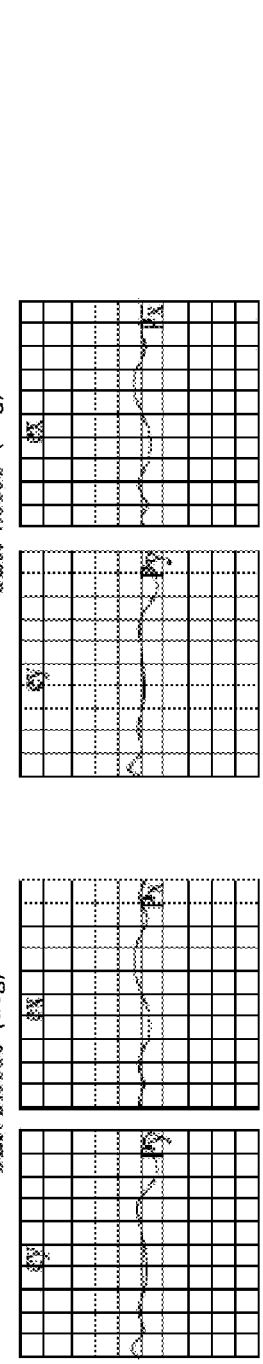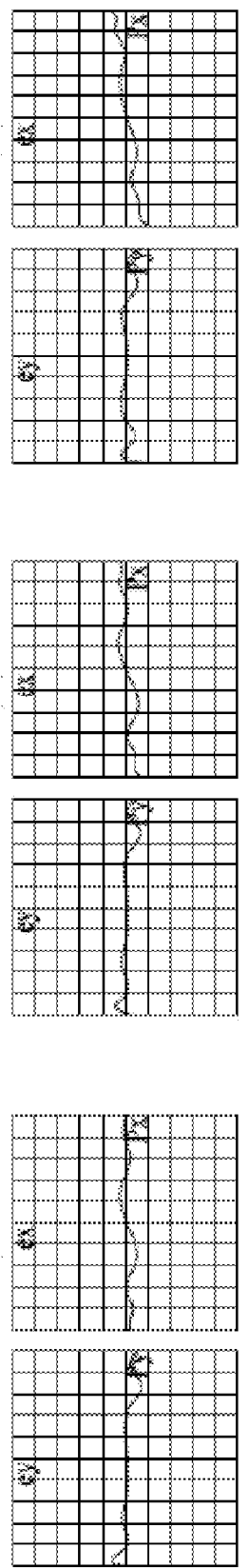

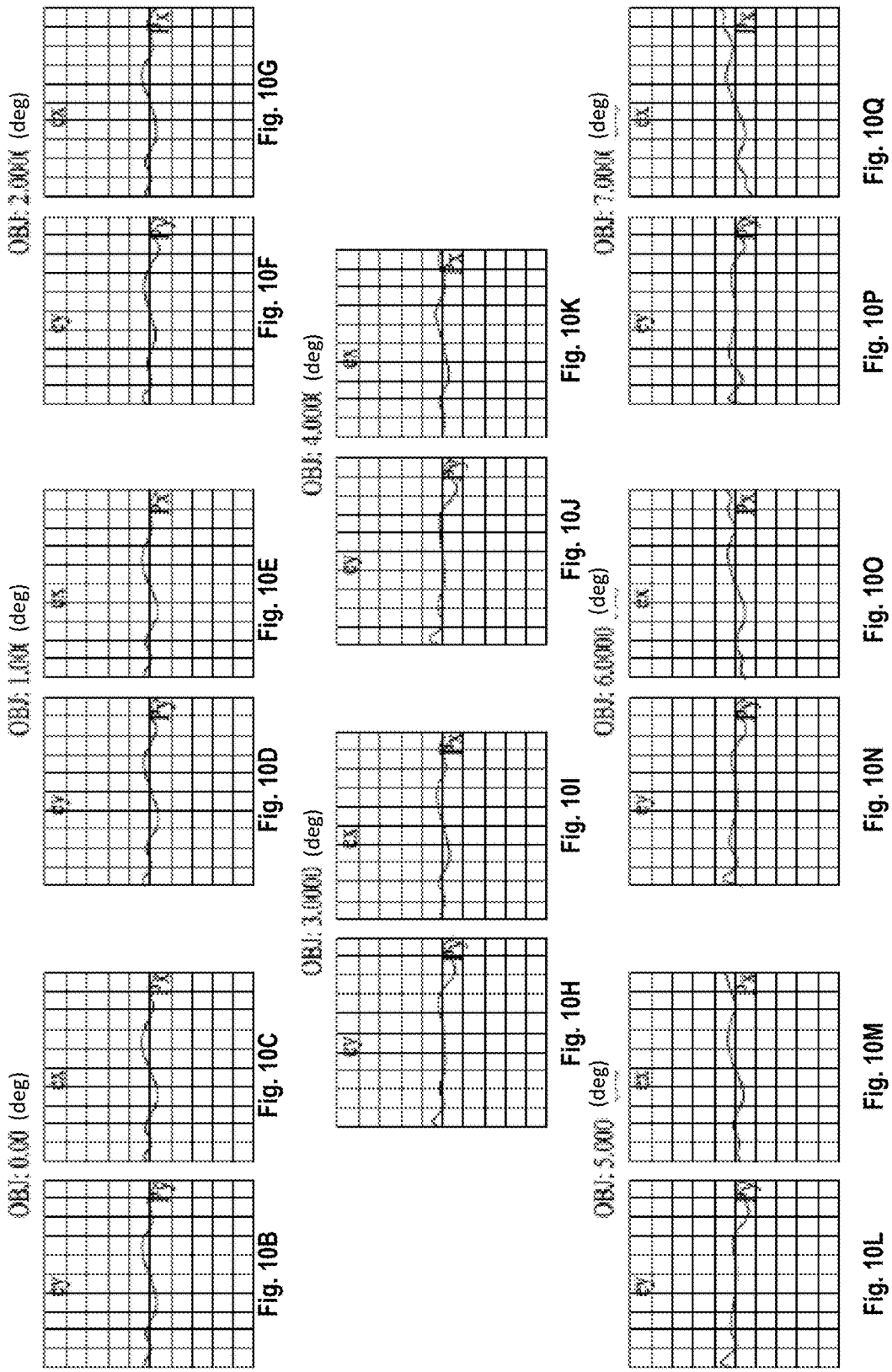

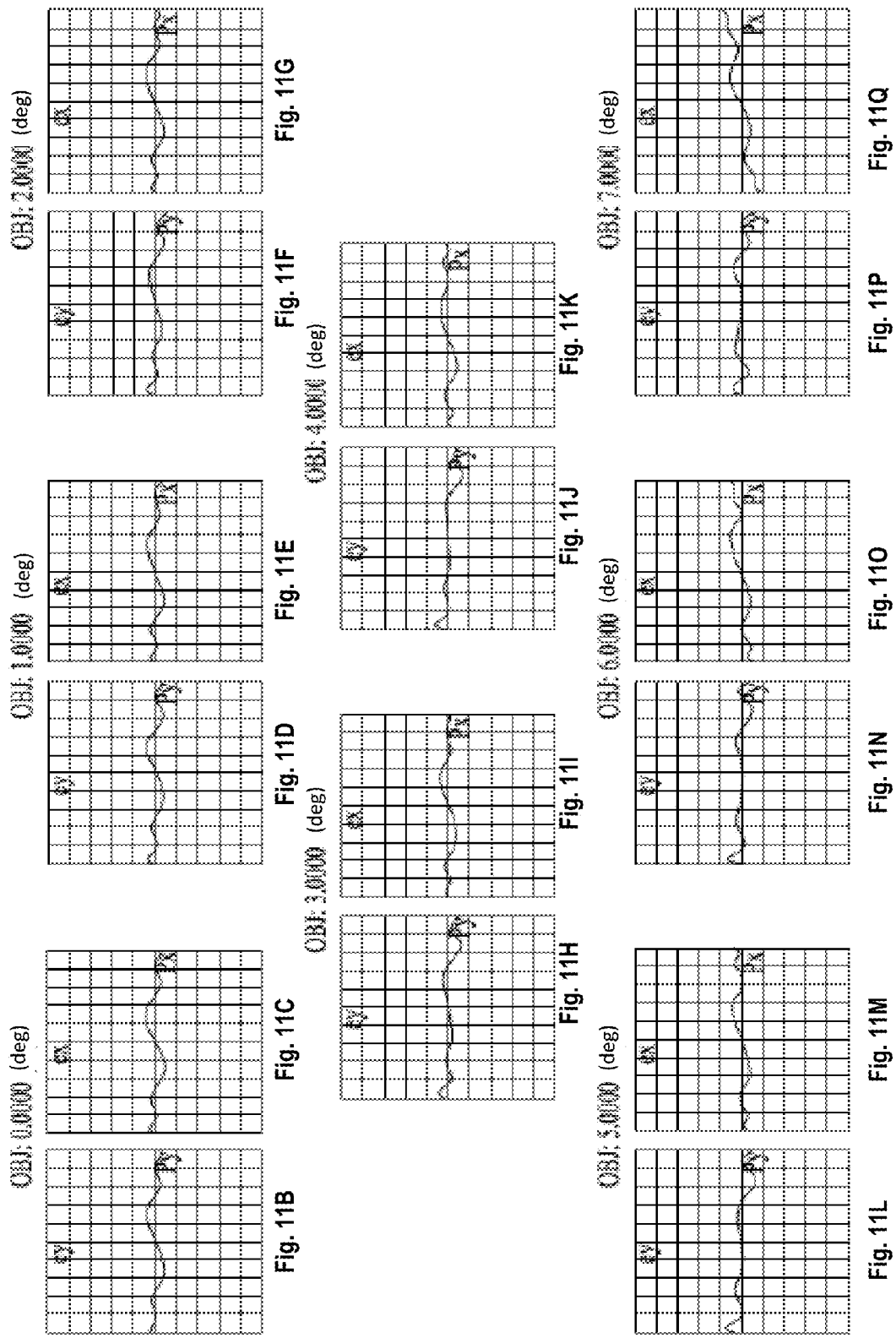

Y field in degrees

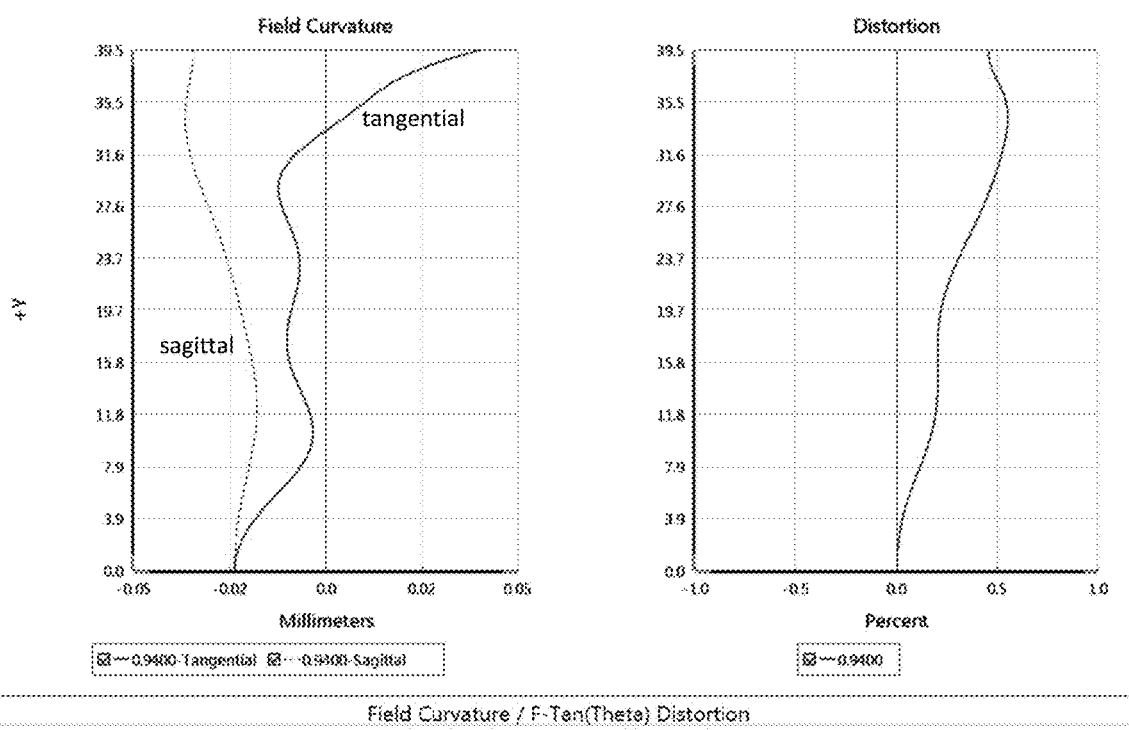
Figure 12B                    Figure 12C

NEAR-INFRARED LENS FOR CAMERAS IN MOBILE DEVICES

CROSS-REFERENCES TO RELATED APPLICATIONS

This application claims the benefit of U.S. Provisional Patent Application No. 62/015,867, filed Jun. 23, 2014, U.S. Provisional Patent Application No. 62/052,181, filed Sep. 18, 2014, and U.S. Provisional Patent Application No. 62/061,516, filed Oct. 8, 2014, the contents of which are hereby incorporated by reference in their entirety.

BACKGROUND OF THE INVENTION

The present disclosure relates to optical lens systems, and more particularly to near infrared optical imaging lens systems having three lens elements and four lens elements for cameras incorporated in mobile electronic devices.

Mobile electronic devices with built-in digital cameras are becoming increasingly popular. Along with trends of downsizing in digital cameras and cell phones and recent technological advances in charge coupled devices (CCD) and CMOS imaging sensors, optical lens systems also need to reduce their size. However, the size reduction of the optical imaging lens systems also has to take into account optical performance requirements.

Wavelengths longer than 700 nm are not directly perceived by human eyes. These wavelengths have the characteristics of anti jamming capability, low cost, low power consumption, and undetectability to a human eye. They are often used in remote control devices, infrared detection systems, and the like. In recent years, interactive electronic devices have been developed using infrared (IR) detectors or near infrared (NIR) detectors to detect a user movement for achieving user interactions.

The present invention relates to NIR imaging lens systems having three lens elements and four lens elements.

SUMMARY OF THE INVENTION

Certain embodiments of the present invention relate to an optical imaging system having three lens elements. In some embodiments, an optical imaging lens system includes, in order from an object side to an image side, an aperture stop, a first lens element, a second lens element, and a third lens element arranged along an optical axis. The first lens element has a positive refractive power, the second lens element has a negative refractive power, the third lens element has a convex object-side surface in a vicinity of the optical axis and a concave object-side surface near the outer circumference. In some embodiments, the first, second, and third lens elements are made of a same material; and the optical imaging system only has three lens elements having a refractive power.

In another embodiments, an optical imaging lens system includes, in order from an object side to an image side, a first lens element, a second lens element, a third lens element, and a fourth arranged along an optical axis. The first lens element has a positive refractive power, the second lens element has a negative refractive power, the third lens element has a negative refractive power, and the fourth lens element has a positive refractive power. The fourth lens element has a convex object-side surface in a vicinity of the optical axis and a concave object-side surface near the outer circumference. In some embodiments, the first, second, third, and fourth lens elements are made of a same material, and the optical imaging system only has four lens elements having a refractive power.

The following description, together with the accompanying drawings, will provide a better understanding of the nature and advantages of the claimed invention.

BRIEF DESCRIPTION OF THE DRAWINGS

FIG. 2A is a simplified cross-section view of a three-element optical lens system according to an embodiment of the present invention.

FIGS. 2B and 2C are graphs illustrating the respective astigmatic field curvatures and distortion in the embodiment of FIG. 2A.

FIGS. 6B-6O are a set of graphs illustrating transverse ray fan plots in the embodiment of FIG. 6A.

FIGS. 7B-7O are a set of graphs illustrating the transverse ray fan plot in the embodiment of FIG. 7A.

FIGS. 8B-8O are a set of graphs illustrating the transverse ray fan plot of the embodiment of FIG. 8A.

FIG. 9B-9Q are a set of graphs illustrating transverse ray fan plots in the embodiment of FIG. 9A.

FIGS. 10B-10Q are a set of graphs illustrating the transverse ray fan plot in the embodiment of FIG. 10A.

FIG. 11B-11Q are a set of graphs illustrating transverse ray fan plots in the embodiment of FIG. 11A.

FIG. 12B is a set of graphs illustrating the astigmatism for the sagittal and tangential image surface in the embodiment of FIG. 12A.

FIG. 12C is the optical distortion of the embodiment of FIG. 12A.

DETAILED DESCRIPTION OF SPECIFIC EMBODIMENTS

Certain embodiments of the present invention relate to three-element optical lens systems and other embodiments of the present invention relate to four-element optical lens systems. These three-element and four element optical systems have broad applications in electronic devices, such as a mobile phone, a digital still camera, a digital video camera, a tablet, and the like, that use a CCD or a CMOS imaging sensor. Lens data and other parameters of specific embodiments are described below. Those skilled in the art with access to the present disclosure will recognize that other lens systems can also be designed within the scope of the claimed invention.

Definition of Terms

The term "lens element" refers to a single transparent mass of refractive material having two opposite refractive surfaces. The expression "a lens element with a positive refractive power (or negative refractive power)" refers to the refractive power in the vicinity of the optical axis of the lens element having a positive refractive power (or negative refractive power). A lens element having a convex (or concave) surface in a region refers to that region having a convex portion (or concave portion) with respect to the adjacent outer region in the radial direction of that region, and the region has a protruding (convex) or depressed (concave) surface with respect to the optical axis.

Figure 1:
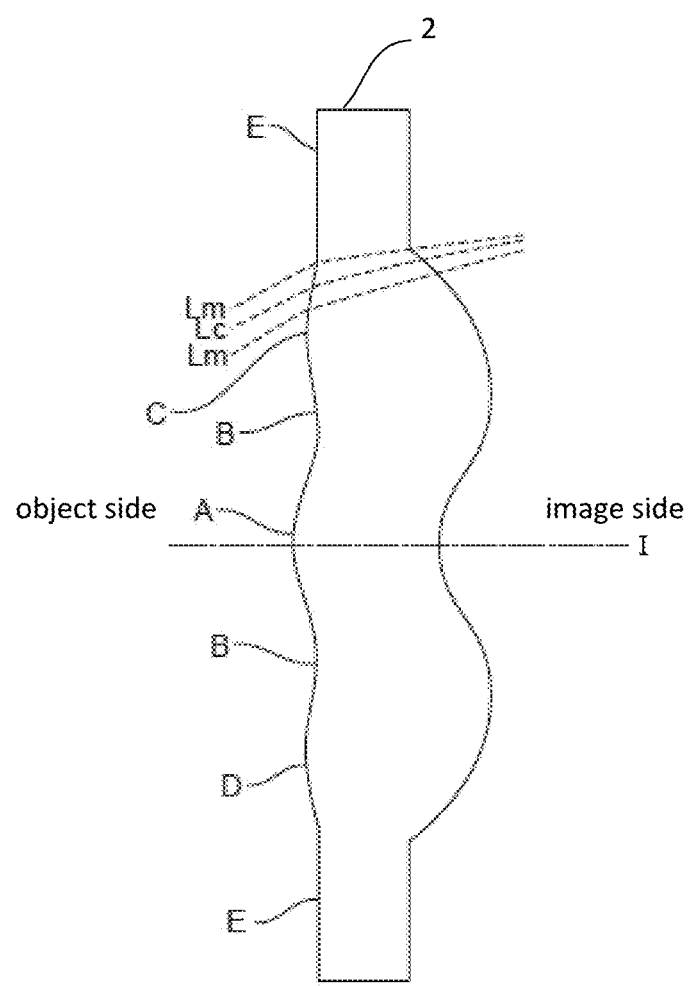
FIG. 1 is a cross section view of an exemplary lens element to explain the terms used in the present description.

FIG. 1 provides an example cross-sectional view of lens element to explain the terms used in the present description. As shown in FIG. 1, "1" denotes the optical axis of an exemplary lens element 2 having rotational symmetry along the optical axis. The object side of the lens element has a convex surface in region A, a concave surface in region B, and a convex surface in regions C and D. Region A has a convex surface because the surface of the region A is protruding with respect to the adjacent radial outer region (i.e., region B) and in the direction of the optical axis. Region B is depressed in relation to adjacent region A, C, or D. Region C or D is protruding with respect to adjacent region E. The expression "area around the circumference" refers to imaging light rays passing through the area in the vicinity of the circumferential edge of the lens element, i.e., the region C or D. The imaging light rays may include a chief ray Lc and marginal rays Lm. The expression "area in the vicinity of the optical axis" refers to imaging light passing through the region of the optical axis, i.e., the region A. The expression "area in a vicinity of an outer circumference of a lens element" means in the vicinity of the circumferential region on the surface of the lens element only where the imaging light passes, such as the region C or D. In addition, the lens element may include an extension portion or flange E configured to mount the lens element to a lens barrel. The desired imaging light rays may not pass through the extended portion E. Although the extension portion E of the lens element may be part of the optical imaging system, a description and a sketch thereof will be omitted for the sake of brevity.

The "effective diameter" (also sometimes referred to as "clear aperture diameter" or "clear aperture") of a lens element refers to the diameter of the portion of the surface of the lens element that is shaped to contribute to optical performance. For example, some or all lens elements may be formed with a flange or other structure at the outer periphery for mechanical purposes (e.g., positioning and retention of the lens element), and it is to be understood that such a structure would be outside the effective diameter. Further, in some instances, the object-side and image-side surfaces of a single lens element may have different effective diameters. In some instances, portions of the surface of a lens element may be specified as convex or concave. Such portions can be symmetric about the optical axis, with a portion that is "near," or "in the vicinity of," the optical axis extending outward from the optical axis and a portion "near," or "in the vicinity of," the periphery extending inward from the effective diameter. Those of skill in the art will understand that a portion of the surface described as being near the optical axis (or near the peripheral edge) may extend outward (or inward) sufficiently far to provide the desired optical properties.

The telephoto ratio is defined as the ratio between the total length TTL measured from the object-side surface of the first lens element to the image plane along the optical axis and the effective focal length. An optical imaging lens having a telephoto ratio (TTL/EFL) of less than 1 is referred to as a telephoto lens.

Three Element Lens System

First Embodiment

FIG. 2A is a simplified cross-section view of a three-element optical lens system 100 according to a first embodiment of the present invention. Optical lens system 100 comprises a first lens element L1, a second lens element L2, and a third lens element L3, in order from the object side to the image side along the optical axis. Each lens element L1-L3 can be rotationally symmetric above the optical axis.

First lens element L1 has a positive refractive power, a convex object-side surface, a convex image-side surface in the outer circumferential region, and a convex image-side surface in the vicinity of the optical axis. Second lens element L2 has a negative refractive power, a concave object-side surface in the vicinity of the optical axis, a concave object-side surface in the outer circumferential region, a convex image-side surface in the vicinity of the optical axis, and a convex image-side surface in the outer circumferential region. Third lens element L3 has a positive refractive power, a convex object-side surface in the vicinity of the optical axis and a concave object-side surface in the outer circumferential region, a concave surface on the image side along the optical axis, and a convex surface in the outer circumferential region. Optical lens system 100 further includes an aperture stop AS disposed in front of the first lens element L1, where the optical axis intersects the center of the aperture stop.

Optical lens system 100 also includes a filter configured to block the passage of light at visible wavelengths. In some embodiments, the filter filters out wavelengths below about 700 nm. The optical filter blocks shorter wavelengths of the visible spectrum and passes through wavelengths above about 700 nm. The filter improves the infrared performance of the imaging lens system 100 by reducing interference from other light sources. Although the filter is shown as a single filter disposed between the third lens element and the image plane, the filter can be disposed in any other locations and can have one or more filter elements.

Referring to FIG. 2A, R1 and R2 are the respective object side and image side surface of first lens element L1. Likewise, R3 and R4 are the respective object side and image side surface of second lens element L2. Similarly, R5 and R6 are the respective object-side and image-side surface of third lens element L3.

In one embodiment, lens elements L1, L2, and L3 each are made of the same material, which passes near infrared light having a wavelength about 900 nm. In another embodiment, the material of the lens elements L1, L2, and L3 has a high absorption for visible light and a high transmission for near infrared light longer than 900 nm, preferably at 940 nm.

Still referring to FIG. 2A, T1 is the thickness of first lens element L1, T2 is the thickness of the second lens element L2, and T3 is the thickness of the third lens element L3. Thicknesses T1-T3 are each measured along the optical axis. AC12 is the air gap between the first and second lens elements, and AC23 is the air gap between the second and third lens elements. Air gaps AC12 and AC23 are each measured along the optical axis. BFL denotes the back focal length, which is the distance between the image side of the third lens element and the image plane along the optical axis. BFL includes the thickness of the optical filter if the filter is disposed between the third lens element and the image plane. In the present disclosure, EFL denotes the effective focal length, which is also known as focal length. The focal length of an optical imaging system is defined as the distance over which collimated rays are brought to a focus. Hereinafter, the focal length is called effective focal length to distinguish from the back focal length (BFL).

In the following sections, ALT denotes the total thickness of the first to third lens elements, i.e., ALT=T1+T2+T3. AAG denotes the total width of the air gaps of the first to third lens elements along the optical axis, i.e., AAG=AC12+AC23.

According to certain embodiments of the present invention, in order to reduce the total length of the optical lens system, the following measures can be taken: reducing the thickness of the lens elements and the air gaps between them. However, it is difficult to reduce the total thickness of the lens elements while maintaining adequate optical performance. Accordingly, the first lens element is designed to have a positive refractive power, the second lens element is designed to have a negative refractive power, and the third lens element is designed to have a positive refractive power. In order to increase the production yield and reduce manufacturing costs all three lens elements can be made of the same material. In one embodiment, the optical lens material has an absorption spectrum of visible light with a wavelength in the range between 400 nm and 700 nm, while having high transmission for wavelengths above 850 nm.

According to the first embodiment, all three lens elements L1, L2, and L3 can be made of the plastic material F52R and coated with an antireflective material optimized for near-infrared radiation. First lens element L1 has a positive refractive power, a convex surface on the object-side in the vicinity of the optical axis, and a convex surface on the image-side in the vicinity of the optical axis. Second lens element has a negative refractive power, and the third lens element has a convex surface on the object in the vicinity of the optical axis, and a concave surface near the outer circumference. The object-side and image-side surfaces of the three lens elements are even aspheric. The combination of these three lens elements provides the desired lens system quality. Making the three lens elements of the same plastic can lower the manufacturing costs and simplify the manufacturing process.

Table 1A shows numeric lens data of the lens elements of optical lens system 100 according to the first embodiment of the present invention. All three lens elements are made of the plastic material F52R.

TABLE 1A

| | Curvature Radius (1/mm) | Radius (mm) | Thickness/air gap (mm) | Refractive index | Abbe # | material |
|---|---|---|---|---|---|---|
| Object | Infinity | | 14400 | | | |
| Aperture stop | Infinity | | −0.12727 | | | |
| Lens 1 | 0.868705 | 1.151139 | 0.51 | 1.535 | 55.63452 | F52R |
| | −0.00598 | −167.34 | 0.296489 | | | |
| Lens 2 | −0.90057 | −1.11041 | 0.532417 | 1.535 | 55.63452 | F52R |
| | −0.82053 | −1.21872 | 0.510314 | | | |
| Lens 3 | 0.812678 | 1.230499 | 0.361281 | 1.535 | 55.63452 | F52R |
| | 1.308748 | 0.764089 | 0.36 | | | |
| filter | Infinity | | 0.210 | 1.52 | 64.2 | |
| | Infinity | | 0.385 | | | |
| Image plane | Infinity | | | | | |

In the first embodiment, the effective focal length (EFL) is 2.5616 mm, the half field of view (HFOV) is 36.1 degrees. The F number is 2.22. The image height is 1.87 mm. The BFL is 0.955 mm. The entire length of the optical system 100 measured from the object-side surface of the first lens element to the image plane is 3.166 mm. The angular magnification is 1.303. The diameter of the aperture stop is 1.14 mm. The diameter of the filter is 3.374 mm.

The aspheric surface of the lens elements can be expressed using the following expression:

$$Z(Y) = \frac{Y^2}{R} \bigg/ \left(1 + \sqrt{1 - (1+K)\frac{Y^2}{R^2}}\right) + \sum_{i=1}^{n} a_i \times Y^i$$

where Y is the perpendicular distance between the point of the aspherical surface and the optical axis, Z(Y) is the depth of the aspheric surface of the lens element (the height of a point on the aspheric surface at a distance Y from the optical axis relative to the tangential plane at the aspheric surface vertex), R is the radius of curvature in millimeters (mm) from the optical axis to the lens surface, K is a conic constant, and a(i) is an aspheric surface coefficient of i-th level (or order term).

Table 1B shows numeric lens data of the conic constant K and aspheric surface coefficients as for each of the lens surfaces of optical lens system 100 according to the first embodiment of the present invention. All three lens elements are made of the plastic material F52R.

TABLE 1B

| Surface # | Semi-diameter | K | 2nd order term | 4th order term | 6th order term | 8th order term |
|---|---|---|---|---|---|---|
| R1 | 0.580299398 | 0 | 0 | −0.067839721 | 0.044054737 | −0.762442363 |
| R2 | 0.642096093 | 0 | 0 | −0.180210174 | −0.755286781 | 1.110817088 |
| R3 | 0.635116852 | 0 | 0 | −0.170304259 | −1.774214489 | 10.65840905 |
| R4 | 0.785121131 | 1.097413 | 0 | −0.123411613 | 1.169170197 | −2.025499469 |
| R5 | 1.268930266 | −0.65339 | 0 | −1.112804329 | 1.164130931 | −0.789364157 |
| R6 | 1.489447156 | −3.58075 | 0 | −0.534342342 | 0.635678424 | −0.53439723 |

| Surface # | 10th order term | 12th order term | 14th order term | 16th order term |
|---|---|---|---|---|
| R1 | 1.398532503 | −9.682710644 | 35.71081656 | −55.82129617 |
| R2 | −1.677479594 | −1.557681967 | 0 | |
| R3 | −23.70906044 | 26.70690794 | −16.200458 | |
| R4 | 5.905125575 | −6.30895851 | 3.199135509 | |
| R5 | 0.259769069 | 0.006464826 | −0.016099134 | |
| R6 | 0.275980253 | −0.080064437 | 0.009235139 | 0.000289327 |

FIGS. 2B and 2C are graphs illustrating the respective astigmatic field curvatures and distortion for a wavelength of 940 nm in optical lens system 100 of FIG. 2A. The sagittal (denoted "S") and tangential (denoted "T") astigmatic curvatures are less than ±0.10 mm and the distortion is less than +2.0 percent.

Second Embodiment

Table 2A shows numeric lens data of the lens elements of optical lens system 100 according to a second embodiment of the present invention. All three lens elements are made of the polycarbonate plastic material SP3810.

TABLE 2A

|  | CurvatureRadius (1/mm) | Radius (mm) | Thickness/air gap (mm) | Refractive index | Abbe # | material |
|---|---|---|---|---|---|---|
| Object |  | Infinity | 14400 |  |  |  |
| Aperture stop |  | Infinity | −0.1275 |  |  |  |
| Lens 1 | 8.40E−01 | 1.190429 | 0.51 | 1.639753 | 23.35202 | SP3810 |
|  | 8.69E−02 | 11.50411 | 0.25357 |  |  |  |
| Lens 2 | −7.97E−01 | −1.25471 | 0.524634 | 1.639753 | 23.35202 | SP3810 |
|  | −6.66E−01 | −1.50217 | 0.572298 |  |  |  |
| Lens 3 | 7.85E−01 | 1.274121 | 0.35 | 1.639753 | 23.35202 | SP3810 |
|  | 1.16E+00 | 0.859237 | 0.36 |  |  |  |
| filter |  | Infinity | 0.21 | 1.52 | 64.2 |  |
|  |  | Infinity | 0.3 |  |  |  |
| Image plane |  | Infinity | 0 |  |  |  |

In the second embodiment, the effective focal length (EFL) is 2.5631 mm, the half field of view (HFOV) is 36.1 degrees. The F number is 2.19. The image height is 1.87 mm. The BFL is 0.87 mm. The entire length of the optical system 100 measured from the object-side surface of the first lens element to the image plane is 3.081 mm. The angular magnification is 1.317. The diameter of the aperture stop is 1.16 mm. The diameter of the filter is 3.375 mm.

Table 2B shows numeric lens data of the conic constant K and aspheric surface coefficients as for each of the lens surfaces of optical lens system 100 according to the second embodiment of the present invention. All three elements are made of the polycarbonate plastic material SP3810.

TABLE 2B

| Surface # | Semi-diameter | K | 2nd order term | 4th order term | 6th order term | 8th order term |
|---|---|---|---|---|---|---|
| R1 | 0.590114194 | 0 | 0.00E+00 | −5.40E−02 | 2.94E−02 | −6.62E−01 |
| R2 | 0.645377793 | 0 | 0.00E+00 | −2.05E−01 | −8.69E−01 | 1.55E+00 |
| R3 | 0.626322157 | 0 | 0.00E+00 | −2.57E−01 | −1.43E+00 | 1.01E+01 |
| R4 | 0.760416577 | 2.402905 | 0.00E+00 | −1.52E−01 | 1.41E+00 | −2.79E+00 |
| R5 | 1.268108848 | −0.62102 | 0.00E+00 | −9.82E−01 | 9.59E−01 | −6.71E−01 |
| R6 | 1.464402246 | −4.03413 | 0.00E+00 | −5.11E−01 | 5.91E−01 | −5.08E−01 |

| Surface # | 10th order term | 12th order term | 14th order term | 16th order term |
|---|---|---|---|---|
| R1 | 1.39E+00 | −1.01E+01 | 3.76E+01 | −5.78E+01 |
| R2 | −3.56E+00 | 1.05E+00 |  |  |
| R3 | −2.97E+01 | 4.70E+01 | −3.53E+01 |  |
| R4 | 6.42E+00 | −5.40E+00 | 2.34E+00 |  |
| R5 | 2.46E−01 | −6.59E−03 | −1.21E−02 |  |
| R6 | 2.71E−01 | −8.23E−02 | 1.05E−02 | 1.79E−04 |

In one embodiment, the three lens elements L1, L2, and L3 are made of the same plastic material that is capable of absorbing visible light. In other words, light with a wavelength below 900 nm will not be able to pass through the lens elements. In one embodiment, the three lens elements have the same refractive index of about 1.53 and an Abbe number of about 55.6. In another embodiment, the three lens elements have the same refractive index of about 1.63 and an Abbe number of about 23.35.

Four-Element Lens System

Third Embodiment

Figure 3A:
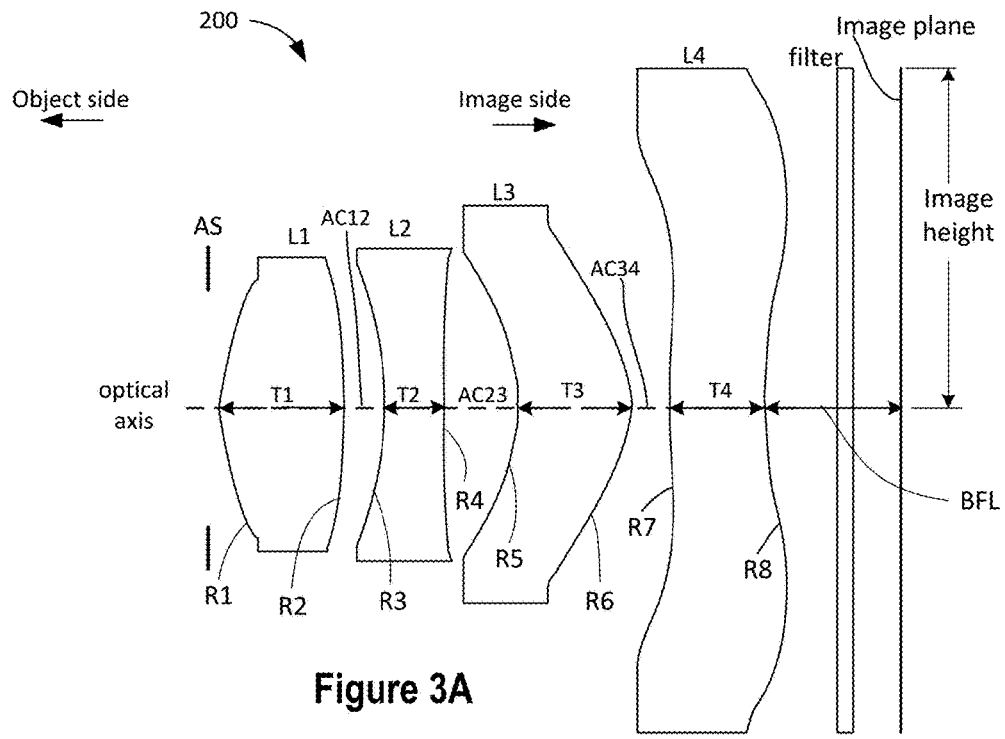
FIG. 3A is a simplified cross-section view of a four-element optical lens system according to an embodiment of the present invention.

FIG. 3A is a simplified cross sectional view of a four-element optical lens system 200 according to an embodiment of the present invention. Optical lens system 200 includes an aperture stop AS, a first lens element L1, a second lens element L2, a third lens element L3, and a fourth lens element L4, in order from the object side to the image side along the optical axis. Each lens element L1-L4 can be rotationally symmetric above the optical axis.

First lens element L1 has a positive refractive power, a convex object-side surface, a convex image-side surface in the outer circumferential region, and a concave image-side surface in the vicinity of the optical axis. Second lens element L2 has a negative refractive power, a concave object-side surface in the vicinity of the optical axis, a concave object-side surface in the outer circumferential region, a concave image-side surface in the outer circumferential region, and a concave image side surface in the vicinity of the optical axis. Third lens element L3 has a positive refractive power, a concave object-side along the optical axis, a concave object-side surface in the outer circumferential region, a convex image-side surface in the outer circumferential region, and a convex surface on the image side along the optical axis. Fourth lens element L4 has a negative refractive power, a convex object-side surface in the vicinity of the optical axis, a convex object-side surface in the outer circumferential region, and a concave image side surface in the vicinity of the optical axis and a convex image-side surface in the outer circumferential region.

Optical lens system 200 also includes a filter configured to block the passage of light at visible wavelengths. In some embodiments, the filter filters out wavelengths below about 700 nm. The optical filter blocks shorter wavelengths of the visible spectrum and passes through wavelengths above about 700 nm. The filter improves the infrared performance of the imaging lens system 200 by reducing interference from other light sources. Although the filter is shown as a single filter disposed between the third lens element and the image plane, the filter can be disposed in any other locations and can have one or more filter elements.

As shown in FIG. 3A, R1 and R2 are the respective object side and image side surface of first lens element L1. R3 and R4 are the respective object side and image side surface of second lens element L2. Similarly, R5 and R6 are the respective object-side and image-side surface of third lens element L3. Likewise, R7 and R8 are the respective object-side and image-side surface of fourth lens element L4.

In one embodiment, lens elements L1, L2, L3, and L4 each are made of the same material, which passes near infrared light having a wavelength about 900 nm. In another embodiment, the material of the lens elements L1, L2, L3, and L4 has a high absorption for visible light and a high transmission for near infrared light longer than 900 nm, preferably at 940 nm.

Referring to FIG. 3A, T1 is the thickness of first lens element L1, T2 is the thickness of the second lens element L2, T3 is the thickness of the third lens element L3, and T4 is the thickness of the fourth lens element L4. Thicknesses T1-T4 are each measured along the optical axis. AC12 is the air gap between the first and second lens elements, AC23 is the air gap between the second and third lens elements, and AC34 is the air gap between the third and fourth lens elements. Air gaps AC12, AC23, and AC34 are each measured along the optical axis. BFL denotes the back focal length, which is the distance between the image side of the fourth lens element and the image plane along the optical axis. BFL includes the thickness of the optical filter if the filter is disposed between the fourth lens element and the image plane. EFL denotes the effective focal length, which is also known as focal length.

In the following sections, ALT denotes the total thickness of the first to fourth lens elements, i.e., ALT=T1+T2+T3+T4. AAG denotes the total width of the air gaps of the first to fourth lens elements along the optical axis, i.e., AAG=AC12+AC23+AC34.

According to certain embodiments of the present invention, in order to reduce the total length of the optical lens system, the following measures can be taken: reducing the thickness of the lens elements and the air gaps between them. However, it is difficult to reduce the total thickness of the lens elements while maintaining adequate optical performance. Accordingly, the first lens element is designed to have a positive refractive power, the second lens element is designed to have a negative refractive power, the third lens element is designed to have a negative refractive power, and the fourth lens element is designed to have a positive refractive power. In order to increase the production yield and reduce manufacturing costs all fourth lens elements can be made of the same material. In one embodiment, the optical lens material has an absorption spectrum of visible light in the range from 400 nm to 700 nm, while having high transmission for wavelengths above 850 nm.

In one embodiment, all fourth lens elements L1, L2, L3, and L4 can be made of the same plastic material and coated with an antireflective material optimized for near-infrared radiation. In a preferred embodiment, the antireflective material has a transmission peak at about 940 nm.

Table 3A shows numeric lens data of the lens elements of optical lens system 200 according to an embodiment of the present invention. All four lens elements are made of the same plastic material to simplify the manufacturing process and reduce the manufacturing costs.

TABLE 3A

|  | Curvature Radius (1/mm) | Radius (mm) | Thickness/air gap (mm) | Refractive index | Abbe # | material |
|---|---|---|---|---|---|---|
| Object |  | Infinity | 10000 |  |  |  |
| Aperture stop |  | Infinity | −0.12476 |  |  |  |
| Lens 1 | 9.12E−01 | 1.096272 | 0.489626 | 1.5441 | 55.8 | plastic |
|  | 1.06E−01 | 9.392786 | 0.114955 |  |  |  |
| Lens 2 | −1.85E−01 | −5.3966 | 0.24 | 1.5441 | 55.8 | plastic |
|  | 3.23E−02 | 30.94121 | 0.304479 |  |  |  |
| Lens 3 | −8.37E−01 | −1.19525 | 0.455357 | 1.5441 | 55.8 | plastic |
|  | −1.62E+00 | −0.6169 | 0.136123 |  |  |  |
| Lens 4 | 3.47E−01 | 2.878439 | 0.309657 | 1.5441 | 55.8 | plastic |
|  | 1.40E+00 | 0.713182 | 0.514822 |  |  |  |
| filter |  | Infinity | 0.21 | 1.52 | 64.2 |  |
|  |  | Infinity | 0.3 |  |  |  |
| Image plane |  | Infinity | 0 |  |  |  |

In this embodiment, the effective focal length (EFL) is 2.4818 mm, the half field of view (HFOV) is 37.08 degrees. The F number is 2.199. The image height is 1.876 mm. The BFL is 1.025 mm. The total length from the object-side surface of the first lens element to the image plane is 3.075 mm. The angular magnification is 1.151. The diameter of the aperture stop is 1.12 mm. The diameter of the filter is 3.361 mm.

Table 3B shows numeric values of the conic constant K and aspheric surface coefficients for each of the aspheric lens surfaces of the four lens elements.

TABLE 3B

| Surface # | Semi-diameter | K | 2nd order term | 4th order term | 6th order term | 8th order term |
|---|---|---|---|---|---|---|
| R1 | 0.583316716 | 0 |  | −7.49E−02 | 4.45E−01 | −2.53E+00 |
| R2 | 0.631494381 | 0 |  | −2.57E−01 | −5.99E−01 | −3.33E+00 |
| R3 | 0.626133161 | 0 |  | −2.48E−01 | −1.72E+00 | 2.75E+00 |
| R4 | 0.661635554 | 0 |  | 3.88E−02 | 4.13E−01 | −4.23E+00 |
| R5 | 0.686552237 | 0 |  | 1.59E−01 | −5.61E−01 | 2.47E−01 |

TABLE 3B-continued

| | | | | | |
|---|---|---|---|---|---|
| R6 | 0.848811908 | −0.77041 | 8.59E−01 | −2.08E+00 | 4.19E+00 |
| R7 | 1.205435147 | 3.352184 | −4.83E−01 | 1.39E−01 | 3.60E−01 |
| R8 | 1.432267496 | −5.69912 | −3.51E−01 | 3.56E−01 | −2.96E−01 |

| Surface # | 10th order term | 12th order term | 14th order term | 16th order term |
|---|---|---|---|---|
| R1 | 4.22E+00 | 2.12E−01 | −1.32E+01 | |
| R2 | 1.32E+01 | −2.25E+01 | 1.56E+01 | |
| R3 | −8.25E−01 | 3.75E+00 | | |
| R4 | 1.92E+01 | −3.45E+01 | 2.64E+01 | |
| R5 | 1.68E+00 | −9.22E−01 | −2.76E+00 | |
| R6 | −5.20E+00 | 5.27E+00 | −2.48E+00 | |
| R7 | −5.23E−01 | 2.85E−01 | −5.68E−02 | |
| R8 | 1.55E−01 | −4.56E−02 | 4.41E−03 | 4.71E−04 |

Figure 3B:
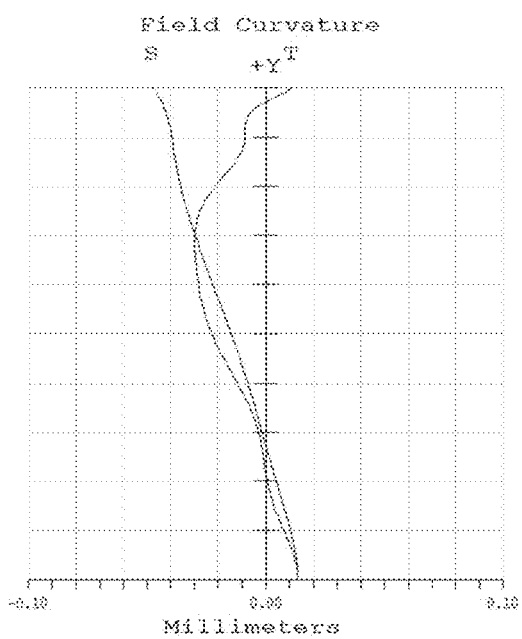
FIGS. 3B and 3C are graphs illustrating the respective astigmatic field curvatures and distortion in the embodiment of FIG. 3A.
Figure 3C:
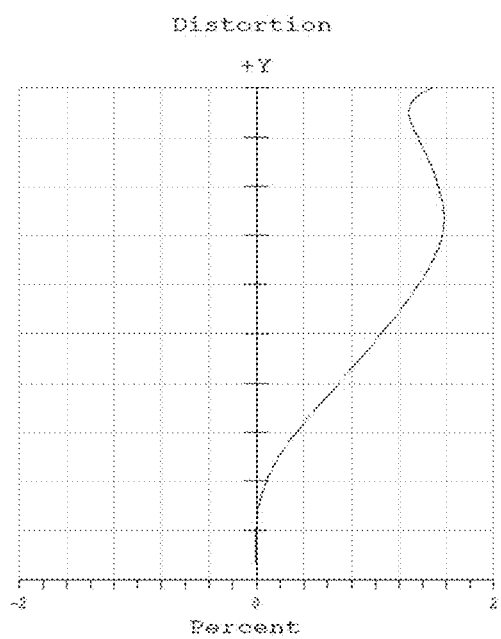

FIGS. 3B and 3C are graphs illustrating the respective astigmatic field curvatures and distortion for a wavelength of 940 nm in optical lens system 200 of FIG. 3A. The sagittal (denoted "S") and tangential (denoted "T") astigmatic curvature are less than ±0.06 mm and the distortion is less than ±2.0 percent.

Four Lens Element Telecentric Lens System 300

Fourth Embodiment

Figure 4:
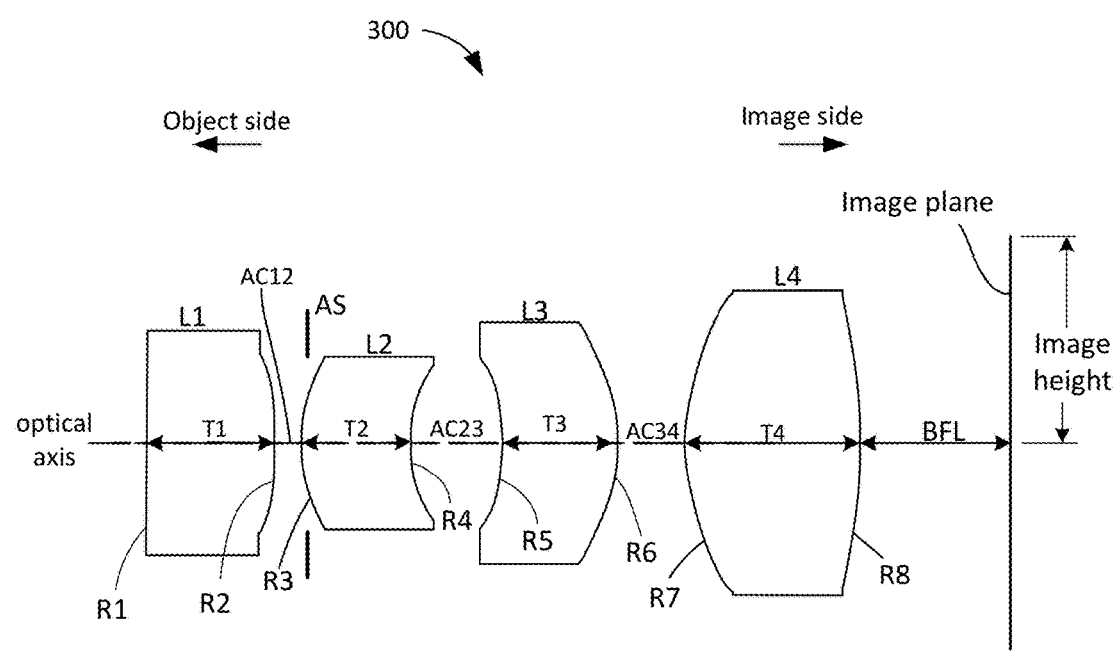
FIG. 4 is a simplified cross-section view of a four-element telecentric optical lens system according to an embodiment of the present invention.

FIG. 4 is a simplified cross sectional view of a four-element optical lens system 300 according to an embodiment of the present invention. Optical lens system 300 is a telecentric lens system including a first lens element L1, a second lens element L2, a third lens element L3, and a fourth lens element L4, arranged in order from the object side to the image side along the optical axis. Each lens element L1-L4 can be rotationally symmetric above the optical axis. In an embodiment, optical lens system 300 further includes an aperture stop AS disposed between the first lens element L1 and the second lens element L2.

First lens element L1 has a positive refractive power, a planar object-side surface, a convex image-side surface in the outer circumferential region, and a convex image-side surface in the vicinity of the optical axis. Second lens element L2 has a negative refractive power, a convex object-side surface in the vicinity of the optical axis, a convex object-side surface in the outer circumferential region, a concave image-side surface in the outer circumferential region, and a concave image side surface in the vicinity of the optical axis. Third lens element L3 has a negative refractive power, a concave object-side along the optical axis, a concave object-side surface in the outer circumferential region, a convex image-side surface in the outer circumferential region, and a convex surface on the image side along the optical axis. Fourth lens element L4 has a positive refractive power, a convex object-side surface in the vicinity of the optical axis, a convex object-side surface in the outer circumferential region, a convex image-side surface in the outer circumferential region, and a convex image side surface in the vicinity of the optical axis.

As shown in FIGS. 4, R1 and R2 are the respective object side and image side surface of first lens element L1. R3 and R4 are the respective object side and image side surface of second lens element L2. Similarly, R5 and R6 are the respective object-side and image-side surface of third lens element L3. Likewise, R7 and R8 are the respective object-side and image-side surface of fourth lens element L4.

In one embodiment, lens elements L1, L2, L3, and L4 each are made of the same material, which passes near infrared light having a wavelength about 900 nm and have a high absorption for visible light. In a specific embodiment, the material of lens elements L1, L2, L3, and L4 has a transmission peak at 940 nm.

Referring to FIG. 4, T1 is the thickness of first lens element L1, T2 is the thickness of the second lens element L2, T3 is the thickness of the third lens element L3, and T4 is the thickness of the fourth lens element L4. Thicknesses T1-T4 are each measured along the optical axis. AC12 is the air gap between the first and second lens elements, AC23 is the air gap between the second and third lens elements, and AC34 is the air gap between the third and fourth lens elements. Air gaps AC12, AC23, and AC34 are each measured along the optical axis. BFL denotes the back focal length, which is the distance between the image side of the fourth lens element and the image plane along the optical axis. BFL includes the thickness of the optical filter if the filter is disposed between the fourth lens element and the image plane. EFL denotes the effective focal length, which is also known as focal length.

In the following sections, ALT denotes the total thickness of the first to fourth lens elements, i.e., ALT=T1+T2+T3+T4. AAG denotes the total width of the air gaps of the first to fourth lens elements along the optical axis, i.e., AAG=AC12+AC23+AC34.

According to certain embodiments of the present invention, in order to reduce the total length of the optical lens system, the following measures can be taken: reducing the thickness of the lens elements and the air gaps between them. However, it is difficult to reduce the total thickness of the lens elements while maintaining adequate optical performance. Accordingly, the first lens element is designed to have a positive refractive power, the second lens element is designed to have a negative refractive power, the third lens element is designed to have a negative refractive power, and the fourth lens element is designed to have a positive refractive power. The air gap between the first and second lens elements is about 0.02 mm. The air gap between the second and third lens elements is about 0.196 mm. The air gap between the third and fourth lens elements is about 0.05 mm.

In one embodiment, all fourth lens elements L1, L2, L3, and L4 can be made of the same plastic material and coated with an antireflective material optimized for near-infrared radiation. In a preferred embodiment, the antireflective material has a transmission peak at about 940 nm.

Table 4A shows numeric lens data of the lens elements of optical lens system 300 according to an embodiment of the present invention. All four lens elements are made of the same plastic material to simplify the manufacturing process and reduce the manufacturing costs.

TABLE 4A

| | Curvature Radius (1/mm) | Radius (mm) | Thickness/ air gap (mm) | Refractive index | Abbe # |
|---|---|---|---|---|---|
| Object | | Infinity | 10000 | | |
| Lens 1 | | Infinity | 0.35 | 1.639753 | 23.35202 |
| | −9.77E−01 | −1.02391 | 0.02 | | |
| Lens 2 | 1.65E+00 | 0.604434 | 0.3 | 1.639753 | 23.35202 |
| | 2.72E+00 | 0.367997 | 0.195861 | | |
| Lens 3 | −1.89E+00 | −0.52892 | 0.3 | 1.639753 | 23.35202 |
| | −1.31E+00 | −0.76577 | 0.05 | | |
| Lens 4 | 1.31E+00 | 0.76423 | 0.5 | 1.639753 | 23.35202 |
| | −7.10E−01 | −1.40872 | 0.4 | | |

In this embodiment, the effective focal length (EFL) is 1.0588 mm, the half field of view (HFOV) is 18.11 degrees. The F number is 2.07. The image height is 0.346 mm. The BFL is 0.398 mm. The total length from the object-side surface of the first lens element to the image plane is about 2.116 mm. The angular magnification is 0.0622. The diameter of the aperture stop is about 0.498 mm and the thickness is 0.02 mm. All four lens elements are made of the same high quality material having an index of refraction of 1.6397. The chief ray angle is smaller than 1 degree across the field.

Table 4B shows numeric values of the conic constant K and aspheric surface coefficients for each of the aspheric lens surfaces of the four lens elements.

TABLE 4B

| Surface # | Semi-diameter | K | 2nd order term | 4th order term | 6th order term | 8th order term |
|---|---|---|---|---|---|---|
| R1 | 0.338471742 | 0 | | | | |
| R2 | 0.276312851 | 0 | | 1.19E+00 | −4.80E+00 | 1.36E+01 |
| R3 | 0.26533854 | 0 | | 2.08E−01 | | |
| R4 | 0.241014398 | 0 | | −3.58E+00 | | |
| R5 | 0.258098858 | 0 | | 2.80E−02 | | |
| R6 | 0.371279568 | 0 | | 3.64E−02 | | |
| R7 | 0.469899148 | 0 | | −3.73E−01 | 3.84E−02 | |
| R8 | 0.451692498 | 0 | | 5.29E−01 | −4.75E−01 | 2.67E−01 |

All order terms higher than the 8th order term are zeros. The conic constant is zero for all even aspheric surface of the four lens elements.

Four Lens Element Telecentric Lens System 400

Fifth Embodiment

Figure 5A:
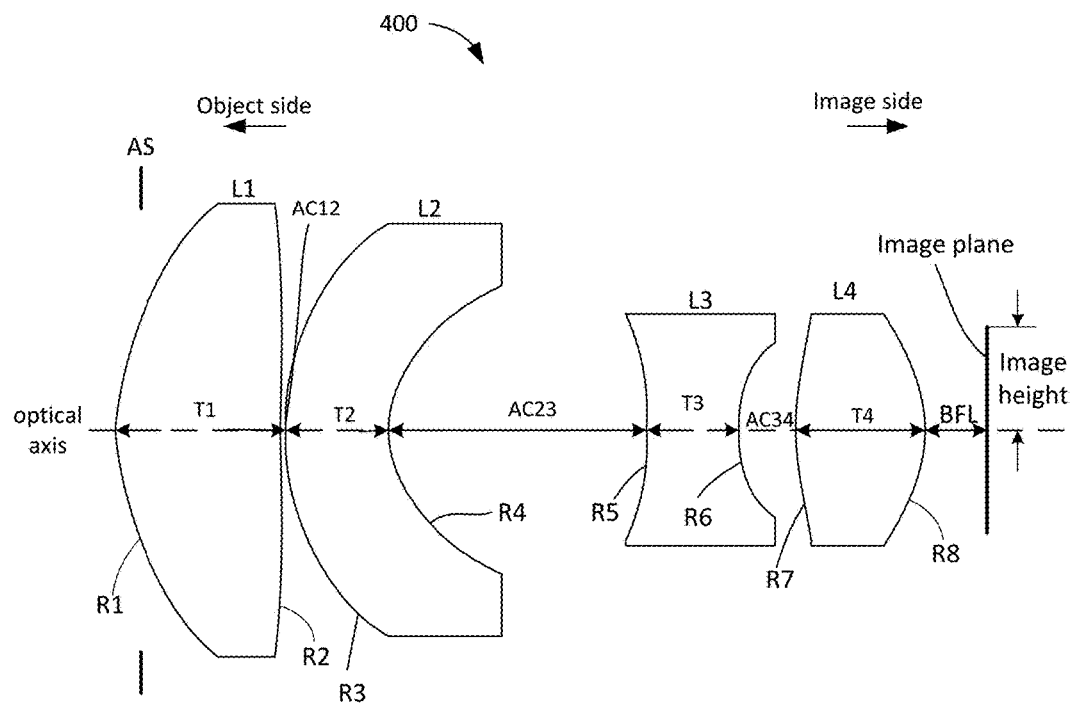
FIG. 5A is a simplified cross-section view of a four-element telecentric optical lens system according to another embodiment of the present invention.

FIG. 5A is a simplified cross-sectional view of a four-element optical lens system 400 according to an embodiment of the present invention. Optical lens system 400 is a telecentric lens system including a first lens element L1, a second lens element L2, a third lens element L3, and a fourth lens element L4, arranged in order from the object side to the image side along the optical axis. Each lens element L1-L4 can be rotationally symmetric above the optical axis.

First lens element L1 has a positive refractive power, a convex object-side surface in the vicinity of the optical axis, a convex object-side surface in the outer circumferential region, a convex image-side surface in the vicinity of the optical axis, and a convex image-side surface in the outer circumferential region. Second lens element L2 has a negative refractive power, a convex object-side surface in the vicinity of the optical axis, a convex object-side surface in the outer circumferential region, a concave image-side surface in the vicinity of the optical axis, and a concave image side surface in the outer circumferential region. Third lens element L3 has a negative refractive power, a concave object-side in the vicinity of the optical axis, a concave object-side surface in the outer circumferential region, a concave image-side surface in the vicinity of the optical axis, and a concave surface in the outer circumferential region. Fourth lens element L4 has a positive refractive power, a convex object-side surface in the vicinity of the optical axis, a convex object-side surface in the outer circumferential region, a convex image-side surface in the vicinity of the optical axis, and a convex image-side surface in the outer circumferential region.

Optical lens system 400 further includes an aperture stop AS disposed in front of the first lens element L1, where the optical axis intersects the center of the aperture stop.

Referring to FIGS. 5, R1 and R2 are the respective object side and image side surface of first lens element L1. R3 and R4 are the respective object side and image side surface of second lens element L2. Similarly, R5 and R6 are the respective object-side and image-side surface of third lens element L3. Likewise, R7 and R8 are the respective object-side and image-side surface of fourth lens element L4.

In one embodiment, lens elements L1, L2, L3, and L4 each are made of the same material, which passes near infrared light having a wavelength about 900 nm and have a high absorption for visible light. In a specific embodiment, the material of lens elements L1, L2, L3, and L4 has a transmission peak at 940 nm. In some embodiments, lens elements may be made of Ultem 1010, Ultem XH6050, Extem XH1005, and Extem UH1006.

Still referring to FIG. 4, T1 is the thickness of first lens element L1, T2 is the thickness of the second lens element L2, T3 is the thickness of the third lens element L3, and T4 is the thickness of the fourth lens element L4. Thicknesses T1-T4 are each measured along the optical axis. AC12 is the air gap between the first and second lens elements, AC23 is the air gap between the second and third lens elements, and AC34 is the air gap between the third and fourth lens elements. Air gaps AC12, AC23, and AC34 are each measured along the optical axis. BFL denotes the back focal length, which is the distance between the image side of the fourth lens element and the image plane along the optical axis. BFL includes the thickness of the optical filter if the filter is disposed between the fourth lens element and the image plane. EFL denotes the effective focal length, which is also known as focal length.

In the following sections, ALT denotes the total thickness of the first to fourth lens elements, i.e., ALT=T1+T2+T3+T4. AAG denotes the total width of the air gaps of the first to fourth lens elements along the optical axis, i.e., AAG=AC12+AC23+AC34.

Table 5A shows numeric lens data of the lens elements of optical lens system 400 according to an embodiment of the present invention. All four lens elements are made of the same plastic material to simplify the manufacturing process and reduce the manufacturing costs.

TABLE 5A

|  | Curvature Radius (1/mm) | Radius (mm) | Thickness/ air gap (mm) | Refractive index | Abbe # |
|---|---|---|---|---|---|
| Object |  | Infinity | 1E+08 |  |  |
| Aperture stop |  | Infinity | −0.3176 |  |  |
| Lens 1 | 9.50E−01 | 1.052815 | 0.52 | 1.639753 | 23.35202 |
|  | −2.00E−02 | −50.0992 | 0.04 |  |  |
| Lens 2 | 1.12E+00 | 0.89579 | 0.32 | 1.639753 | 23.35202 |
|  | 1.95E+00 | 0.513552 | 0.801427 |  |  |
| Lens 3 | −8.36E−01 | −1.19688 | 0.28 | 1.639753 | 23.35202 |
|  | 2.24E+00 | 0.445971 | 0.184473 |  |  |
| Lens 4 | 9.80E−01 | 1.020037 | 0.4 | 1.639753 | 23.35202 |
|  | −1.60E+00 | −0.62529 | 0.1 |  |  |

In this embodiment, the effective focal length (EFL) is 3.614 mm, the half field of view (HFOV) is 4.896 degrees. The F number is 2.3. The image height is 0.3096 mm. The BFL is 0.1 mm. The total length from the object-side surface of the first lens element to the image plane is about 2.678 mm. The angular magnification is −0.3587. The diameter of the aperture stop is about 1.57 mm and the thickness of is 0.35 mm. All four lens elements are made of the same high quality material having an index of refraction of 1.6397.

According to this embodiment, the air gap between the first and second lens elements is about 0.04 mm, the air gap between the second and third lens elements is about 0.80 mm, and the air gap between the third and fourth lens elements is about 0.18 mm.

Table 5B shows numeric values of the conic constant K and aspheric surface coefficients for each of the aspheric lens surfaces of the four lens elements.

TABLE 5B

| Surface # | Semi-diameter | K | 2nd order term | 4th order term | 6th order term | 8th order term | 10th order term |
|---|---|---|---|---|---|---|---|
| R1 | 0.338471742 | 0.009547 |  | −3.09E−02 | −1.23E−01 | 1.20E−01 | −1.35E−01 |
| R2 | 0.276312851 | 0 |  |  |  |  |  |
| R3 | 0.26533854 | −0.38324 |  |  |  |  |  |
| R4 | 0.241014398 | −0.17923 |  |  |  |  |  |
| R5 | 0.258098858 | 3.536838 |  |  |  |  |  |
| R6 | 0.371279568 | 0 |  | 7.22E−01 |  |  |  |
| R7 | 0.469899148 | 0 |  | −1.04E+00 |  |  |  |
| R8 | 0.451692498 | 0 |  | 4.08E−01 | −1.76E+00 |  |  |

Figure 5B:
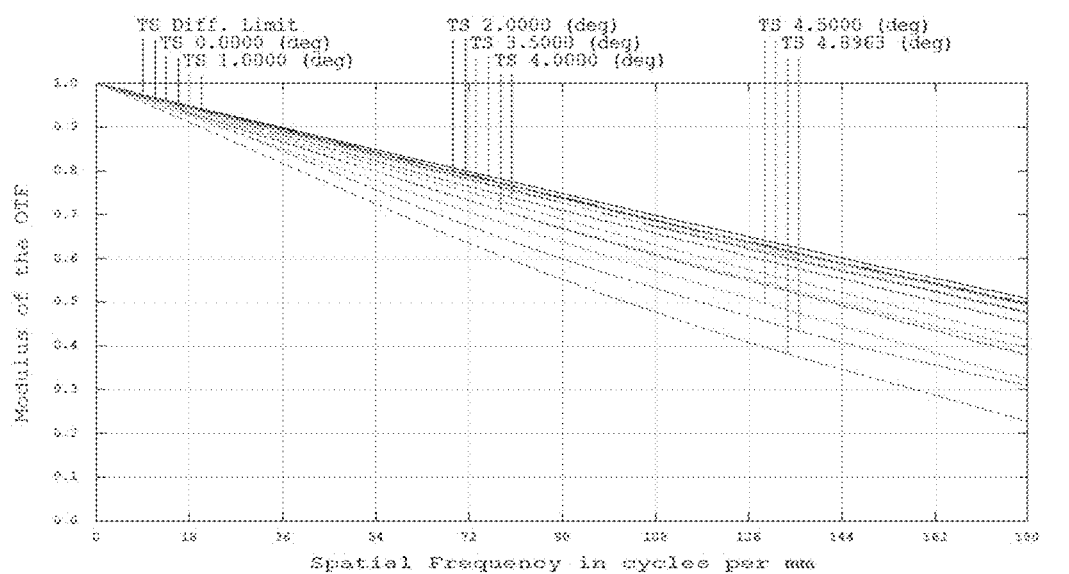
FIG. 5B is a MTF graph for the four-element telecentric optical lens system shown in FIG. 5A.

All order terms higher than the 10th order term are zeros. FIG. 5B is a MTF graph for the optical lens system 400.

Various materials having an absorption spectrum of visible light and high transmission for near infrared wavelengths are known. For example, Ultem XH6050, Extem XH1005, Extem UH1006 are suitable materials for making lens elements of the present disclosure.

Sixth Embodiment

Figure 6A:
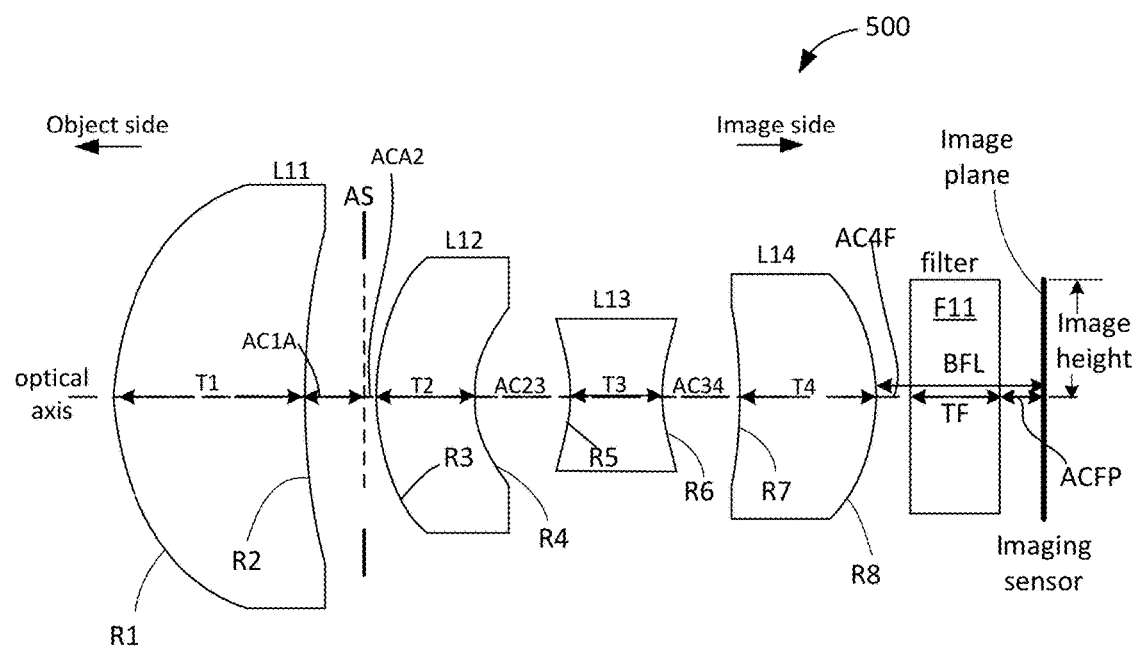
FIG. 6A is a simplified cross-section view of a four-element optical lens system according to an embodiment of the present invention.

FIG. 6A is a simplified cross-section view of a four-element optical lens system 500 according to a sixth embodiment of the present invention. Optical lens system 500 comprises a first lens element L11, a second lens element L12, a third lens element L13, and a fourth lens element L14, arranged in order from the object side to the image side along the optical axis. Each lens element L11-L14 can be rotationally symmetric above the optical axis.

First lens element L11 has a positive refractive power, a convex object-side surface in the vicinity of the optical axis, a convex object-side surface in the outer circumferential region, and a concave image-side surface in the vicinity of the optical axis. Second lens element L12 has a negative refractive power, a convex object-side surface in the vicinity of the optical axis, a convex object-side surface in the outer circumferential region, a concave image-side surface in the vicinity of the optical axis, and a concave image side surface in the outer circumferential region. Third lens element L13 has a negative refractive power, a concave object-side in the vicinity of the optical axis, a concave object-side surface in the outer circumferential region, a concave image-side surface in the vicinity of the optical axis, and a concave surface in the outer circumferential region. Fourth lens element L14 has a positive refractive power, a concave object-side surface in the vicinity of the optical axis, a concave object-side surface in the outer circumferential region, a convex image-side surface in the vicinity of the optical axis, and a convex image-side surface in the outer circumferential region.

Optical lens system 500 further includes a filter F11 disposed between fourth lens element L14 and an imaging sensor. In an embodiment, filter F11 may be made of glass.

Optical lens system 500 further includes an aperture stop AS disposed between first lens element L11 and second lens element L12, where the optical axis intersects the center of the aperture stop.

Referring to FIG. 6A, R1 and R2 are the respective object side and image side surface of first lens element L11. R3 and R4 are the respective object side and image side surface of second lens element L12. Similarly, R5 and R6 are the respective object-side and image-side surface of third lens element L13. Likewise, R7 and R8 are the respective object-side and image-side surface of fourth lens element L14.

In one embodiment, lens elements L11, L12, L13, and L14 each are made of the same material, which passes near infrared light having a wavelength about 900 nm and have a high absorption for visible light. In a specific embodiment, the material of lens elements L11, L12, L13, and L14 has a transmission peak at 940 nm. In some embodiments, lens elements may be made of Ultem 1010, Ultem XH6050, Extem XH1005, and Extem UH1006.

Still referring to FIG. 6A, T1 is the thickness of first lens element L11, T2 is the thickness of the second lens element L12, T3 is the thickness of the third lens element L13, and T4 is the thickness of the fourth lens element L14. Thicknesses T1-T4 are each measured along the optical axis. AC12 is the air gap between the first and second lens elements and includes the distance AC1S between the image-side surface of first lens L11 and the center of the aperture stop AS and the distance ACS2 between the center of the aperture stop AS and the object-side surface of second lens element L12. AC23 is the air gap between the second and third lens elements, and AC34 is the air gap between the third and fourth lens elements. Air gaps AC12, AC23, and AC34 are each measured along the optical axis. BFL denotes the back focal length, which is the distance between the image side of the fourth lens element and the image plane along the optical axis. BFL includes the thickness of the optical filter if the filter is disposed between the fourth lens element and the image plane. EFL denotes the effective focal length, which is also known as focal length.

In the following sections, ALT denotes the total thickness of the first to fourth lens elements, i.e., ALT=T1+T2+T3+T4. AAG denotes the total width of the air gaps of the first to fourth lens elements along the optical axis, i.e., AAG=AC12+AC23+AC34.

Table 6A shows numeric lens data of the lens elements of optical lens system 500 according to an embodiment of the present invention. All four lens elements are made of the same plastic material to simplify the manufacturing process and reduce the manufacturing costs.

In this embodiment, the effective focal length (EFL) is 3.7999 mm, the half field of view (HFOV) is 5.387 degrees. The F number is 2.3. The image height is 0.358 mm. The BFL is 0.5 mm. The total length from the object-side surface of the first lens element to the image plane is about 2.701 mm. The angular magnification is 1.422. The diameter of the aperture stop is about 1.05 mm. All four lens elements are made of the same high quality material having an index of refraction of 1.6397.

According to this embodiment, the air gap AC12 between the first and second lens elements is the sum of the air gap AC and ACS2 and is about 0.1 mm, where AC1S is the distance between the image-side surface of first lens element L11 and the aperture stop AS, and ACS2 is the distance between the aperture stop AS and the object-side surface of second lens element L12 along the optic axis. The air gap AC23 between the second and third lens elements is about 0.274 mm, and the air gap between the third and fourth lens elements is about 0.237 mm along the optical axis. The filter may be made of glass and has a thickness of about 0.3 mm. The filter has a refractive index of 1.5168 and an Abbe number of 64.16. The filter is disposed at about 0.1 mm from the image-side of fourth lens element L14 and 0.1 mm from the image plane along the optical axis. The telephoto ratio is about 0.71058. In an embodiment, the sum of all air gaps AAG between the first through the fourth lens elements is 0.611. The ratio of AAG/T3 is 2.174.

According to certain embodiments of the present invention, in order to reduce the total length of the optical lens system, the following measures can be taken: reducing the thickness of the lens elements and the air gaps between them. However, it is difficult to reduce the total thickness of the lens elements while maintaining adequate optical performance. Accordingly, the first lens element is designed to have a positive refractive power, the second lens element is designed to have a negative refractive power, and the third lens element is designed to have a positive refractive power. In order to increase the production yield and reduce manufacturing costs all three lens elements can be made of the same material. In one embodiment, the optical lens material has an absorption spectrum of visible light with a wavelength in the range between 400 nm and 700 nm, while having high transmission for wavelengths above 850 nm.

According to the first embodiment, all four lens elements L11, L12, L13, and L14 can be made of the same material and coated with an antireflective material optimized for near-infrared radiation. The first lens element has a positive refractive power, a convex surface on the object-side in the vicinity of the optical axis, and a concave surface on the image-side in the vicinity of the optical axis. The second lens

TABLE 6A

|  | Curvature Radius (1/mm) | Radius (mm) | Thickness/ air gap (mm) | Refractive index | Abbe # |
|---|---|---|---|---|---|
| Object |  | Infinity | 1E+08 |  |  |
| Lens 11 | 1.32E+00 | 7.60E−01 | T1 = 6.08E−01 | 1.639753 | 23.35202 |
|  | 1.51E−01 | 6.61E+00 | AC1S = 8.00E−02 |  |  |
|  |  |  | ACS2 = 2.00E−02 |  |  |
| Lens 12 | 8.32E−01 | 1.20E+00 | T2 = 2.82E−01 | 1.639753 | 23.35202 |
|  | 1.76E+00 | 5.67E−01 | AC23 = 2.74E−01 |  |  |
| Lens 13 | −1.09E+00 | −9.21E−01 | T3 = 2.81E−01 | 1.639753 | 23.35202 |
|  | 1.90E+00 | 5.25E−01 | AC34 = 2.37E−01 |  |  |
| Lens 14 | −6.75E−03 | −1.48E+02 | T4 = 4.19E−01 | 1.639753 | 23.35202 |
|  | −1.27E+00 | −7.89E−01 | AC4F = 1.00E−01 |  |  |
| filter | 0.00E+00 |  | TF = 3.00E−01 | 1.5168 | 64.16 |
| Image plane |  |  | ACFP = 1.00E−01 |  |  | element has a negative refractive power, the third lens element has a concave surface on the object in the vicinity of the optical axis, and a concave surface near the outer circumference, and the fourth lens element has a convex image-side surface. The object-side and image-side surfaces of the four lens elements are even aspheric. The combination of these four lens elements provides the desired lens system quality. Making the four lens elements of the same material can lower the manufacturing costs and simplify the manufacturing process.

Table 6B shows numeric lens data of the conic constant K and aspheric surface coefficients as for each of the lens surfaces of optical lens system 100 according to the second embodiment of the present invention.

TABLE 6B

| Surface # | Semi-diameter | K | 2nd order term | 4th order term | 6th order term | 8th order term | 10th order term |
|---|---|---|---|---|---|---|---|
| R1 | 6.93E−01 | −3.32E−01 | | 1.88E−02 | −8.85E−02 | 2.99E−01 | −2.65E−01 |
| R2 | 5.65E−01 | 0 | | 8.43E−02 | −5.34E−02 | 3.59E−03 | |
| R3 | 4.53E−01 | 3.12E+00 | | 3.19E−01 | −8.40E−01 | | |
| R4 | 2.93E−01 | 1.67E+00 | | 6.75E−01 | 4.41E+00 | | |
| R5 | 2.52E−01 | 8.23E+00 | | 5.64E−01 | | | |
| R6 | 2.51E−01 | 0 | | 8.28E−03 | −3.63E+00 | 2.60E+01 | |
| R7 | 3.13E−01 | 0 | | −1.44E+00 | 2.44E−01 | | |
| R8 | 3.98E−01 | 0 | | −2.05E+00 | 6.47E+00 | −2.27E+00 | |

All order terms higher than the 10th order term are zeros.

FIGS. 6B-6O are a set of graphs illustrating the transverse ray fan plot of the optical imaging system 500 shown in FIG. 6A. FIGS. 6B and 6C illustrate transverse ray fan plots for an object zero degrees off axis in the y-plane and the x-plane, respectively. FIGS. 6D and 6E illustrate transverse ray fan plots for an object one degree off axis in the y-plane and the x-plane, respectively. FIGS. 6F and 6G illustrate transverse ray fan plots for an object two degrees off axis in the y-plane and the x-plane, respectively. FIGS. 6H and 6I illustrate transverse ray fan plots for an object three and one half degrees off axis in the y-plane and the x-plane, respectively. FIGS. 6J and 6K illustrate transverse ray fan plots for an object four degrees off axis in the y-plane and the x-plane, respectively. FIGS. 6L and 6M illustrate transverse ray fan plots for an object four and one half degrees off axis in the y-plane and the x-plane, respectively. FIGS. 6N and 6O illustrate transverse ray fan plots for an object 5.387 degrees off axis in the y-plane and the x-plane, respectively.

Seventh Embodiment

Figure 7A:
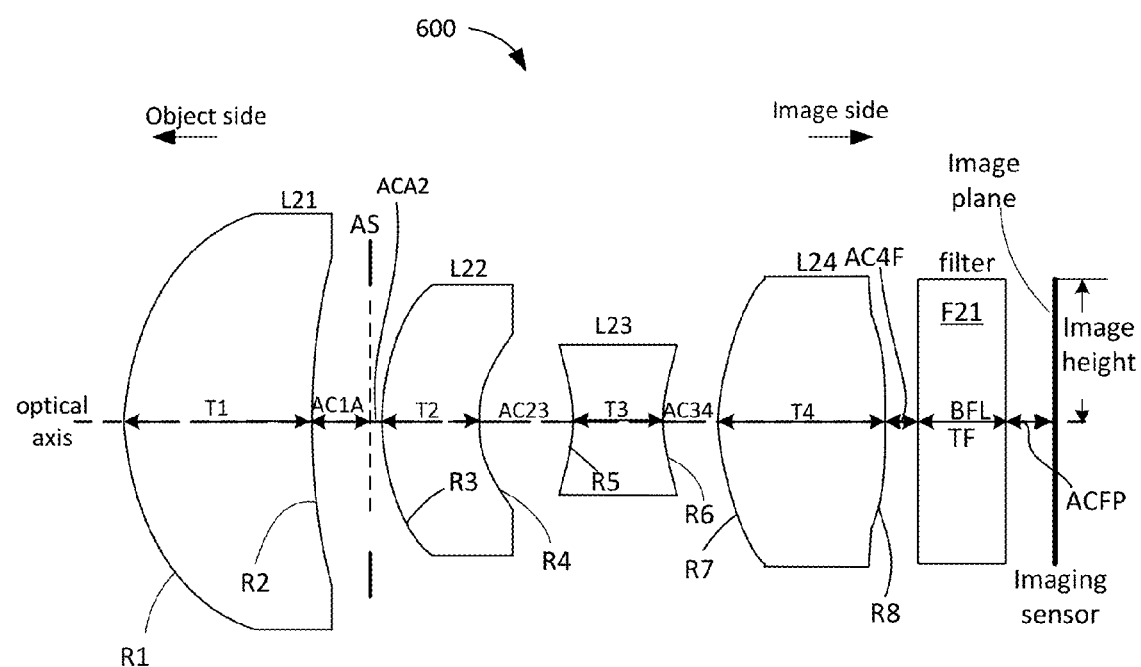
FIG. 7A is a simplified cross-section view of a four-element optical lens system according to an embodiment of the present invention.

FIG. 7A is a simplified cross sectional view of a four-element optical lens system 600 according to an embodiment of the present invention. Optical lens system 600 includes, a first lens element L21, an aperture stop AS, a second lens element L22, a third lens element L23, and a fourth lens element L24, arranged in order from the object side to the image side along the optical axis. Each lens element L21-L24 can be rotationally symmetric above the optical axis.

First lens element L21 has a positive refractive power, a convex object-side surface, a convex image-side surface in the outer circumferential region, and a concave image-side surface in the vicinity of the optical axis. Second lens element L22 has a negative refractive power, a convex object-side surface in the vicinity of the optical axis, and a concave image side surface in the vicinity of the optical axis. Third lens element L23 has a negative refractive power, a concave object-side along the optical axis, and a concave surface on the image side along the optical axis. Fourth lens element L24 has a positive refractive power, a convex object-side surface in the vicinity of the optical axis, and a convex image side surface in the vicinity of the optical axis and a convex image-side surface in the outer circumferential region.

Optical lens system 600 also includes a filter F21 configured to block the passage of light at visible wavelengths. In some embodiments, the filter filters out wavelengths below about 700 nm. The optical filter blocks shorter wavelengths of the visible spectrum and passes through wavelengths above about 700 nm. The filter improves the infrared performance of the imaging lens system 600 by reducing interference from other light sources. Although filter F21 is shown as a single filter disposed between the fourth lens element and the image plane, filter F21 can be disposed in any other locations and can have one or more filter elements. Filter F21 can be similar to filter F11 described above.

As shown in FIG. 7A, R1 and R2 are the respective object side and image side surface of first lens element L21. R3 and R4 are the respective object side and image side surface of second lens element L22. Similarly, R5 and R6 are the respective object-side and image-side surface of third lens element L23. Likewise, R7 and R8 are the respective object-side and image-side surface of fourth lens element L24.

In one embodiment, lens elements L21, L22, L23, and L24 each are made of the same material, which passes near infrared light having a wavelength about 900 nm. In another embodiment, the material of the lens elements L21, L22, L23, and L24 has a high absorption for visible light and a high transmission for near infrared light longer than 900 nm, preferably at 940 nm.

Referring to FIG. 7A, T1 is the thickness of first lens element L21, T2 is the thickness of the second lens element L22, T3 is the thickness of the third lens element L23, and T4 is the thickness of the fourth lens element L24. Thicknesses T1-T4 are each measured along the optical axis. AC1S is the distance between the first lens element and the aperture stop AS, ACS2 is the distance between the aperture stop AS and the object-side surface of the second lens element, so that the sum of AC1A and ACA2 is the air gap AC12 between the first and second lens elements. AC23 is the air gap between the second and third lens elements, and AC34 is the air gap between the third and fourth lens elements. Air gaps AC12, AC23, and AC34 are each measured along the optical axis. BFL denotes the back focal length, which is the distance between the image side of the fourth lens element and the image plane along the optical axis. BFL includes the thickness of the optical filter if the filter is disposed between the fourth lens element and the image plane. EFL denotes the effective focal length, which is also known as focal length.

In the following sections, ALT denotes the total thickness of the first to fourth lens elements, i.e., ALT=T1+T2+T3+T4. AAG denotes the total width of the air gaps of the first to fourth lens elements along the optical axis, i.e., AAG=AC12+AC23+AC34. In an embodiment, AAG is 0.9308 mm. The ratio of AAG/T3 is 3.324. The ratio of EFL/T4 satisfies the relation of 7.0≤EFL/T4. The ratio of AC34/T3 satisfies the relation 0.8≤AC34/T3.

In this embodiment, the effective focal length (EFL) is 3.798 mm, the half field of view (HFOV) is 5.469 degrees. The F number is 2.2. The image height is 0.3636 mm. The BFL is 0.51 mm. The total length TTL from the object-side surface of the first lens element to the image plane is 2.7018 mm. The telephoto ratio is 0.71147. The angular magnification is 1.5316. The diameter of the aperture stop is 1.38 mm. The diameter of the filter is 0.75 mm.

Table 7B shows numeric values of the conic constant K and aspheric surface coefficients for each of the aspheric lens surfaces of the four lens elements.

TABLE 7B

| Surface # | Semi-diameter | K | 2nd order term | 4th order term | 6th order term | 8th order term | 10th order term |
|---|---|---|---|---|---|---|---|
| R1 | 7.51E−01 | 1.46E−03 | | −3.02E−02 | −2.91E−01 | 2.73E−01 | −3.98E−01 |
| R2 | 7.03E−01 | 0.00E+00 | | 1.11E−01 | −3.06E−02 | | |
| R3 | 6.21E−01 | 3.47E+00 | | 1.99E−02 | 3.78E−01 | 5.58E−03 | |
| R4 | 4.69E−01 | −9.10E−01 | | 3.01E−01 | 1.49E−01 | | |
| R5 | 2.92E−01 | −2.85E+01 | | −3.34E+00 | −3.11E+00 | | |
| R6 | 2.88E−01 | 0.00E+00 | | 6.75E+00 | −5.32E+01 | | |
| R7 | 3.99E−01 | 0.00E+00 | | 1.34E+00 | 8.28E+00 | −1.60E+01 | |
| R8 | 3.89E−01 | 0.00E+00 | | −1.45E+00 | 1.48E+01 | 3.31E+00 | |

According to certain embodiments of the present invention, in order to reduce the total length of the optical lens system, the following measures can be taken: reducing the thickness of the lens elements and the air gaps between them. However, it is difficult to reduce the total thickness of the lens elements while maintaining adequate optical performance. Accordingly, the first lens element is designed to have a positive refractive power, the second lens element is designed to have a positive refractive power, the third lens element is designed to have a negative refractive power, and the fourth lens element is designed to have a positive refractive power. In order to increase the production yield and reduce manufacturing costs all fourth lens elements can be made of the same material. In one embodiment, the optical lens material has an absorption spectrum of visible light in the range from 400 nm to 700 nm, while having high transmission for wavelengths above 850 nm.

In one embodiment, all fourth lens elements L21, L22, L23, and L24 can be made of the same material and coated with an antireflective material optimized for near-infrared radiation. In a preferred embodiment, the antireflective material has a transmission peak at about 940 nm.

Table 7A shows numeric lens data of the lens elements of optical lens system 600 according to an embodiment of the present invention. All four lens elements are made of the same material to simplify the manufacturing process and reduce the manufacturing costs.

All order terms higher than the 10th order term are zeros.

Figure 7P:
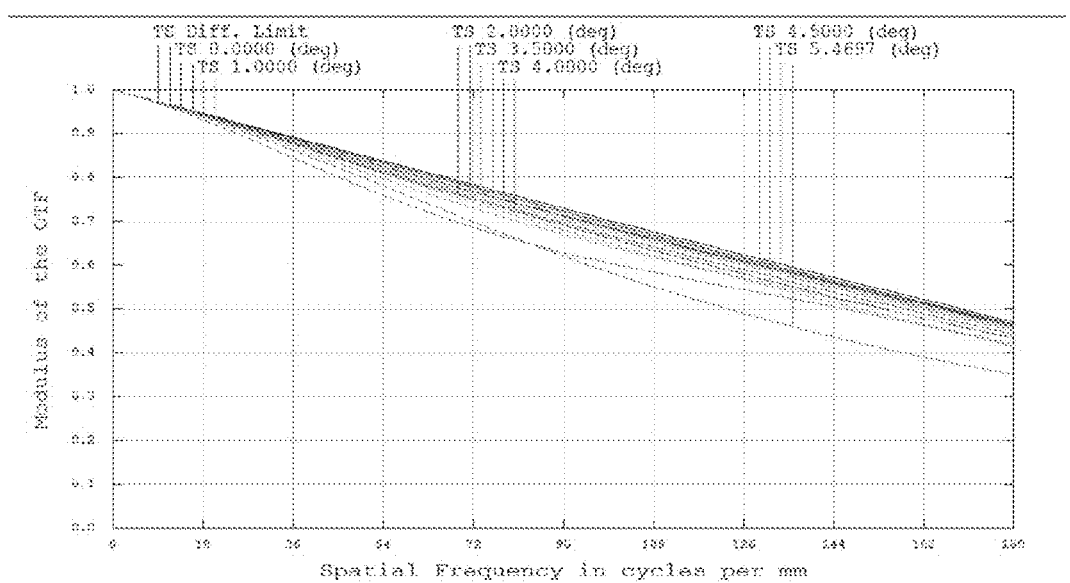
FIG. 7P is graph illustrating the modulus of the optical transfer function as a function of the spatial frequency (cycles/mm) in the embodiment of FIG. 7A.

FIGS. 7B-7O are a set of graphs illustrating the transverse ray fan plot of the optical imaging system 600 shown in FIG. 7A. FIGS. 7B and 7C illustrate transverse ray fan plots for an object zero degrees off axis in the y-plane and the x-plane, respectively. FIGS. 7D and 7E illustrate transverse ray fan plots for an object one degree off axis in the y-plane and the x-plane, respectively. FIGS. 7F and 7G illustrate transverse ray fan plots for an object two degrees off axis in the y-plane and the x-plane, respectively. FIGS. 7H and 7I illustrate transverse ray fan plots for an object three and one half degrees off axis in the y-plane and the x-plane, respectively. FIGS. 7J and 7K illustrate transverse ray fan plots for an object four degrees off axis in the y-plane and the x-plane, respectively. FIGS. 7L and 7M illustrate transverse ray fan plots for an object four and one half degrees off axis in the y-plane and the x-plane, respectively. FIGS. 7N and 7O illustrate transverse ray fan plots for an object 5.4697 degrees off axis in the y-plane and the x-plane, respectively. FIG. 7P is graph illustrating the modulus of the optical transfer function as a function of the spatial frequency (cycles/mm) in the embodiment of FIG. 7A.

Eighth Embodiment

Figure 8A:
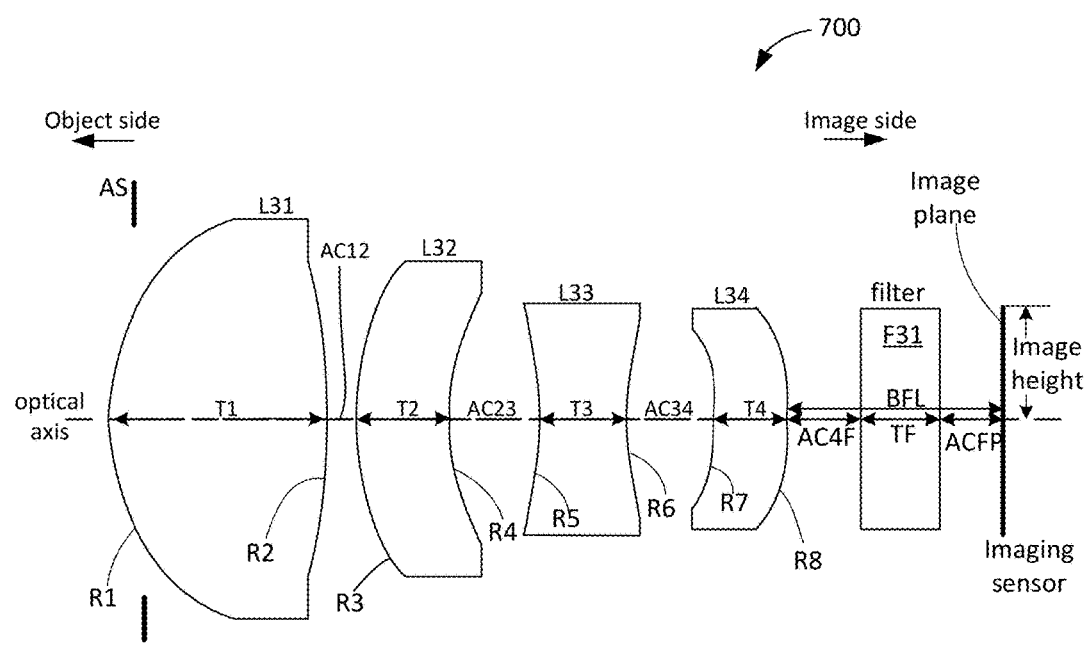
FIG. 8A is a simplified cross-section view of a four-element optical lens system according to an embodiment of the present invention.

FIG. 8A is a simplified cross sectional view of a four-element optical lens system 700 according to an embodi-

TABLE 7A

| | Curvature Radius (1/mm) | Radius (mm) | Thickness/air gap (mm) | Refractive index | Abbe # |
|---|---|---|---|---|---|
| Object | | Infinity | 10000 | | |
| Lens 1 | 1.08E+00 | 9.26E−01 | T1 = 0.46 | 1.639753 | 23.35202 |
| | −1.17E−01 | −8.56E+00 | AC1S = 0.014829 | | |
| | 0.00E+00 | | ACS2 = 0.02 | | |
| Lens 2 | 5.36E−01 | 1.87E+00 | T2 = 0.300369 | 1.639753 | 23.35202 |
| | 1.13E+00 | 8.87E−01 | AC23 = 0.615285 | | |
| Lens 3 | −1.33E+00 | −7.51E−01 | T3 = 0.2 | 1.639753 | 23.35202 |
| | 1.65E+00 | 6.06E−01 | AC34 = 0.281892 | | |
| Lens 4 | 4.08E−01 | 2.45E+00 | T4 = 0.231201 | 1.639753 | 23.35202 |
| | −8.95E−01 | −1.12E+00 | AC4F = 0.1 | | |
| filter | 0.00E+00 | | TF = 0.3 | 1.5168 | 64.16 |
| | 0.00E+00 | | ACFP = 0.1 | | |
| Image plane | 0.00E+00 | | 0 | | | ment of the present invention. Optical lens system 700 includes, an aperture stop AS, a first lens element L31, a second lens element L32, a third lens element L33, and a fourth lens element L34, arranged in order from the object side to the image side along the optical axis. Each lens element L31-L34 can be rotationally symmetric above the optical axis.

First lens element L31 has a positive refractive power. The object side surface of first lens element L31 has a convex portion in the vicinity of the optical axis and a convex portion in the outer circumferential region. The image-side surface of first lens element L31 has a convex portion in the vicinity of the optical axis. Second lens element L32 has a negative refractive power, a convex object-side surface in the vicinity of the optical axis, and a concave image side surface in the vicinity of the optical axis. Third lens element L33 has a negative refractive power, a convex object-side along the optical axis, and a concave surface on the image side along the optical axis. Fourth lens element L34 has a negative refractive power, a concave object-side surface in the vicinity of the optical axis, and a concave image side surface in the vicinity of the optical axis.

Optical lens system 700 also includes a filter F31 configured to block the passage of light at visible wavelengths. In some embodiments, the filter filters out wavelengths below about 700 nm. The optical filter blocks shorter wavelengths of the visible spectrum and passes through wavelengths above about 700 nm. The filter improves the infrared performance of the imaging lens system 700 by reducing interference from other light sources. Although filter F31 is shown as a single filter disposed between the fourth lens element and the image plane, filter F31 can be disposed in any other locations and can have one or more filter elements. Filter F31 can be similar to filter F11 of filter F21 described above.

As shown in FIG. 8A, R1 and R2 are the respective object side and image side surface of first lens element L31. R3 and R4 are the respective object side and image side surface of second lens element L32. Similarly, R5 and R6 are the respective object-side and image-side surface of third lens element L33. Likewise, R7 and R8 are the respective object-side and image-side surface of fourth lens element L34.

In one embodiment, lens elements L31, L32, L33, and L34 each are made of the same material, which passes near infrared light having a wavelength about 900 nm. In another embodiment, the material of the lens elements L31, L32, L33, and L34 has a high absorption for visible light and a high transmission for near infrared light longer than 900 nm, preferably at 940 nm.

Referring to FIG. 8A, T1 is the thickness of first lens element L31, T2 is the thickness of the second lens element L32, T3 is the thickness of the third lens element L33, and T4 is the thickness of the fourth lens element L34. Thicknesses T1-T4 are each measured along the optical axis. AC12 is the air gap between the first and second lens elements, AC23 is the air gap between the second and third lens elements, and AC34 is the air gap between the third and fourth lens elements. Air gaps AC12, AC23, and AC34 are each measured along the optical axis. BFL denotes the back focal length, which is the distance between the image side of the fourth lens element and the image plane along the optical axis. BFL includes the thickness of the optical filter if the filter is disposed between the fourth lens element and the image plane. EFL denotes the effective focal length, which is also known as focal length.

In the following sections, ALT denotes the total thickness of the first to fourth lens elements, i.e., ALT=T1+T2+T3+T4. AAG denotes the total width of the air gaps of the first to fourth lens elements along the optical axis, i.e., AAG=AC12+AC23+AC34.

According to certain embodiments of the present invention, in order to reduce the total length of the optical lens system, the following measures can be taken: reducing the thickness of the lens elements and the air gaps between them. However, it is difficult to reduce the total thickness of the lens elements while maintaining adequate optical performance. Accordingly, the first lens element is designed to have a positive refractive power, the second lens element is designed to have a positive refractive power, the third lens element is designed to have a negative refractive power, and the fourth lens element is designed to have a positive refractive power. In order to increase the production yield and reduce manufacturing costs all fourth lens elements can be made of the same material. In one embodiment, the optical lens material has an absorption spectrum of visible light in the range from 400 nm to 700 nm, while having high transmission for wavelengths above 850 nm.

In one embodiment, all fourth lens elements L31, L32, L33, and L34 can be made of the same material and coated with an antireflective material optimized for near-infrared radiation. In a preferred embodiment, the antireflective material has a transmission peak at about 940 nm.

Table 8A shows numeric lens data of the lens elements of optical lens system 700 according to an embodiment of the present invention. All four lens elements are made of the same material to simplify the manufacturing process and reduce the manufacturing costs.

TABLE 8A

| | Curvature Radius (1/mm) | Radius (mm) | Thickness/air gap (mm) | Refractive index | Abbe # |
| --- | --- | --- | --- | --- | --- |
| Object | | Infinity | 10000 | | |
| Aperture stop | 0.00E+00 | | −3.17E−01 | | |
| Lens 1 | 9.20E−01 | 1.09E+00 | T1 = 5.86E−01 | 1.639753 | 23.35202 |
| | −9.92E−02 | −1.01E+01 | AC12 = 5.00E−02 | | |
| Lens 2 | 5.92E−01 | 1.69E+00 | T2 = 3.15E−01 | 1.639753 | 23.35202 |
| | 8.72E−01 | 1.15E+00 | AC23 = 3.82E−01 | | |
| Lens 3 | 5.93E−03 | 1.69E+02 | T3 = 2.40E−01 | 1.639753 | 23.35202 |
| | 1.40E+00 | 7.16E−01 | AC34 = 2.78E−01 | | |
| Lens 4 | −6.88E−01 | −1.45E+00 | T4 = 2.40E−01 | 1.639753 | 23.35202 |
| | 5.28E−02 | 1.89E+01 | AC4F = 1.00E−01 | | |
| filter | 0.00E+00 | | TF = 2.10E−01 | 1.5168 | 64.16 |
| | 0.00E+00 | | ACFP = 3.00E−01 | | |
| Image plane | 0.00E+00 | | | | |

In this embodiment, the effective focal length (EFL) is 3.9999 mm, the half field of view (HFOV) is 5.3 degrees. The F number is 2.4. The image height is 0.3715 mm. The total length TTL from the object-side surface of the first lens element to the image plane is 2.703 mm. The telephoto ratio is 0.675. The angular magnification is 3.0447. The diameter of the aperture stop is 1.666 mm. The diameter of the filter is 0.678 mm. AAG is 0.71 mm. The ratio of AAG/T3 is greater than 2.0.

In this embodiment, the first lens element has a curvature radius R1 of 0.920 mm$^{-1}$ and a curvature radius R2 of −0.0992 mm$^{-1}$. The second lens element has a curvature radius R3 of 0.592 mm$^{-1}$ and a curvature radius R4 of −0.872 mm$^{-1}$. The third lens element has a curvature radius R5 of 0.00593 mm$^{-1}$ and a curvature radius R6 of 1.40 mm$^{-1}$. The fourth lens element has a curvature radius R7 of −0.688 mm$^{-1}$ and a curvature radius R8 of 0.0528 mm$^{-1}$.

Table 8B shows numeric values of the conic constant K and aspheric surface coefficients for each of the aspheric lens surfaces of the four lens elements.

TABLE 8B

| Surface # | Semi-diameter | K | 2nd order term | 4th order term | 6th order term | 8th order term |
|---|---|---|---|---|---|---|
| R1 | 8.33E−01 | 0.00E+00 | | −3.89E−03 | −3.24E−01 | 1.65E−01 |
| R2 | 7.79E−01 | 0.00E+00 | | −1.82E−01 | 3.05E−01 | |
| R3 | 7.03E−01 | 0.00E+00 | | −4.29E−01 | 1.03E+00 | |
| R4 | 5.79E−01 | 0.00E+00 | | −6.64E−01 | 4.64E−01 | |
| R5 | 4.04E−01 | 0.00E+00 | | −2.18E+00 | 5.19E+00 | |
| R6 | 3.22E−01 | 0.00E+00 | | −3.57E+00 | 8.84E+00 | |
| R7 | 2.76E−01 | 0.00E+00 | | −6.90E+00 | −8.21E+00 | |
| R8 | 3.23E−01 | 0.00E+00 | | −4.59E+00 | 1.53E+01 | −2.65E+01 |

All order terms higher than the 8th order term are zeros.

Figure 8P:
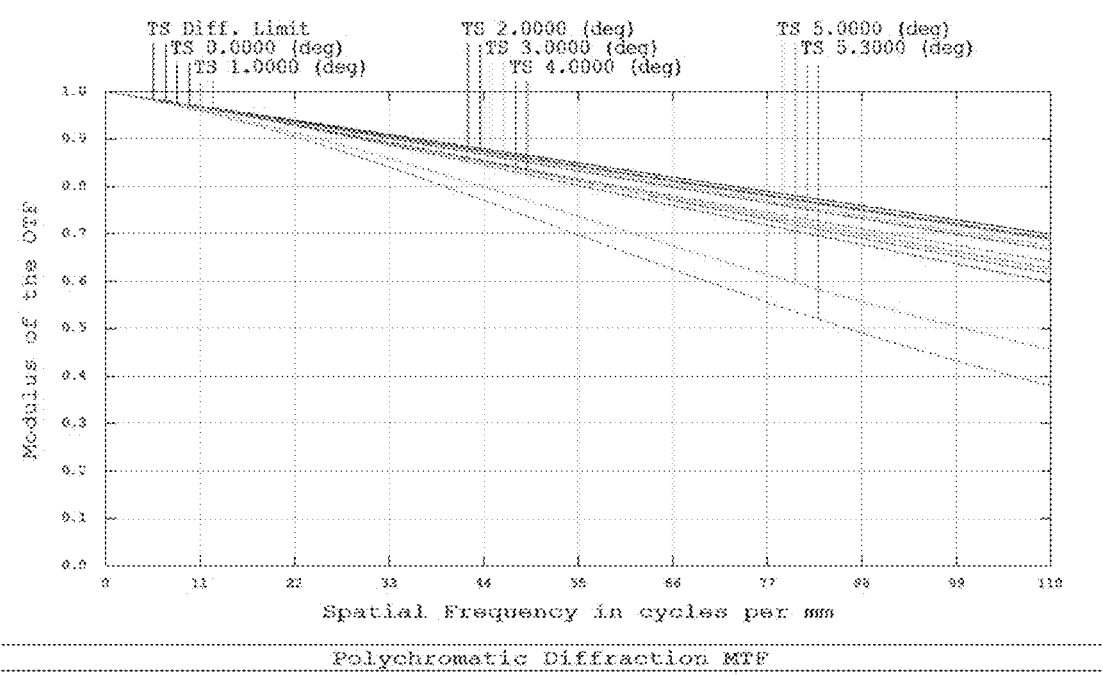
FIG. 8P is a set of graphs illustrating the modulus of the optical transfer function as a function of the spatial frequency (cycles/mm) in the embodiment of FIG. 8A.
Figure 8Q:
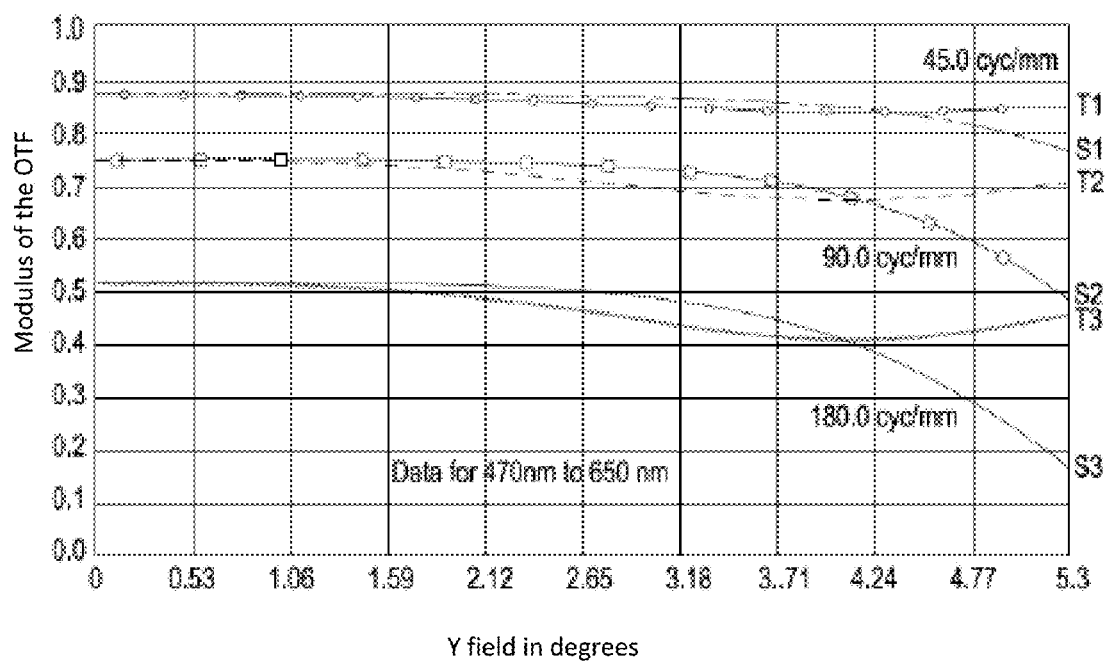
FIG. 8Q is graph illustrating the modulus of the optical transfer function (OTF) as a function of the field in the embodiment of FIG. 8A.

FIGS. 8B-8O are a set of graphs illustrating the transverse ray fan plot of the optical imaging system 700 shown in FIG. 8A. FIGS. 8B and 8C illustrate transverse ray fan plots for an object zero degrees off axis in the y-plane and the x-plane, respectively. FIGS. 8D and 8E illustrate transverse ray fan plots for an object one degree off axis in the y-plane and the x-plane, respectively. FIGS. 8F and 8G illustrate transverse ray fan plots for an object two degrees off axis in the y-plane and the x-plane, respectively. FIGS. 8H and 8I illustrate transverse ray fan plots for an object three degrees off axis in the y-plane and the x-plane, respectively. FIGS. 8J and 8K illustrate transverse ray fan plots for an object four degrees off axis in the y-plane and the x-plane, respectively. FIGS. 8L and 8M illustrate transverse ray fan plots for an object five degrees off axis in the y-plane and the x-plane, respectively. FIGS. 8N and 8O illustrate transverse ray fan plots for an object 5.300 degrees off axis in the y-plane and the x-plane, respectively. FIG. 8P is graph illustrating the modulus of the optical transfer function (OTF) as a function of the spatial frequency (cycles/mm) in the embodiment of FIG. 8A. FIG. 8Q is graph illustrating the modulus of the optical transfer function (OTF) as a function of the field in the embodiment of FIG. 8A.

Various materials having an absorption spectrum of visible light and high transmission for near infrared wavelengths are known. For example, Ultem XH6050, Extem XH1005, Extem UH1006 are suitable materials for making lens elements of the first, second, and third embodiments described above.

The following embodiments differ from the first, second, and third embodiments described above in that they are designed for visible light having wavelengths in the range between 400 nm and 700 nm whereas the first, second, and third embodiments are designed for wavelengths of about 700 nm or longer.

Ninth Embodiment

Figure 9A:
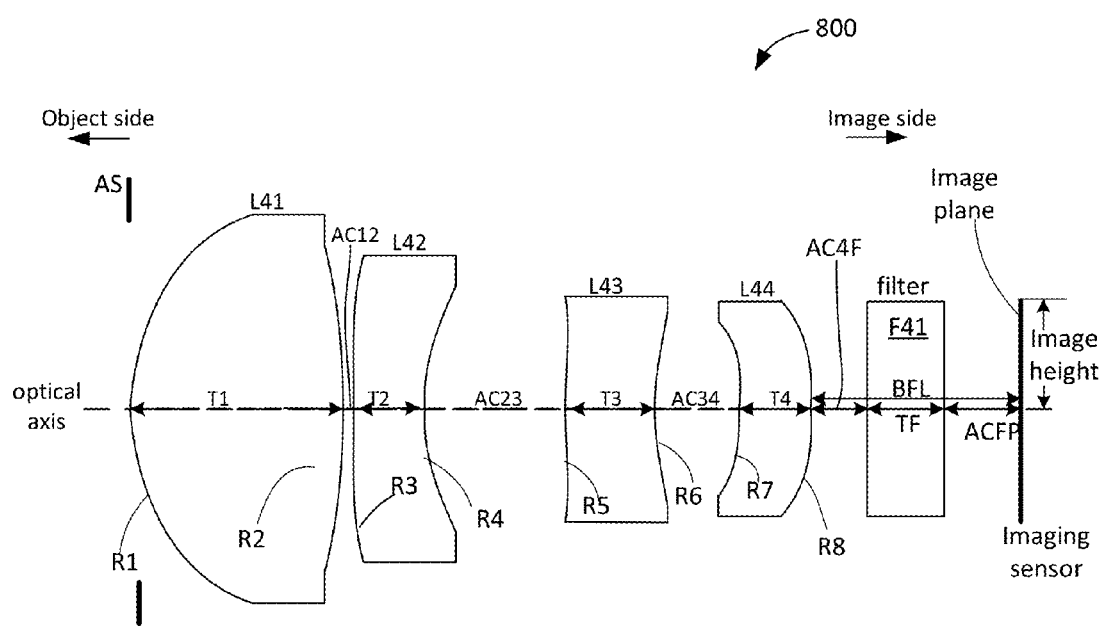
FIG. 9A is a simplified cross-section view of a four-element optical lens system according to an embodiment of the present invention.

FIG. 9A is a simplified cross sectional view of a four-element optical lens system 800 according to an embodiment of the present invention. Optical lens system 800 includes, an aperture stop AS, a first lens element L41, a second lens element L42, a third lens element L43, and a fourth lens element L44, arranged in order from the object side to the image side along the optical axis. Each lens element L41-L44 can be rotationally symmetric above the optical axis.

First lens element L41 has a positive refractive power. The object side surface of first lens element L41 has a convex portion in the vicinity of the optical axis and a convex portion in the outer circumferential region. The image-side surface of first lens element L41 has a convex port in the vicinity of the optical axis. Second lens element L42 has a negative refractive power and a concave image side surface in the vicinity of the optical axis. Third lens element L43 has a negative refractive power, a convex object-side along the optical axis, and a concave surface on the image side along the optical axis. Fourth lens element L44 has a negative refractive power, a concave object-side surface in the vicinity of the optical axis, and a convex image-side surface in the vicinity of the optical axis.

Optical lens system 800 also includes a filter F41 configured to pass light at visible wavelengths. Although filter F41 is shown as a single filter disposed between the fourth lens element and the image plane, filter F41 can be disposed in any other locations and can have one or more filter elements.

Referring to FIG. 9A, R1 and R2 are the respective object side and image side surface of first lens element L41. R3 and R4 are the respective object side and image side surface of second lens element L42. Similarly, R5 and R6 are the respective object-side and image-side surface of third lens element L43. Likewise, R7 and R8 are the respective object-side and image-side surface of fourth lens element L44.

In one embodiment, lens elements L41, L42, L43, and L44 each are made of a material, which passes visible light having wavelengths in the range from about 400 nm to about 700 nm.

Referring to FIG. 9A, T1 is the thickness of first lens element L41, T2 is the thickness of the second lens element L42, T3 is the thickness of the third lens element L43, and T4 is the thickness of the fourth lens element L44. Thicknesses T1-T4 are each measured along the optical axis.

AC12 is the air gap between the first and second lens elements, AC23 is the air gap between the second and third lens elements, and AC34 is the air gap between the third and fourth lens elements. Air gaps AC12, AC23, and AC34 are each measured along the optical axis. BFL denotes the back focal length, which is the distance between the image side of the fourth lens element and the image plane along the optical axis. BFL includes the thickness of the optical filter if the filter is disposed between the fourth lens element and the image plane. EFL denotes the effective focal length, which is also known as focal length.

In the following sections, ALT denotes the total thickness of the first to fourth lens elements, i.e., ALT=T1+T2+T3+T4. AAG denotes the total width of the air gaps of the first to fourth lens elements along the optical axis, i.e., AAG=AC12+AC23+AC34.

According to certain embodiments of the present invention, in order to reduce the total length of the optical lens system, the following measures can be taken: reducing the thickness of the lens elements and the air gaps between them. However, it is difficult to reduce the total thickness of the lens elements while maintaining adequate optical performance. Accordingly, the first lens element is designed to have a positive refractive power, the second lens element is designed to have a negative refractive power, the third lens element is designed to have a negative refractive power, and the fourth lens element is designed to have a negative refractive power. In order to increase the production yield and reduce manufacturing costs all fourth lens elements can be made of the same material. In one embodiment, the optical lens material has high transmission of visible light having for wavelengths in the range from 400 nm to 700 nm.

In one embodiment, all fourth lens elements L41, L42, L43, and L44 can be made of the same material and coated with an antireflective material. In certain embodiments, lens elements L41, L42, L43, and L44 may be made with different materials. In some specific embodiments, first and third lens elements L41, L43 may be made of the same first material, and second and fourth lens elements L42, L44 may be made of the same second material.

Table 9A shows numeric lens data of the lens elements of optical lens system 800 according to an embodiment of the present invention.

TABLE 9A

|  | Curvature Radius (1/mm) | Radius (mm) | Thickness/air gap (mm) | Refractive index | Abbe # |
|---|---|---|---|---|---|
| Object |  | Infinity | 10000 |  |  |
| Aperture stop | 0.00E+00 |  | −2.79E−01 |  |  |
| Lens 1 | 1.05E+00 | 9.53E−01 | T1 = 6.10E−01 | 1.544102 | 5.61E+01 |
|  | −3.54E−01 | −2.83E+00 | AC12 = 5.00E−02 |  |  |
| Lens 2 | 5.23E−02 | 1.91E+01 | T2 = 2.40E−01 | 1.639753 | 23.35202 |
|  | 8.11E−01 | 1.23E+00 | AC23 = 6.48E−01 |  |  |
| Lens 3 | 2.83E−01 | 3.54E+00 | T3 = 2.40E−01 | 1.544102 | 5.61E+01 |
|  | 1.20E+00 | 8.32E−01 | AC34 = 3.63E−01 |  |  |
| Lens 4 | −4.53E−01 | −2.21E+00 | T4 = 2.40E−01 | 1.544102 | 5.61E+01 |
|  | −8.91E−02 | −1.12E+01 | AC4F = 1.00E−01 |  |  |
| filter | 0.00E+00 |  | TF = 2.10E−01 | 1.5168 | 64.16 |
|  | 0.00E+00 |  | ACFP = 3.00E−01 |  |  |
| Image plane | 0.00E+00 |  | 0.00E+00 |  |  |

In this embodiment, the effective focal length (EFL) is 3.9999 mm, the half field of view (HFOV) is 7 degrees. The F number is 2.80. The image height is 0.4916 mm. The total length TTL from the object-side surface of the first lens element to the image plane is 3.0414 mm. The telephoto ratio is 0.75. The angular magnification is 2.4854. The diameter of the aperture stop is 1.666 mm. The diameter of the filter is 0.892 mm. AAG is 1.061 mm. The ratio of AAG/T3 is greater than 4. The ratio of AC23/T3 is greater than 2.

In this embodiment, the first lens element has a curvature radius R1 of 1.05 mm$^{-1}$ and a curvature radius R2 of −0.364 mm$^{-1}$. The second lens element has a curvature radius R3 of 0.0523 mm$^{-1}$ and a curvature radius R4 of 0.811 mm$^{-1}$. The third lens element has a curvature radius R5 of 0.283 mm$^{-1}$ and a curvature radius R6 of 1.20 mm$^{-1}$. The fourth lens element has a curvature radius R7 of −0.453 mm$^{-1}$ and a curvature radius R8 of −0.0891 mm$^{-1}$.

Table 9B shows numeric values of the conic constant K and aspheric surface coefficients for each of the aspheric lens surfaces of the four lens elements.

TABLE 9B

| Surface # | Semi-diameter (mm) | K | 2nd order term | 4th order term | 6th order term | 8th order term |
|---|---|---|---|---|---|---|
| R1 | 7.14E−01 | 0.00E+00 |  | −3.16E−02 | −5.23E−02 | −4.19E−01 |
| R2 | 6.74E−01 | 0.00E+00 |  | −1.14E−01 | 1.49E−01 |  |
| R3 | 6.11E−01 | 0.00E+00 |  | −4.18E−01 | 9.29E−01 |  |
| R4 | 5.01E−01 | 0.00E+00 |  | −1.80E−01 | 7.58E−01 |  |
| R5 | 3.87E−01 | 0.00E+00 |  | −4.42E−01 | −2.45E+00 |  |
| R6 | 3.60E−01 | 0.00E+00 |  | −8.90E−01 | −4.12E−01 |  |
| R7 | 3.64E−01 | 0.00E+00 |  | −3.81E+00 | 2.65E+00 |  |
| R8 | 4.31E−01 | 0.00E+00 |  | −3.48E+00 | 7.53E+00 | −9.47E+00 |

All order terms higher than the 8th order term are zeros.

FIGS. 9B-9Q are a set of graphs illustrating the transverse ray fan plot of the optical imaging system 800 shown in FIG. 9A. FIGS. 9B and 9C illustrate transverse ray fan plots for an object zero degrees off axis in the y-plane and the x-plane, respectively. FIGS. 9D and 9E illustrate transverse ray fan plots for an object one degree off axis in the y-plane and the x-plane, respectively. FIGS. 9F and 9G illustrate transverse ray fan plots for an object two degrees off axis in the y-plane and the x-plane, respectively. FIGS. 9H and 9I illustrate transverse ray fan plots for an object three degrees off axis in the y-plane and the x-plane, respectively. FIGS. 9J and 9K illustrate transverse ray fan plots for an object four degrees off axis in the y-plane and the x-plane, respectively. FIGS. 9L and 9M illustrate transverse ray fan plots for an object five degrees off axis in the y-plane and the x-plane, respectively. FIGS. 9N and 9O illustrate transverse ray fan plots for an object six degrees off axis in the y-plane and the x-plane, respectively. FIGS. 9P and 9Q illustrate transverse ray fan plots for an object seven degrees off axis in the y-plane and the x-plane, respectively.

Figure 9R:
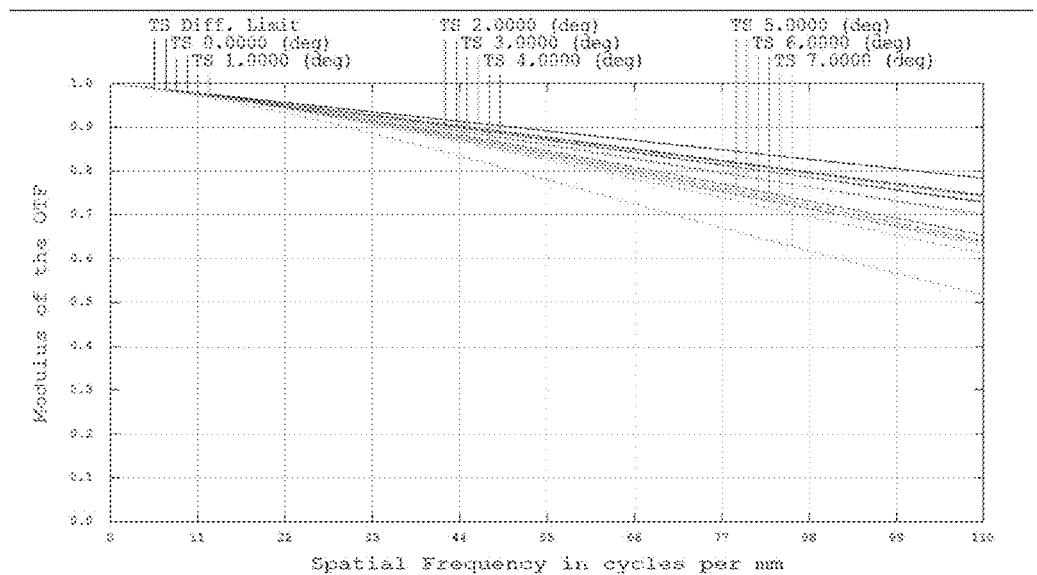
FIG. 9R is a set of graphs illustrating the modulus of the optical transfer function as a function of the spatial frequency (cycles/mm) in the embodiment of FIG. 9A.
Figure 9S:
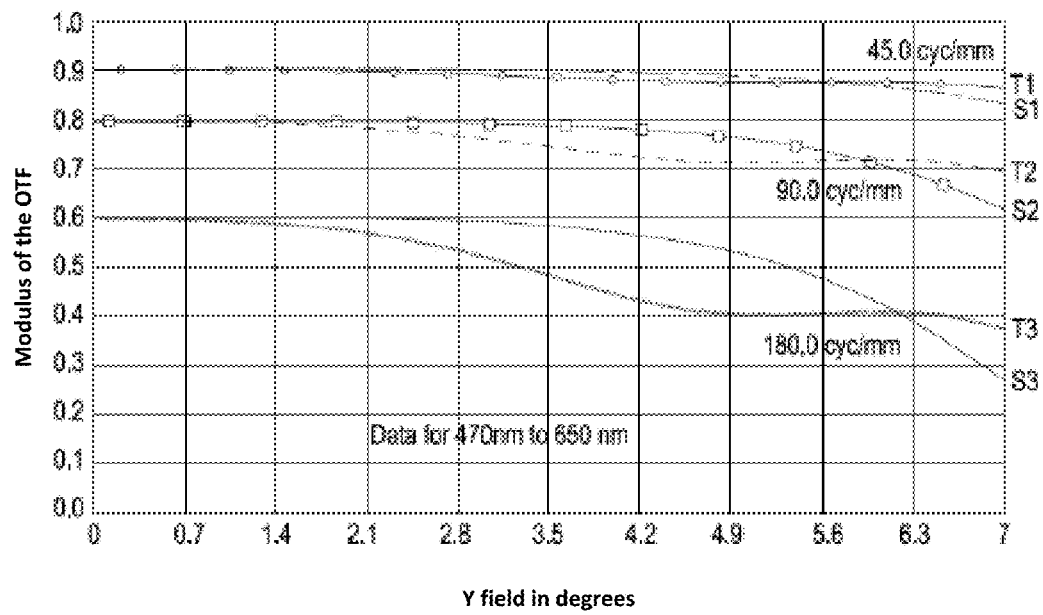
FIG. 9S is graph illustrating the modulus of the optical transfer function (OTF) as a function of the field in the embodiment of FIG. 9A.

FIG. 9R is graph illustrating the modulus of the optical transfer function (OTF) as a function of the spatial frequency (cycles/mm) in the embodiment of FIG. 9A. FIG. 9S is graph illustrating the modulus of the optical transfer function (OTF) as a function of the field in the embodiment of FIG. 9A.

Tenth Embodiment

Figure 10A:
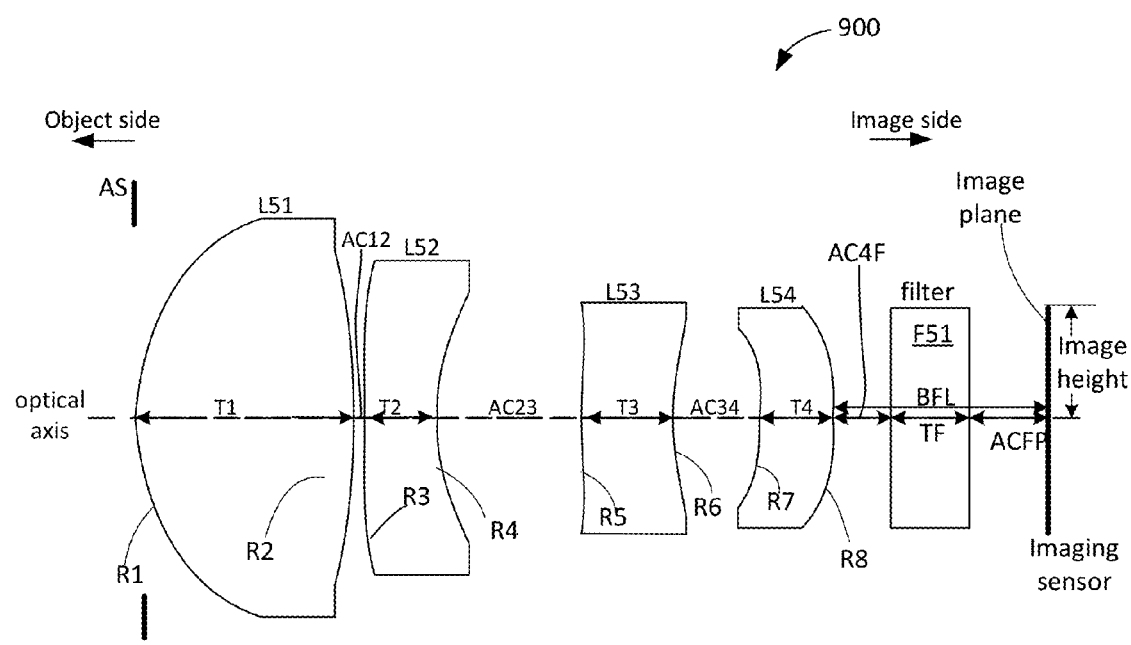
FIG. 10A is a simplified cross-section view of a four-element optical lens system according to an embodiment of the present invention.

FIG. 10A is a simplified cross sectional view of a four-element optical lens system 900 according to an embodiment of the present invention. Optical lens system 900 includes, an aperture stop AS, a first lens element L51, a second lens element L52, a third lens element L53, and a fourth lens element L54, arranged in order from the object side to the image side along the optical axis. Each lens element L51-L54 can be rotationally symmetric above the optical axis.

First lens element L51 has a positive refractive power. The object side surface of first lens element L51 has a convex portion in the vicinity of the optical axis and a convex portion in the outer circumferential region. The image-side surface of first lens element L51 has a convex port in the vicinity of the optical axis. Second lens element L52 has a negative refractive power and a concave image side surface in the vicinity of the optical axis. Third lens element L53 has a negative refractive power, a convex object-side along the optical axis, and a concave surface on the image side along the optical axis. Fourth lens element L54 has a negative refractive power, a concave object-side surface in the vicinity of the optical axis, and a convex image-side surface in the vicinity of the optical axis.

Optical lens system 900 also includes a filter F51 configured to pass light at visible wavelengths. Although filter F51 is shown as a single filter disposed between the fourth lens element and the image plane, filter F51 can be disposed in any other locations and can have one or more filter elements.

Referring to FIG. 10A, R1 and R2 are the respective object side and image side surface of first lens element L51. R3 and R4 are the respective object side and image side surface of second lens element L52. Similarly, R5 and R6 are the respective object-side and image-side surface of third lens element L53. Likewise, R7 and R8 are the respective object-side and image-side surface of fourth lens element L54.

In one embodiment, lens elements L51, L52, L53, and L54 each are made of a material, which passes visible light having wavelengths in the range from about 400 nm to about 700 nm.

Referring to FIG. 10A, T1 is the thickness of first lens element L51, T2 is the thickness of the second lens element L52, T3 is the thickness of the third lens element L53, and T4 is the thickness of the fourth lens element L54. Thicknesses T1-T4 are each measured along the optical axis. AC12 is the air gap between the first and second lens elements, AC23 is the air gap between the second and third lens elements, and AC34 is the air gap between the third and fourth lens elements. Air gaps AC12, AC23, and AC34 are each measured along the optical axis. BFL denotes the back focal length, which is the distance between the image side of the fourth lens element and the image plane along the optical axis. BFL includes the thickness of the optical filter if the filter is disposed between the fourth lens element and the image plane. EFL denotes the effective focal length, which is also known as focal length.

In the following sections, ALT denotes the total thickness of the first to fourth lens elements, i.e., ALT=T1+T2+T3+T4. AAG denotes the total width of the air gaps of the first to fourth lens elements along the optical axis, i.e., AAG=AC12+AC23+AC34.

According to certain embodiments of the present invention, in order to reduce the total length of the optical lens system, the following measures can be taken: reducing the thickness of the lens elements and the air gaps between them. However, it is difficult to reduce the total thickness of the lens elements while maintaining adequate optical performance. Accordingly, the first lens element is designed to have a positive refractive power, the second lens element is designed to have a negative refractive power, the third lens element is designed to have a negative refractive power, and the fourth lens element is designed to have a negative refractive power. In order to increase the production yield and reduce manufacturing costs all fourth lens elements can be made of the same material. In one embodiment, the optical lens material has high transmission of visible light having for wavelengths in the range from 400 nm to 700 nm.

In one embodiment, all fourth lens elements L51, L52, L53, and L54 can be made of the same material and coated with an antireflective material. In certain embodiments, lens elements L51, L52, L53, and L54 may be made with different materials. In some specific embodiments, first and third lens elements L51, L53 may be made of a same first material, and second and fourth lens elements L52, L54 may be made of a same second material.

Table 10A shows numeric lens data of the lens elements of optical lens system 900 according to an embodiment of the present invention.

TABLE 10A

|  | Curvature Radius (1/mm) | Radius (mm) | Thickness/air gap (mm) | Refractive index | Abbe # |
|---|---|---|---|---|---|
| Object |  | Infinity | 10000 |  |  |
| Aperture stop | 0.00E+00 |  | −2.79E−01 |  |  |
| Lens 1 | 1.06E+00 | 9.47E−01 | T1 = 6.06E−01 | 1.544102 | 5.61E+01 |
|  | −3.48E−01 | −2.87E+00 | AC12 = 5.00E−02 |  |  |
| Lens 2 | 7.69E−02 | 1.30E+01 | T2 = 2.40E−01 | 1.639753 | 23.35202 |
|  | 8.18E−01 | 1.22E+00 | AC23 = 6.30E−01 |  |  |
| Lens 3 | 1.87E−01 | 5.35E+00 | T3 = 2.40E−01 | 1.639753 | 23.35202 |
|  | 1.03E+00 | 9.73E−01 | AC34 = 3.84E−01 |  |  |

TABLE 10A-continued

|  | Curvature Radius (1/mm) | Radius (mm) | Thickness/air gap (mm) | Refractive index | Abbe # |
| --- | --- | --- | --- | --- | --- |
| Lens 4 | −4.09E−01 | −2.45E+00 | T4 = | 1.544102 | 5.61E+01 |
|  | −9.64E−02 | −1.04E+01 | AC4F = 1.00E−01 |  |  |
| filter | 0.00E+00 |  | TF = 2.10E−01 | 1.5168 | 64.16 |
|  | 0.00E+00 |  | ACFP = 3.00E−01 |  |  |
| Image plane | 0.00E+00 |  | 0.00E+00 |  |  |

In this embodiment, the effective focal length (EFL) is 3.9999 mm, the half field of view (HFOV) is 7 degrees. The F number is 2.802. The image height is 0.4916 mm. The total length TTL from the object-side surface of the first lens element to the image plane is 3.0414 mm. The telephoto ratio is 0.75. The angular magnification is 2.4597. The diameter of the aperture stop is 1.428 mm. The diameter of the filter is 0.916 mm. AAG is 1.064 mm. The ratio of AAG/T3 is greater than 4. The ratio of AC23/T3 is greater than 2.

In this embodiment, the first lens element has a curvature radius R1 of 1.06 mm$^{-1}$ and a curvature radius R2 of −0.348 mm$^{-1}$. The second lens element has a curvature radius R3 of 0.0769 mm$^{-1}$ and a curvature radius R4 of 0.818 mm$^{-1}$. The third lens element has a curvature radius R5 of 0.187 mm$^{-1}$ and a curvature radius R6 of 1.03 mm$^{-1}$. The fourth lens element has a curvature radius R7 of −0.409 mm$^{-1}$ and a curvature radius R8 of −0.0964 mm$^{-1}$.

Table 10B shows numeric values of the conic constant K and aspheric surface coefficients for each of the aspheric lens surfaces of the four lens elements.

TABLE 10B

| Surface # | Semi-diameter (mm) | K | 2nd order term | 4th order term | 6th order term | 8th order term |
| --- | --- | --- | --- | --- | --- | --- |
| R1 | 7.14E−01 | 0.00E+00 |  | −4.00E−02 | −6.83E−02 | −4.03E−01 |
| R2 | 6.74E−01 | 0.00E+00 |  | −1.01E−01 | 1.49E−01 |  |
| R3 | 6.11E−01 | 0.00E+00 |  | −3.94E−01 | 9.39E−01 |  |
| R4 | 5.02E−01 | 0.00E+00 |  | −2.19E−01 | 7.31E−01 |  |
| R5 | 3.82E−01 | 0.00E+00 |  | −7.77E−01 | −2.24E+00 |  |
| R6 | 3.65E−01 | 0.00E+00 |  | −1.16E+00 | −6.59E−01 |  |
| R7 | 3.67E−01 | 0.00E+00 |  | −3.44E+00 | 1.73E−01 |  |
| R8 | 4.33E−01 | 0.00E+00 |  | −3.14E+00 | 5.57E+00 | −5.71E+00 |

All order terms higher than the 8th order term are zeros.

FIGS. 10B-10Q are a set of graphs illustrating the transverse ray fan plot of the optical imaging system 900 shown in FIG. 10A. FIGS. 10B and 10C illustrate transverse ray fan plots for an object zero degrees off axis in the y-plane and the x-plane, respectively. FIGS. 10D and 10E illustrate transverse ray fan plots for an object one degree off axis in the y-plane and the x-plane, respectively. FIGS. 10F and 10G illustrate transverse ray fan plots for an object two degrees off axis in the y-plane and the x-plane, respectively. FIGS. 10H and 10I illustrate transverse ray fan plots for an object three degrees off axis in the y-plane and the x-plane, respectively. FIGS. 10J and 10K illustrate transverse ray fan plots for an object four degrees off axis in the y-plane and the x-plane, respectively. FIGS. 10L and 10M illustrate transverse ray fan plots for an object five degrees off axis in the y-plane and the x-plane, respectively. FIGS. 10N and 10O illustrate transverse ray fan plots for an object six degrees off axis in the y-plane and the x-plane, respectively. FIGS. 10P and 10Q illustrate transverse ray fan plots for an object seven degrees off axis in the y-plane and the x-plane, respectively.

Figure 10R:
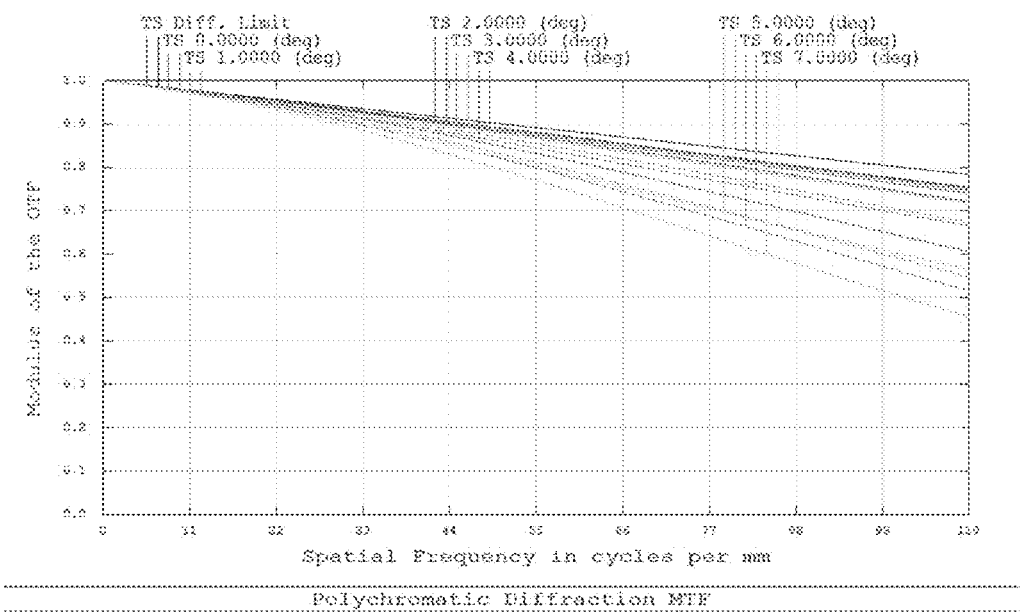
FIG. 10R is a set of graphs illustrating the modulus of the optical transfer function as a function of the spatial frequency (cycles/mm) in the embodiment of FIG. 10A.
Figure 10S:
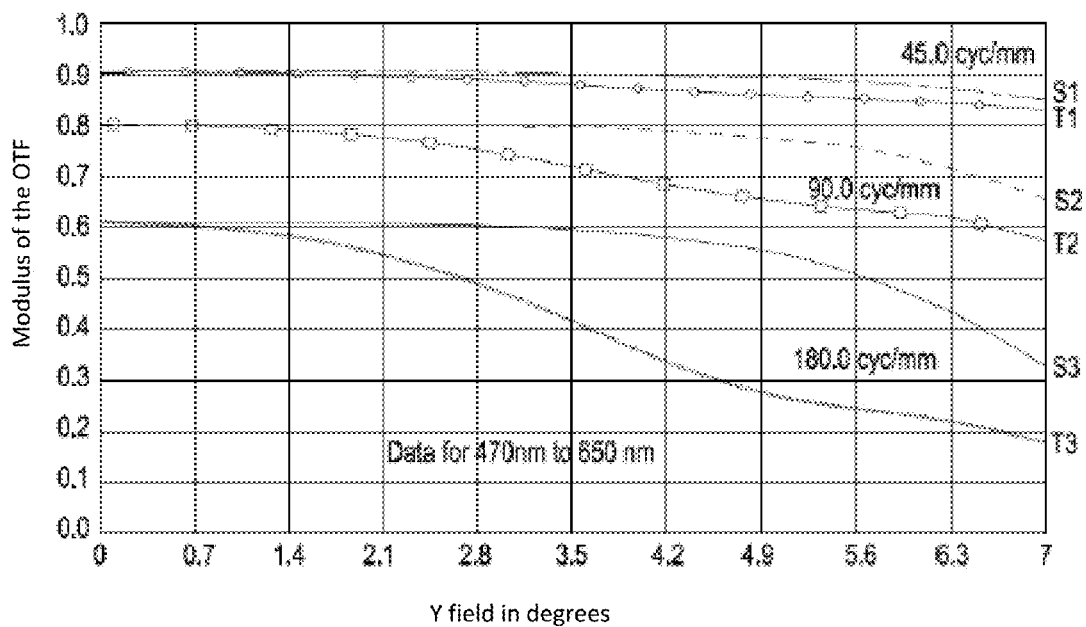
FIG. 10S is graph illustrating the modulus of the optical transfer function (OTF) as a function of the field in the embodiment of FIG. 10A.

FIG. 10R is graph illustrating the modulus of the optical transfer function (OTF) as a function of the spatial frequency (cycles/mm) in the embodiment of FIG. 10A. FIG. 10S is graph illustrating the modulus of the optical transfer function (OTF) as a function of the field in the embodiment of FIG. 10A.

Eleventh Embodiment

Figure 11A:
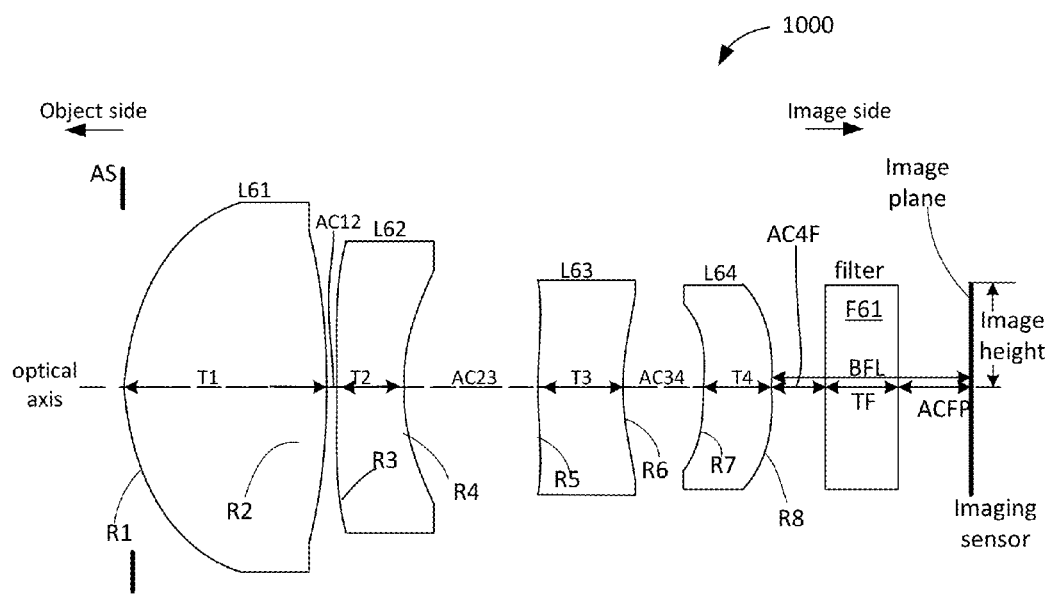
FIG. 11A is a simplified cross-section view of a four-element optical lens system according to an embodiment of the present invention.

FIG. 11A is a simplified cross sectional view of a four-element optical lens system 1000 according to an embodiment of the present invention. Optical lens system 1000 includes, an aperture stop AS, a first lens element L61, a second lens element L62, a third lens element L63, and a fourth lens element L64, arranged in order from the object side to the image side along the optical axis. Each lens element L61-L64 can be rotationally symmetric above the optical axis.

First lens element L61 has a positive refractive power. The object side surface of first lens element L61 has a convex portion in the vicinity of the optical axis and a convex portion in the outer circumferential region. The image-side surface of first lens element L61 has a convex portion in the vicinity of the optical axis. Second lens element L62 has a negative refractive power; the image-side surface of second lens element L62 has a concave portion in the vicinity of the optical axis. Third lens element L63 has a negative refractive power, the object-side surface of third lens element L63 has a convex portion in the proximity of the optical axis, and the image-side surface of third lens element L63 has a concave portion in the proximity of the optical axis. Fourth lens element L64 has a negative refractive power, a concave object-side surface in the vicinity of the optical axis, and a convex image-side surface in the vicinity of the optical axis.

Optical lens system 1000 also includes a filter F61 configured to pass light at visible wavelengths. Although filter F61 is shown as a single filter disposed between the fourth lens element and the image plane, filter F61 can be disposed in any other locations and can have one or more filter elements.

Referring to FIG. 11A, R1 and R2 are the respective object side and image side surface of first lens element L61.

R3 and R4 are the respective object side and image side surface of second lens element L62. Similarly, R5 and R6 are the respective object-side and image-side surface of third lens element L63. Likewise, R7 and R8 are the respective object-side and image-side surface of fourth lens element L64.

In one embodiment, lens elements L61, L62, L63, and L64 each are made of a material, which passes visible light having wavelengths in the range from about 400 nm to about 700 nm.

Referring to FIG. 11A, T1 is the thickness of first lens element L61, T2 is the thickness of the second lens element L62, T3 is the thickness of the third lens element L63, and T4 is the thickness of the fourth lens element L64. Thicknesses T1-T4 are each measured along the optical axis. AC12 is the air gap between the first and second lens elements, AC23 is the air gap between the second and third lens elements, and AC34 is the air gap between the third and fourth lens elements. Air gaps AC12, AC23, and AC34 are each measured along the optical axis. BFL denotes the back focal length, which is the distance between the image side of the fourth lens element and the image plane along the optical axis. BFL includes the thickness of the optical filter if the filter is disposed between the fourth lens element and the image plane. EFL denotes the effective focal length, which is also known as focal length.

In the following sections, ALT denotes the total thickness of the first to fourth lens elements, i.e., ALT=T1+T2+T3+T4. AAG denotes the total width of the air gaps of the first to fourth lens elements along the optical axis, i.e., AAG=AC12+AC23+AC34.

According to certain embodiments of the present invention, in order to reduce the total length of the optical lens system, the following measures can be taken: reducing the thickness of the lens elements and the air gaps between them. However, it is difficult to reduce the total thickness of the lens elements while maintaining adequate optical performance. Accordingly, the first lens element is designed to have a positive refractive power, the second lens element is designed to have a negative refractive power, the third lens element is designed to have a negative refractive power, and the fourth lens element is designed to have a negative refractive power. In order to increase the production yield and reduce manufacturing costs all fourth lens elements can be made of the same material. In one embodiment, the optical lens material has high transmission of visible light having for wavelengths in the range from 400 nm to 700 nm.

In one embodiment, all fourth lens elements L61, L62, L63, and L64 can be made of the same material and coated with an antireflective material. In certain embodiments, lens elements L61, L62, L63, and L64 may be made with different materials. In some specific embodiments, first and third lens elements L61, L43 may be made of a first material and second and fourth lens elements L62, L64 may be made of a second material.

Table 11A shows numeric lens data of the lens elements of optical lens system 1000 according to an embodiment of the present invention.

TABLE 11A

|  | Curvature Radius (1/mm) | Radius (mm) | Thickness/air gap (mm) | Refractive index | Abbe # |
| --- | --- | --- | --- | --- | --- |
| Object |  | Infinity | 10,000 |  |  |
| Aperture stop |  |  | −2.79E−01 |  |  |
| Lens 1 | 1.05E+00 | 9.51E−01 | T1 = 6.08E−01 | 1.544102 | 56.1 |
|  | −3.52E−01 | −2.84E+00 | AC12 = 5.00E−02 |  |  |
| Lens 2 | 6.34E−02 | 1.58E+01 | T2 = 2.40E−01 | 1.639753 | 23.35202 |
|  | 8.13E−01 | 1.23E+00 | AC23 = 6.38E−01 |  |  |
| Lens 3 | 1.97E−01 | 5.08E+00 | T3 = 2.40E−01 | 1.544102 | 56.1 |
|  | 1.07E+00 | 9.38E−01 | AC34 = 3.74E−01 |  |  |
| Lens 4 | −5.61E−01 | −1.78E+00 | T4 = 2.40E−01 | 1.639753 | 23.35202 |
|  | −1.93E−01 | −5.18E+00 | AC4F = 1.00E−01 |  |  |
| filter |  |  | TF = 2.10E−01 | 1.5168 | 64.16 |
|  |  |  | ACFP = 3.00E−01 |  |  |
| Image plane |  |  | 0.00E+00 |  |  |

In this embodiment, the effective focal length (EFL) is 3.9999 mm, the half field of view (HFOV) is 7 degrees. The F number is 2.802. The image height is 0.4916 mm. The total length TTL from the object-side surface of the first lens element to the image plane is 3.00 mm. The telephoto ratio (TTL/EFL) is 0.75. The angular magnification is 2.4877. The diameter of the aperture stop is 1.428 mm. The diameter of the filter is 0.894 mm. AAG is 1.062 mm. The ratio of AAG/T3 is greater than 4. The ratio of AC23/T3 is greater than 2.

Table 11B shows numeric values of the conic constant K and aspheric surface coefficients for each of the aspheric lens surfaces of the four lens elements.

TABLE 11B

| Surface # | Semi-diameter (mm) | K | 2nd order term | 4th order term | 6th order term | 8th order term |
| --- | --- | --- | --- | --- | --- | --- |
| R1 | 7.14E−01 | 0.00E+00 |  | −3.44E−02 | −5.86E−02 | −4.09E−01 |
| R2 | 6.74E−01 | 0.00E+00 |  | −1.06E−01 | 1.45E−01 |  |
| R3 | 6.10E−01 | 0.00E+00 |  | −4.01E−01 | 9.20E−01 |  |
| R4 | 5.00E−01 | 0.00E+00 |  | −1.77E−01 | 7.64E−01 |  |
| R5 | 3.87E−01 | 0.00E+00 |  | −3.88E−01 | −2.40E+00 |  |

TABLE 11B-continued

| Surface # | Semi-diameter (mm) | K | 2nd order term | 4th order term | 6th order term | 8th order term |
|---|---|---|---|---|---|---|
| R6 | 3.61E−01 | 0.00E+00 | | −7.36E−01 | −6.49E−01 | |
| R7 | 3.62E−01 | 0.00E+00 | | −3.43E+00 | 1.47E+00 | |
| R8 | 4.32E−01 | 0.00E+00 | | −3.02E+00 | 6.15E+00 | −7.76E+00 |

All order terms higher than the 8th order term are zeros.

FIGS. 11B-11Q are a set of graphs illustrating the transverse ray fan plot of the optical imaging system 1000 shown in FIG. 11A. FIGS. 11B and 11C illustrate transverse ray fan plots for an object zero degrees off axis in the y-plane and the x-plane, respectively. FIGS. 11D and 11E illustrate transverse ray fan plots for an object one degree off axis in the y-plane and the x-plane, respectively. FIGS. 11F and 11G illustrate transverse ray fan plots for an object two degrees off axis in the y-plane and the x-plane, respectively. FIGS. 11H and 11I illustrate transverse ray fan plots for an object three degrees off axis in the y-plane and the x-plane, respectively. FIGS. 11J and 11K illustrate transverse ray fan plots for an object four degrees off axis in the y-plane and the x-plane, respectively. FIGS. 11L and 11M illustrate transverse ray fan plots for an object five degrees off axis in the y-plane and the x-plane, respectively. FIGS. 11N and 11O illustrate transverse ray fan plots for an object six degrees off axis in the y-plane and the x-plane, respectively. FIGS. 11P and 11Q illustrate transverse ray fan plots for an object seven degrees off axis in the y-plane and the x-plane, respectively.

Figure 11R:
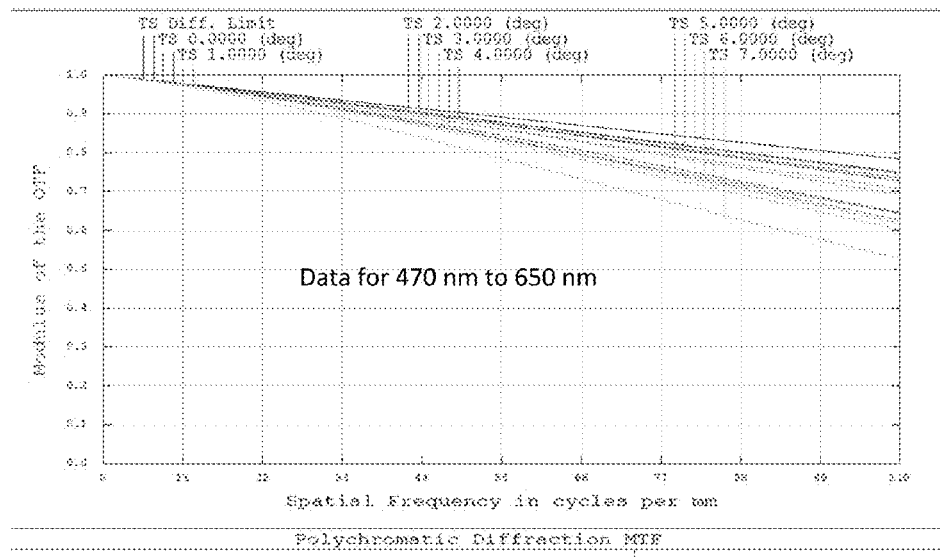
FIG. 11R is a set of graphs illustrating the modulus of the optical transfer function as a function of the spatial frequency (cycles/mm) in the embodiment of FIG. 11A.
Figure 11S:
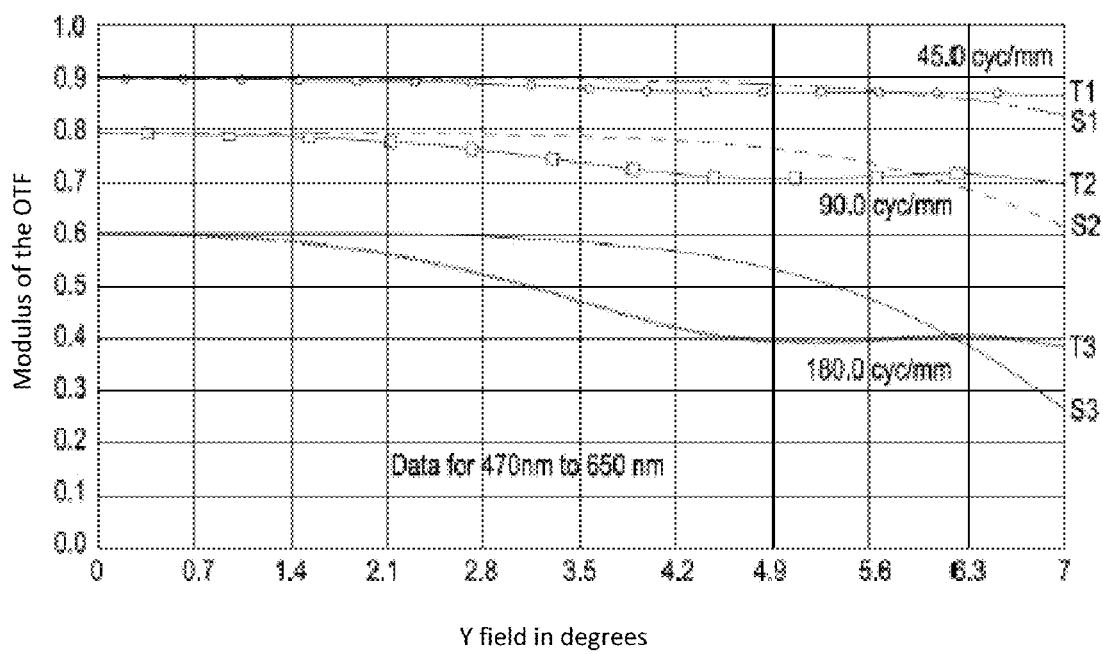
FIG. 11S is graph illustrating the modulus of the optical transfer function (OTF) as a function of the field in the embodiment of FIG. 11A.

FIG. 11R is graph illustrating the modulus of the optical transfer function (OTF) as a function of the spatial frequency (cycles/mm) in the embodiment of FIG. 11A. FIG. 11S is graph illustrating the modulus of the optical transfer function (OTF) as a function of the field in the embodiment of FIG. 11A.

Twelfth Embodiment

Figure 12A:
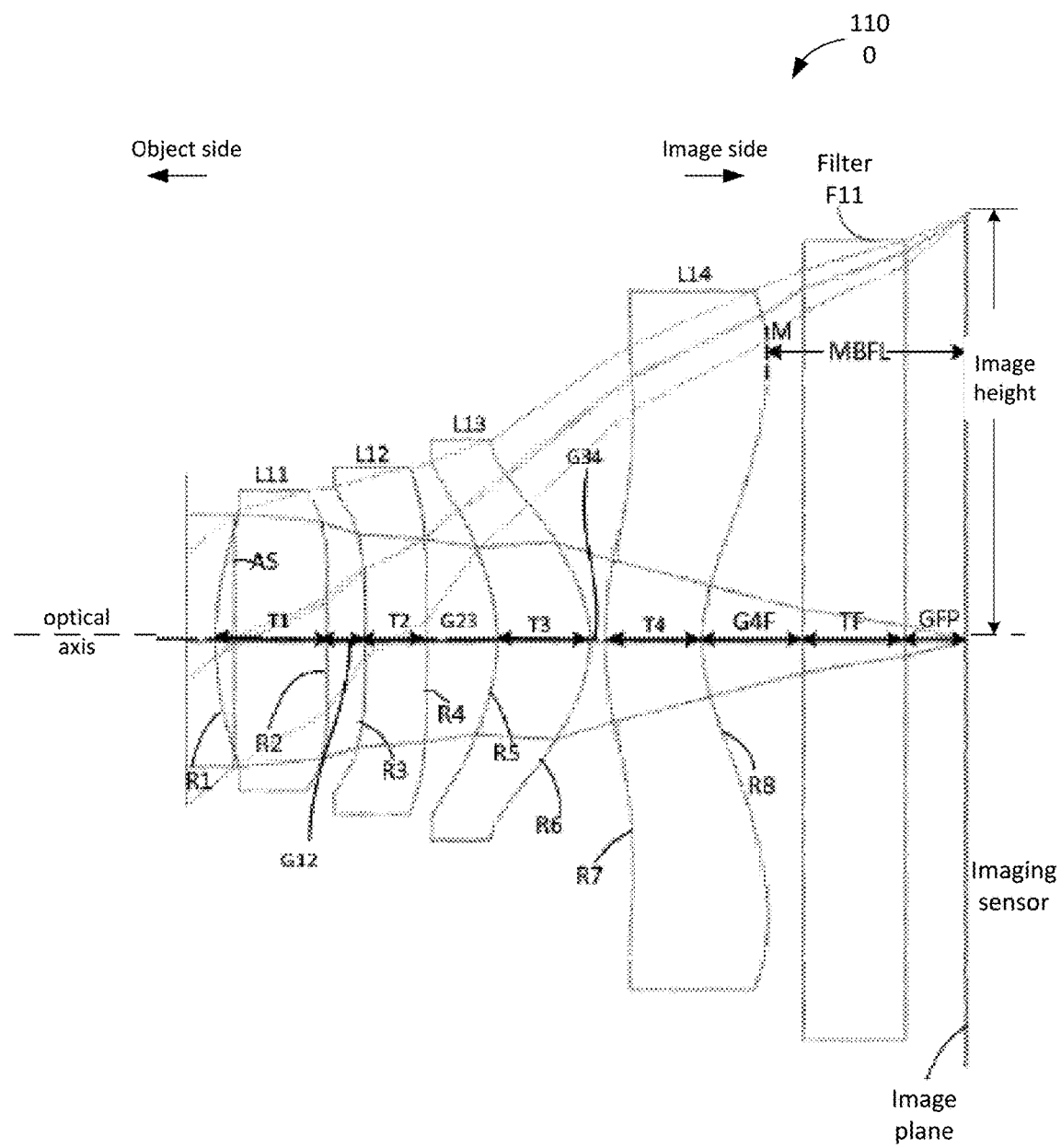
FIG. 12A is a simplified cross-section view of a four-element optical lens system according to an embodiment of the present invention.

FIG. 12A is a simplified cross-section view of a four-element optical lens system 1100 according to a first embodiment of the present invention. Optical lens system 1100 comprises an aperture stop AS, a first lens element L11, a second lens element L12, a third lens element L13, and a fourth lens element L14, arranged in order from the object side to the image side along the optical axis. Each lens element L11-L14 can be rotationally symmetric above the optical axis.

First lens element L11 has a positive refractive power, a convex object-side portion in the vicinity of the optical axis, a convex object-side portion in the outer circumferential region, a concave image-side portion in the vicinity of the optical axis, and a convex image-side portion in the outer circumferential region. Second lens element L12 has a negative refractive power, a concave object-side portion in the vicinity of the optical axis, a concave object-side portion in the outer circumferential region, a convex image-side portion in the vicinity of the optical axis, and a convex image side portion in the outer circumferential region. Third lens element L13 has a positive refractive power, a concave object-side portion in the vicinity of the optical axis, a concave object-side portion in the outer circumferential region, a convex image-side portion in the vicinity of the optical axis, and a convex image side portion in the outer circumferential region. Fourth lens element L14 has a negative refractive power, a convex object-side portion in the vicinity of the optical axis, a concave object-side portion in the outer circumferential region, a concave image-side portion in the vicinity of the optical axis, and a convex image-side portion in the outer circumferential region.

Optical lens system 1100 further includes a filter F11 disposed between fourth lens element L14 and an imaging sensor. In an embodiment, filter F11 may be made of glass that is opaque to visible light and transparent to infrared radiation.

Optical lens system 1100 further includes an aperture stop AS disposed in front of first lens element L11.

Referring to FIG. 12A, R1 and R2 are the respective object side and image side surface of first lens element L11. R3 and R4 are the respective object side and image side surface of second lens element L12. Similarly, R5 and R6 are the respective object-side and image-side surface of third lens element L13. Likewise, R7 and R8 are the respective object-side and image-side surface of fourth lens element L14.

In one embodiment, lens elements L11, L12, L13, and L14 each are made of the same material, which passes near infrared light having a wavelength in a range about 900 nm to about 980 nm and have a high absorption for visible light. In a specific embodiment, the material of lens elements L11, L12, L13, and L14 has a transmission peak at 940 nm. In some embodiments, lens elements may be made of plastic.

Still referring to FIG. 12A, T1 is the thickness of first lens element L11, T2 is the thickness of the second lens element L12, T3 is the thickness of the third lens element L13, and T4 is the thickness of the fourth lens element L14. Thicknesses T1-T4 are each measured along the optical axis. G12 is the air gap between the first and second lens elements. G23 is the air gap between the second and third lens elements, and G34 is the air gap between the third and fourth lens elements. Air gaps G12, G23, and G34 are each measured along the optical axis. BFL denotes the back focal length, which is the distance between the image side of the fourth lens element and the image plane along the optical axis. BFL includes the thickness of the optical filter if the filter is disposed between the fourth lens element and the image plane. EFL denotes the effective focal length, which is also known as focal length. MBFL denotes the distance between the highest protruding point M of the image side of the fourth lens element and the image plane along the optical axis.

In the following sections, ALT denotes the total thickness of the first to fourth lens elements, i.e., ALT=T1+T2+T3+T4. AAG denotes the total width of the air gaps of the first to fourth lens elements along the optical axis, i.e., AAG=G12+G23+G34.

Table 12A shows numeric lens data of the lens elements of optical lens system 1100 according to an embodiment of the present invention. All four lens elements are made of the same plastic material to simplify the manufacturing process and reduce the manufacturing costs.

TABLE 12A

| | Radius (mm) | Thickness/air gap (mm) | Refractive index | Abbe # | Focal length |
|---|---|---|---|---|---|
| Aper. Stop | infinity | −0.091 | | | |
| Lens 11 | 1.607 | T1 = 0.550 | 1.54 | 49.9 | 3.144 |
| R1 | | | | | |
| R2 | 30.068 | G12 = 0.186 | | | |
| Lens 12 | −12.787 | T2 = 0.300 | 1.63 | 23.3 | −34.242 |
| R3 | | | | | |
| R4 | −33.168 | G23 = 0.345 | | | |
| Lens 13 | −1.002 | T3 = 0.453 | 1.63 | 23.3 | 2.093 |
| R5 | | | | | |
| R6 | −0.658 | G34 = 0.080 | | | |
| Lens 14 | 1.844 | T4 = 0.462 | 1.54 | 49.9 | −2.572 |
| R7 | | | | | |
| R8 | 0.720 | G4F = 0.501 | | | |
| filter | infinity | TF = 0.500 | | | |
| Filter to image plane | infinity | GFP = 0.298 | | | |
| Image plane | infinity | | | | |

In this embodiment, the effective focal length (EFL) is 2.5 mm, the half field of view (HFOV) is 39.5 degrees. The F number is 2.0. The MBFL is 0.973 mm. The total length from the object-side surface of the first lens element to the image plane is about 3.675 mm. The object-side and image-side surfaces of the four lens elements are even aspheric.

According to this embodiment, the air gap G12 between the first and second lens elements is about 0.186 mm along the optic axis. The air gap G23 between the second and third lens elements is about 0.345 mm, and the air gap G34 between the third and fourth lens elements is about 0.08 mm along the optical axis. The filter may be made of glass and has a thickness of about 0.5 mm. The filter is disposed at about 0.501 mm from the image-side of fourth lens element L14 and 0.298 mm from the image plane along the optical axis. In the embodiment, the sum of all air gaps AAG between the first through the fourth lens elements is 0.611 mm. The total thickness ALT of the first to fourth lens elements is 1.765 mm.

According to certain embodiments of the present invention, in order to reduce the total length of the optical lens system, the following measures can be taken: reducing the thickness of the lens elements and the air gaps between them. However, it is difficult to reduce the total thickness of the lens elements while maintaining adequate optical performance. Accordingly, the first lens element is designed to have a positive refractive power, the second lens element is designed to have a negative refractive power, and the third lens element is designed to have a positive refractive power. In order to increase the production yield and reduce manufacturing costs all three lens elements can be made of the same material. In one embodiment, the optical lens material has an absorption spectrum of visible light with a wavelength in the range between 400 nm and 700 nm, while having high transmission for wavelengths above 850 nm, preferably between 900 nm and 980 nm, and more preferably between 930 nm and 950 nm.

According to the twelfth embodiment, the first lens element has a positive refractive power, a convex portion on the object-side in the vicinity of the optical axis, and a concave portion on the image-side in the vicinity of the optical axis. The second lens element has a negative refractive power, a concave portion on the object-side in the vicinity of the optical axis, and a convex surface on the image-side in the vicinity of the optical axis. The third lens element has a positive refractive power, a concave portion on the object-side in the vicinity of the optical axis, and a convex portion in the vicinity of the optical axis. The fourth lens element has a negative a refractive power, a convex image-side portion in the vicinity of the optical axis, and a convex image-side portion in the vicinity of the optical axis. The object-side and image-side surfaces of the four lens elements are even aspheric. The combination of these four lens elements provides the desired lens system quality.

Table 12B shows numeric lens data of the conic constant K and aspheric surface coefficients as for each of the lens surfaces of optical lens system 1100 according to the twelfth embodiment of the present invention.

TABLE 12B

| Surface # | K | a4 | a6 | a8 | a10 | a12 | a14 | a16 |
|---|---|---|---|---|---|---|---|---|
| R1 | 0.00E+00 | −7.16E−02 | 2.19E−01 | −1.50E+00 | 3.83E+00 | −5.47E+00 | 2.28E+00 | 0.00E+00 |
| R2 | 0.00E+00 | −1.90E−01 | −4.84E−01 | 3.70E−01 | −2.33E−01 | 0.00E+00 | 0.00E+00 | 0.00E+00 |
| R3 | 0.00E+00 | −3.15E−01 | −1.14E−01 | −1.78E+00 | 4.07E+00 | −1.95E+00 | 0.00E+00 | 0.00E+00 |
| R4 | 0.00E+00 | −6.93E−02 | 7.66E−02 | −1.05E+00 | 2.20E+00 | −2.10E+00 | 8.74E−01 | 0.00E+00 |
| R5 | 0.00E+00 | 2.70E−01 | −7.99E−02 | 4.74E−01 | −1.33E+00 | 1.86E+00 | −7.59E−01 | 0.00E+00 |
| R6 | −8.98E−01 | 5.34E−01 | −1.27E+00 | 2.83E+00 | −4.12E+00 | 3.55E+00 | −1.20E+00 | 0.00E+00 |
| R7 | 0.00E+00 | −2.44E−01 | 9.75E−02 | −2.58E−02 | −3.57E−03 | 4.44E−03 | −8.67E−04 | 0.00E+00 |
| R8 | −5.22E+00 | −1.09E−01 | 7.43E−02 | −5.12E−02 | 2.54E−02 | −8.35E−03 | 1.56E−03 | −1.24E−04 |

All order terms higher than the 16th order term are zeros.

FIG. 12B is a set of graphs illustrating the astigmatism for the sagittal and tangential image surface in the embodiment of FIG. 12A.

FIG. 12C is the optical distortion of the embodiment of FIG. 12A.

Thirteenth Embodiment

Figure 13A:
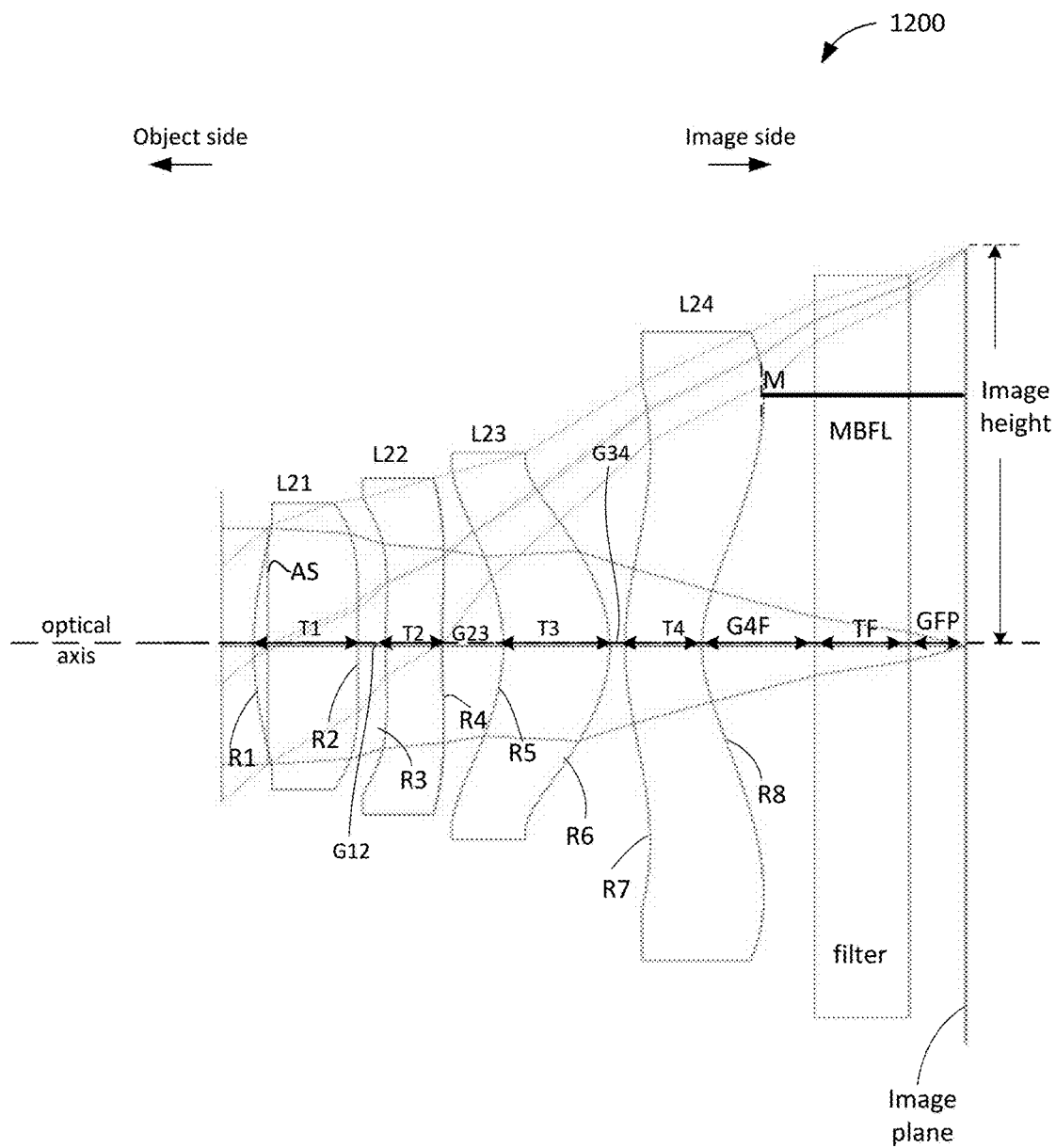
FIG. 13A is a simplified cross-section view of a four-element optical lens system according to an embodiment of the present invention.

FIG. 13A is a simplified cross sectional view of a four-element optical lens system 1200 according to an embodiment of the present invention. Optical lens system 1200 includes an aperture stop AS, a first lens element L21, a second lens element L22, a third lens element L23, and a fourth lens element L24, arranged in order from the object side to the image side along the optical axis. Each lens element L21-L24 can be rotationally symmetric above the optical axis.

First lens element L21 has a positive refractive power, a convex object-side portion in the vicinity of the optical axis, a convex object-side portion in the outer circumferential region, a concave image-side portion in the vicinity of the optical axis, and a convex image-side portion in the outer circumferential region. Second lens element L22 has a positive refractive power, a convex object-side portion in the vicinity of the optical axis, a concave object-side portion in the outer circumferential region, a concave image-side portion in the vicinity of the optical axis and a convex image side portion in the outer circumferential region. Third lens element L23 has a positive refractive power, a concave object-side portion along the optical axis, a concave object-side portion in the outer circumferential region, a convex image-side portion in the vicinity of the optical axis, and a concave image side portion on the image side in the outer circumferential region. Fourth lens element L24 has a negative refractive power, a convex object-side portion in the vicinity of the optical axis, a concave object-side portion in the outer circumferential region, a concave image-side portion in the vicinity of the optical axis, and a convex image-side portion in the outer circumferential region.

Optical lens system 1200 also includes a filter F21 configured to block the passage of light at visible wavelengths. In some embodiments, the filter filters out wavelengths below about 700 nm. The optical filter blocks shorter wavelengths of the visible spectrum and passes through wavelengths above about 700 nm, preferably wavelengths in the range between 900 nm and 980 nm. The filter improves the infrared performance of the imaging lens system 1200 by reducing interference from other light sources. Although filter F21 is shown as a single filter disposed between the fourth lens element and the image plane, filter F21 can be disposed in any other locations and can have one or more filter elements. Filter F21 can be similar to filter F11 described above.

As shown in FIG. 13A, R1 and R2 are the respective object side and image side surface of first lens element L21. R3 and R4 are the respective object side and image side surface of second lens element L22. Similarly, R5 and R6 are the respective object-side and image-side surface of third lens element L23. Likewise, R7 and R8 are the respective object-side and image-side surface of fourth lens element L24.

In one embodiment, lens elements L21, L22, L23, and L24 each pass near infrared light having a wavelength about 900 nm. In another embodiment, the material of the lens elements L21, L22, L23, and L24 has a high absorption for visible light and a high transmission for near infrared light longer than 900 nm, preferably at 940 nm.

Referring to FIG. 13A, T1 is the thickness of first lens element L21, T2 is the thickness of the second lens element L22, T3 is the thickness of the third lens element L23, and T4 is the thickness of the fourth lens element L24. Thicknesses T1-T4 are each measured along the optical axis. G12 is the air gap between the first and second lens elements. G23 is the air gap between the second and third lens elements, and G34 is the air gap between the third and fourth lens elements. Air gaps G12, G23, and G34 are each measured along the optical axis. BFL denotes the back focal length, which is the distance between the image side of the fourth lens element and the image plane along the optical axis. BFL includes the thickness of the optical filter if the filter is disposed between the fourth lens element and the image plane. MBFL denotes the distance between the highest protruding point M of the image side of the fourth lens element and the image plane along the optical axis. EFL denotes the effective focal length, which is also known as focal length.

In the following sections, ALT denotes the total thickness of the first to fourth lens elements, i.e., ALT=T1+T2+T3+T4. AAG denotes the total width of the air gaps of the first to fourth lens elements along the optical axis, i.e., AAG=G12+G23+G34. In an embodiment, AAG is 0.545 mm. The ratio of AAG/T3 is 0.971. The ratio of EFL/T4 satisfies the relation of 6.0≤EFL/T4. The ratio of G34/T3 satisfies the relation 0.01≤AC34/T3.

According to certain embodiments of the present invention, in order to reduce the total length of the optical lens system, the following measures can be taken: reducing the thickness of the lens elements and the air gaps between them. However, it is difficult to reduce the total thickness of the lens elements while maintaining adequate optical performance. Accordingly, the first lens element is designed to have a positive refractive power, the second lens element is designed to have a positive refractive power, the third lens element is designed to have a positive refractive power, and the fourth lens element is designed to have a negative refractive power. In one embodiment, the optical lens material has an absorption spectrum of visible light in the range from 400 nm to 700 nm, while having high transmission for wavelengths above 850 nm, preferably between 900 nm and 980 nm, and more preferably between 930 nm and 950 nm.

In one embodiment, all fourth lens elements L21, L22, L23, and L24 can be made of a material and coated with an antireflective material optimized for near-infrared radiation. In a preferred embodiment, the antireflective material has a transmission peak at about 940 nm.

Table 13A shows numeric lens data of the lens elements of optical lens system 1200 according to an embodiment of the present invention. All four lens elements are made of the same material to simplify the manufacturing process and reduce the manufacturing costs.

TABLE 13A

|  | Radius (mm) | Thickness/air gap (mm) | Refractive index | Abbe # | Focal length |
| --- | --- | --- | --- | --- | --- |
| Aper. stop | infinity | −0.071 |  |  |  |
| Lens 21 | 1.830 | T1 = 0.550 | 1.54 | 49.9 | 3.656 |
| R1 |  |  |  |  |  |
| R2 | 24.489 | G12 = 0.146 |  |  |  |
| Lens 22 | 6.577 | T2 = 0.300 | 1.63 | 23.3 | 25.663 |
| R3 |  |  |  |  |  |
| R4 | 11.131 | G23 = 0.319 |  |  |  |

TABLE 13A-continued

|  | Radius (mm) | Thickness/air gap (mm) | Refractive index | Abbe # | Focal length |
|---|---|---|---|---|---|
| Lens 23 R5 | −1.032 | T3 = 0.561 | 1.63 | 23.3 | 2.069 |
| R6 | −0.685 | G34 = 0.080 |  |  |  |
| Lens 24 R7 | 1.603 | T4 = 0.407 | 1.54 | 49.9 | −2.586 |
| R8 | 0.678 | G4F = 0.595 |  |  |  |
| filter | infinity | TF = 0.500 |  |  |  |
| Filter to image plane | infinity | GFP = 0.298 |  |  |  |
| Image plane | infinity |  |  |  |  |

In this embodiment, the effective focal length (EFL) is 2.51 mm, the half field of view (HFOV) is 39.5 degrees. The F number is 2.0. The BFL is 1.067 mm. The total length TTL from the object-side surface of the first lens element to the image plane is 3.756 mm.

Table 13B shows numeric values of the conic constant K and aspheric surface coefficients for each of the aspheric lens surfaces of the four lens elements.

TABLE 13B

| Surface # | K | a4 | a6 | a8 | a10 | a12 | a14 | a16 |
|---|---|---|---|---|---|---|---|---|
| R1 | 0.00E+00 | 0.00E+00 | 1.71E−01 | −1.22E+00 | −1.22E+00 | −4.01E+00 | 1.54E+00 | 0.00E+00 |
| R2 | 0.00E+00 | 0.00E+00 | −4.95E−01 | 7.46E−01 | 7.46E−01 | 0.00E+00 | 0.00E+00 | 0.00E+00 |
| R3 | 0.00E+00 | 0.00E+00 | −7.41E−01 | 3.04E−01 | 3.04E−01 | −6.52E−01 | 0.00E+00 | 0.00E+00 |
| R4 | 0.00E+00 | 0.00E+00 | −5.73E−01 | 7.11E−01 | 7.11E−01 | 2.20E−01 | −1.13E−01 | 0.00E+00 |
| R5 | 0.00E+00 | 0.00E+00 | −5.59E−02 | −3.58E−01 | −3.58E−01 | −1.57E+00 | 5.20E−01 | 0.00E+00 |
| R6 | −9.90E−01 | −9.90E−01 | −1.23E+00 | 2.18E+00 | 2.18E+00 | 1.88E+00 | −6.10E−01 | 0.00E+00 |
| R7 | 0.00E+00 | 0.00E+00 | 1.07E−02 | 1.21E−01 | 1.21E−01 | 4.75E−02 | −7.28E−03 | 0.00E+00 |
| R8 | −4.82E+00 | −4.82E+00 | 3.18E−02 | 3.54E−03 | 3.54E−03 | 3.97E−03 | −6.74E−04 | 4.07E−05 |

All order terms higher than the 16th order term are zeros.

Figures 13B, 13C:
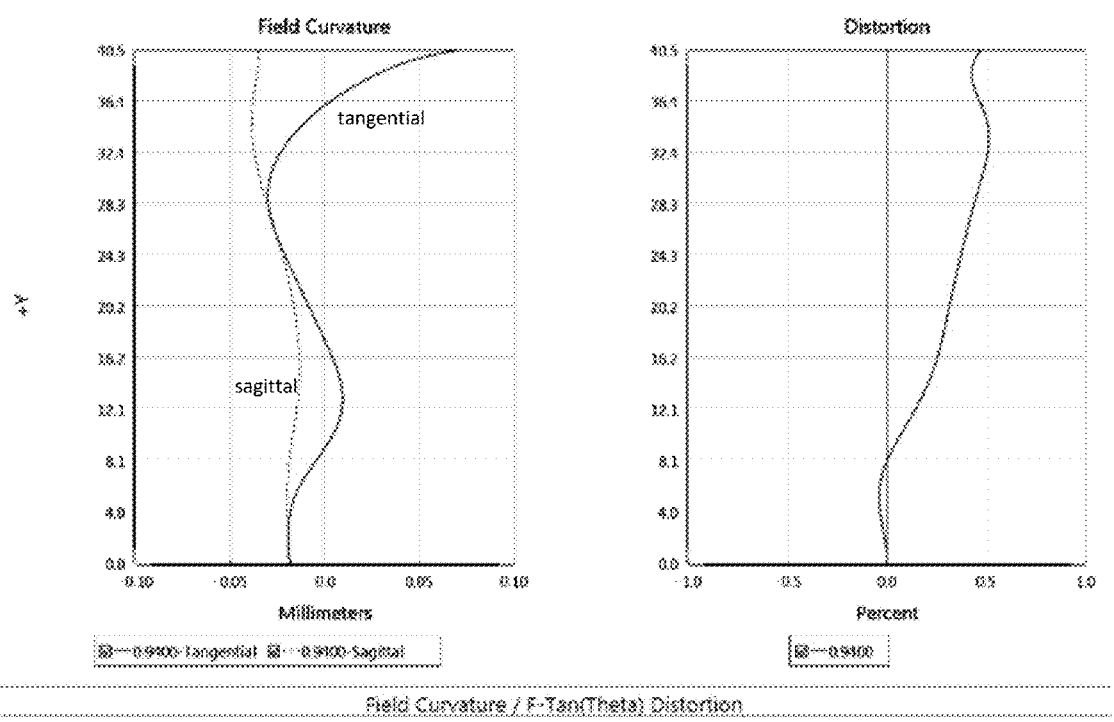
FIG. 13B is a set of graphs illustrating the astigmatism for the sagittal and tangential image surface in the embodiment of FIG. 13A.
FIG. 13C is the optical distortion of the embodiment of FIG. 13A.

FIG. 13B is a set of graphs illustrating the astigmatism for the sagittal and tangential image surface in the embodiment of FIG. 13A.

FIG. 13C is the optical distortion of the embodiment of FIG. 13A.

Fourteenth Embodiment

Figure 14:
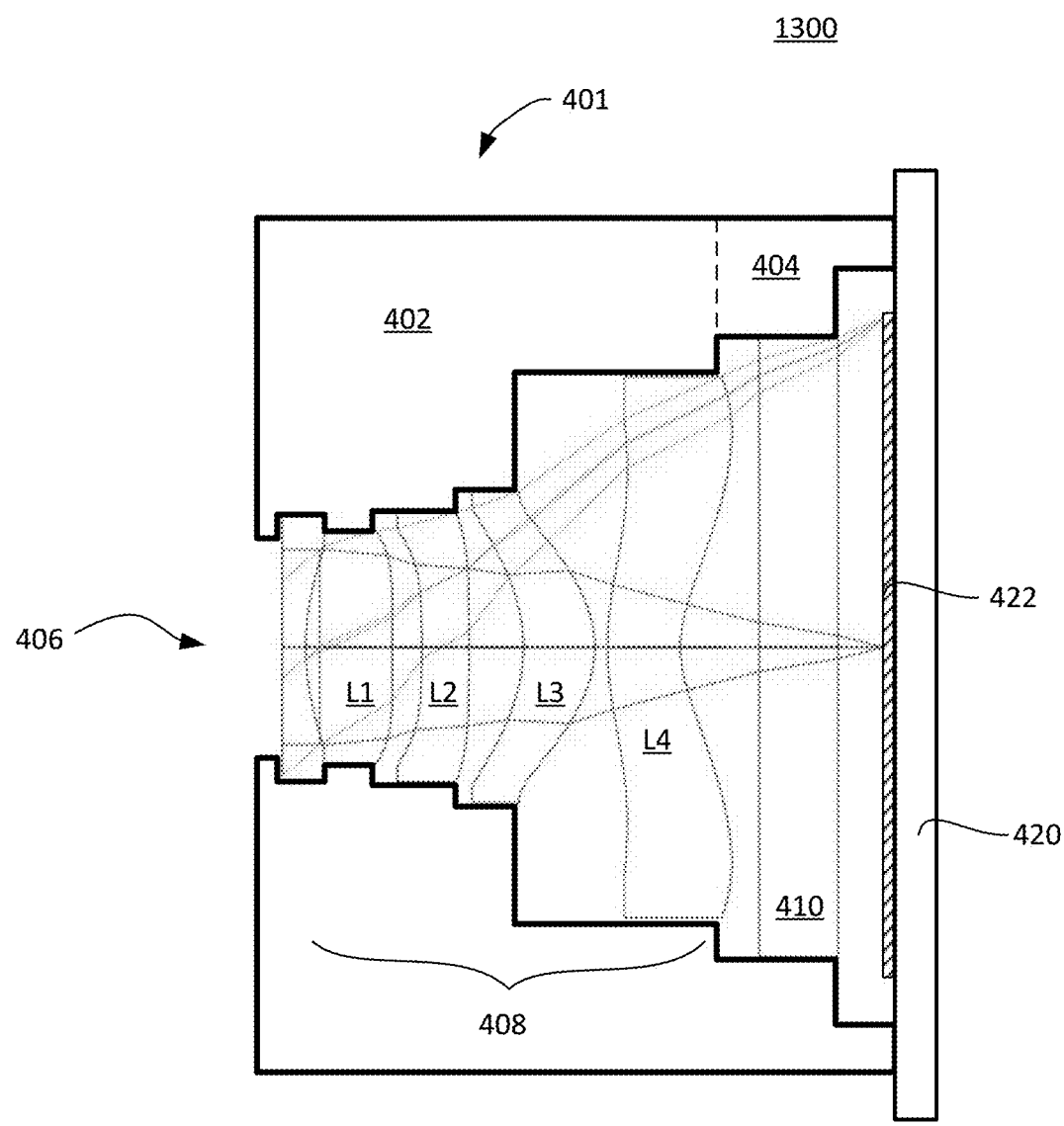
FIG. 14 is a simplified cross-section view of a four-element optical lens system according to an embodiment of the present invention.

FIG. 14 is a simplified cross-sectional view of a camera lens system 1300 according to an embodiment of the present invention. Camera lens system 1300 is shown as including a housing unit 401, in which a barrel 402 and a holder 404 are integrally formed (a broken line delineates barrel 402 and holder 404). Housing unit 401 has an opening 406 to let light enter a lens group 408. Lens group 408 is mounted within barrel 402, which is the front portion of housing unit 401. Lens group 408 may include four lens elements L1 through L4, which may be lens elements L11-L14 of FIG. 12A or lens elements L21-L24 of FIG. 13A. Housing unit 401 may also include a filter 410 mounted between lens element L4 and an image sensor 422 along the optical axis. Camera lens system 400 also includes a substrate 420 on which image sensor 422 mounted on substrate 420. Housing unit 401 is attached to substrate 420 during manufacture. In an embodiment, housing unit 401 can be coupled to substrate 420 with an adhesive. Lens barrel 402 and holder 404 can be integrally formed as housing unit 401 along the optical axis.

Fifteenth Embodiment

Figure 15:
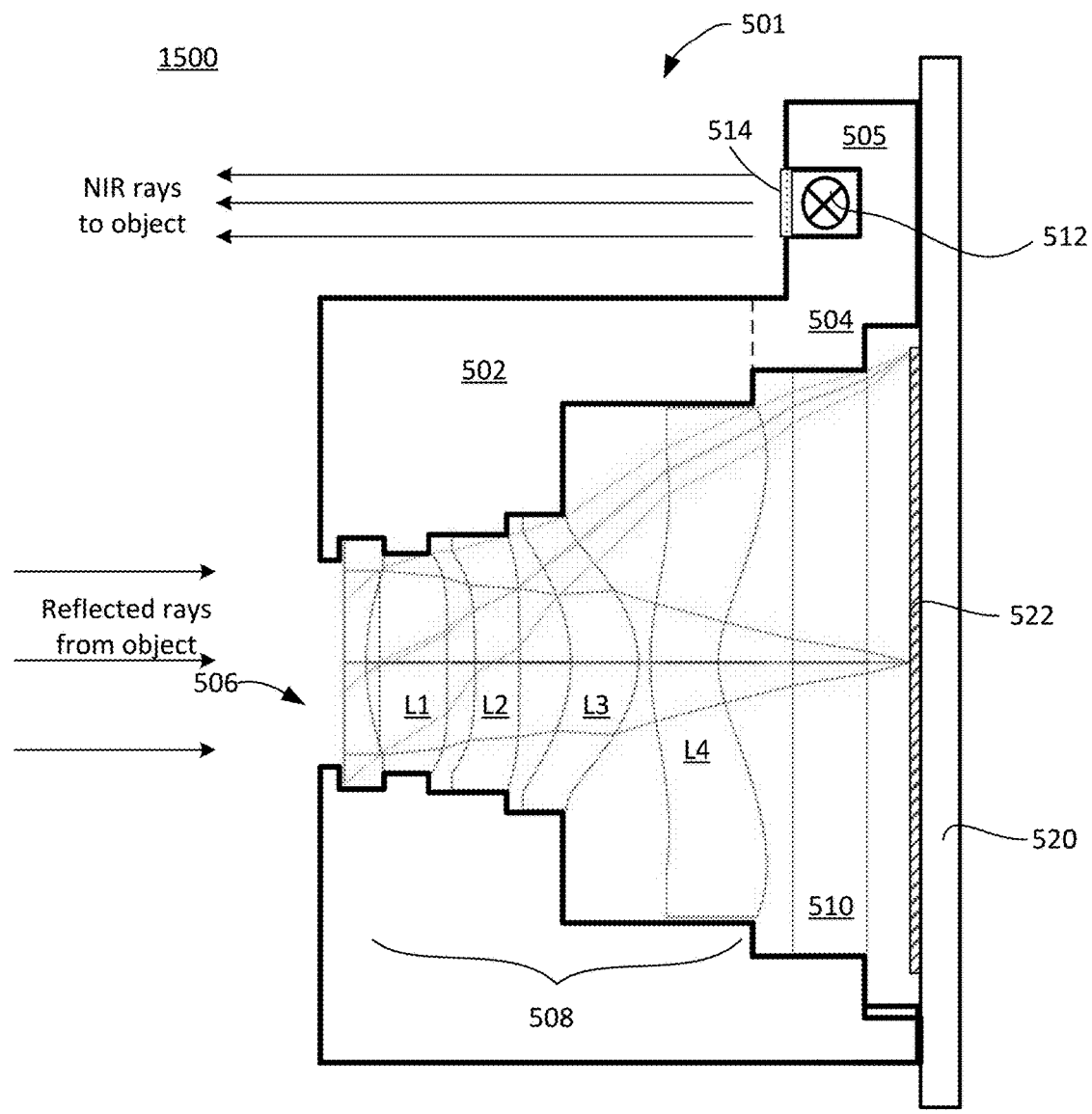
FIG. 15 is a simplified cross-section view of a four-element optical lens system according to an embodiment of the present invention.

FIG. 15 is a simplified cross-sectional view of a camera lens system 1400 according to an embodiment of the present invention. Camera lens system 1400 is shown as including a housing unit 501, which contains an integrally formed barrel 502 and holder 504. Housing unit 501 may include a concave portion 505 for accommodating a light source 512. Housing unit 501 may also include a protection cover 514 disposed in front of concave portion 505 to protect light source 512. In an embodiment, concave portion 505 may be integrally formed with holder 504 so that barrel 502, holder 504 and concave portion 505 are integrally formed. Although concave portion 505 is shown to be positioned above lens group 08, it is to be understood that concave portion 505 can be positioned at any location in relation to the lens group, such as to the right, to the left, to the bottom, and any other locations. In an embodiment, light source 512 can be an infrared light or a near-infrared light to take a clear picture of an object even in the night. Protection cover may be a diffusion lens to diffuse light emitting from light source 512. Since diffused light is near infrared (NIR) rays, it is not visible to people when an object is illuminated by light source 512. Barrel 502, holder 504 and concave portion 505 are formed with an opaque material to prevent illuminating light from radiating lens group 508 from the side. Housing unit 501 has an opening 506 to let light enter a lens group 508. Lens group 508 is mounted within barrel 502, which is the front portion of housing unit 501. Lens group 508 may include lens elements L11-L14 of FIG. 2A or lens elements L21-L24 of FIG. 3A. Housing unit 501 may also include a filter 510 mounted along the optical axis to absorb visible light in wavelengths between 400 nm and 700 nm and pass though wavelengths in the range between 900 nm and 980 nm. Camera lens system 500 also includes a substrate 520 and an image sensor 522 mounted on substrate 520.

In other embodiment, light source 512 may be a lens system having a light source structure of a projector or a LED structure having a predetermined light-projecting angle, that is not a part of housing unit 501. In other words, light source 512 can be an independent illuminating structure that is separated from housing unit 501 and lens group 508. In some specific embodiments, light source 512 can be an illuminating structure that is not even part of optical lens system 500. In an exemplary embodiment, light source 512 can be directional infrared light or near-infrared light that illuminates an object to enhance visibility of buried structure beneath the surface of the illuminated object.

In some specific embodiments, an object whose image is to be captured is illuminated by a specific light source. The surface of the object is scanned to produce 3-dimensional (3D) image information including depth, location and other information. According to the present invention, the surface of the object can be scanned under a first scanning angle with regard to the near-infrared (NIR) rays to obtain a first 3D image information A, then the object is rotated and the surface of the object is scanned anew under a second scanning angle with regard to the NIR rays to obtain a second 3D image information B. The object can be further rotated and its surface is scanned under a third angle, a fourth angle, and so forth with regard to the NIR rays to obtain respective 3D image information C, D, and so forth. The obtained 3D image information can be used to construct a 3D image of the object to be scanned. The above NIR rays can be other light forms, such as laser, or specially processed light rays. It shall be appreciated that the use of near infrared radiations is advantageous over other light radiations because infrared radiations are invisible to human eyes. Although ultraviolet (UV) light is also invisible to human eye, UV light can cause harm and damage to human eyes and to the structure of the radiated or illuminated object. Furthermore, the wavelengths of near infrared light are longer than those of UV light and visible light, the near infrared light is less prone to scatter in and absorption by plant or animal tissue.

In an embodiment, a method of forming an image includes illuminating an object to be scanned using a light source, capturing light reflected by the object, collecting information data from the captured light, and forming an image in response to the collected information data.

In some embodiments, the first and third lens elements may be made of the same first material while the second and the fourth lens elements may be made of the same second material. The half field of view (HFOV) is between 36 degrees and 45 degrees, preferably between 39 degrees and 41 degrees. The obtained optical distortion is less than ±5%, preferably less than ±0.5%. The total length from the object-side surface of the first lens element to the image plane is less than 4.5 mm. The RI (relative illumination) is 40% or more, preferably between 40%~60%. The first and fourth lens elements have an abbe number about 49.9, and the second and the third lens elements have an abbe number of about 23.3. The combination of lens elements provides good image quality in infrared wavelengths. By having appropriate thicknesses of the lens elements, the air gaps between them, and a simple housing design, the present invention provides an easy and efficient production with good yield.

Figure 16A:
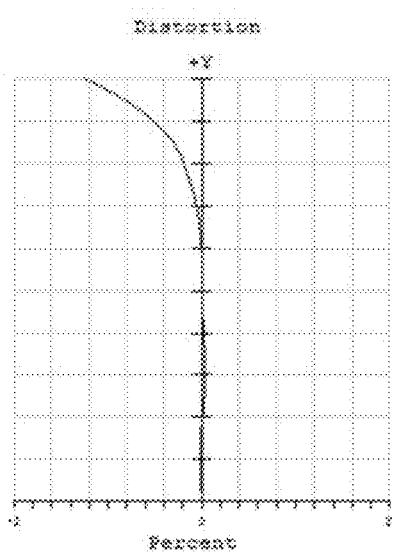
FIG. 16A is a graph illustrating the distortion and FIG. 16B is a simplified diagram of an example raster TV distortion.
Figure 16B:
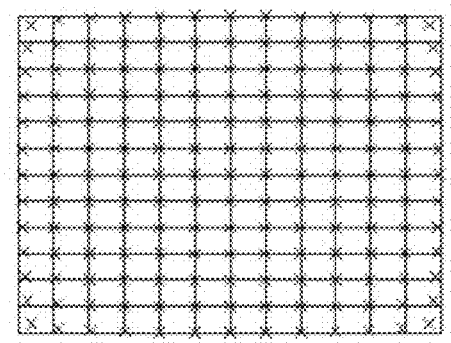

Furthermore, images obtained by the optical image system according to embodiments of the present invention not only have low optical distortion of less than ±0.5%, but also low TV distortion of less than −5%. FIG. 16A is a graph illustrating the TV distortion and FIG. 16B is a simplified diagram of an example raster TV distortion.

While the invention has been described with reference to illustrative embodiments, this description is not intended to be construed in a limiting sense. For example, in some embodiments, the aperture stop is disposed in front of the first lens element to improve the lens system performance. In other embodiments, the aperture strop is disposed between the first and second lens elements as in the telecentric lens, as shown in FIG. 4. The optical lens system has only either three or four lens elements that have a refractive power. All lens elements are made of the same material having absorption in visible light, i.e., in wavelengths between 400 nm and 700 nm. All lens elements in the same lens system are made of the same material having a high transmission for near infrared radiation. In certain embodiments, the object-side and image-side surfaces of the lens elements are coated with an antireflective coating that is optimized for near infrared light, i.e., in wavelengths above 800 nm.

It will be appreciated that, although an optical filter is shown in embodiments described above, the optical filter may be omitted if desired.

The present invention is not limited to the above-described embodiments. The invention is intended to cover all modifications and equivalents within the scope of the appended claims.

What is claimed is:

1. An optical imaging lens system comprising, in order from an object side to an image side, a first lens element, a second lens element, a third lens element, and a fourth lens element arranged along an optical axis, each of the first, second, third, and fourth lens elements having an object-side surface facing toward the object side and an image-side surface facing toward the image side, wherein:

the second lens element has a positive refractive power, the object-side surface of the second lens element comprises a convex portion in a vicinity of the optical axis, and the image-side surface of the second lens element comprises a concave portion in a vicinity of the optical axis;

the object side of the third lens element comprises a concave portion in a vicinity of an outer circumference of the third lens element;

the object side of the fourth lens element comprises a concave portion in a vicinity of an outer circumference of the fourth lens element wherein:

a thickness of the first lens element is defined as T1 and a distance measured from the object side surface of the first lens element to the image plane along the optical axis is defined as TTL, and T1 and TTL satisfy the relation:

$$3.85 \leq TTL/T1 \leq 7.00.$$

2. The optical imaging lens system of claim 1 wherein a thickness of the second lens element at the optical axis is defined as T2, a thickness of the fourth lens element at the optical axis is defined as T4, and an air gap between the first lens element and the second lens elements measured at the optical axis is defined as G12, and T1, T2, and T4 satisfy the relation:

$$7.75 \leq (T1+T2+T4)/G12 \leq 63.25.$$

3. The optical imaging lens system of claim 2 wherein the image-side surface of the third lens element comprises a concave portion in a vicinity of the optical axis.

4. The optical imaging lens system of claim 1 wherein a thickness of the second lens element at the optical axis is defined as T2, an air gap between the first lens element and the second lens elements measured at the optical axis is defined as G12, and T1, T2, and G12 satisfy the relation:

$$5.24 \leq (T1+T2)/G12 \leq 35.75.$$

5. The optical imaging lens system of claim 4 wherein the image-side surface of the fourth lens element comprises a convex portion in a vicinity of the optical axis.

6. The optical imaging lens system of claim 1 wherein a thickness of the fourth lens element at the optical axis is defined as T4, an air gap between the first lens element and the second lens elements measured at the optical axis is defined as G12, and T1, T4, and G12 satisfy the relation:

$$5.90 \leq (T1+T4)/G12 \leq 46.75.$$

7. The optical imaging lens system of claim 6 further comprising an aperture stop disposed between the first lens element and the second lens element.

8. The optical imaging lens system of claim 1 wherein a thickness of the second lens element at the optical axis is defined as T2, a thickness of the fourth lens element at the optical axis is defined as T4, an air gap between the first lens element and the second lens elements measured at the optical axis is defined as G12, and T2, T4, and G12 satisfy the relation:

$$4.36 \leq (T2+T4)/G12 \leq 44.00.$$

9. The optical imaging lens system of claim 1 wherein a thickness of the fourth lens element at the optical axis is defined as T4, an air gap between the first lens element and the second lens elements measured at the optical axis is defined as G12, and T4 and G12 satisfy the relation:

$$2.51 \leq T4/G12 \leq 27.50.$$

10. The optical imaging lens system of claim 1 wherein an air gap between the first lens element and the second lens elements measured at the optical axis is defined as G12, and T1 and G12 satisfy the relation:

$$3.39 \leq T1/G12 \leq 19.25.$$

11. The optical imaging lens system of claim 1 wherein an absolute value of a difference between an Abbe number V1 for the first lens and an Abbe number V2 of the second lens is defined as |V1−V2|, and |V1−V2| satisfies the relation:

$$0 \leq |V1-V2| \leq 20.00.$$

12. The optical imaging lens system of claim 1 wherein an absolute value of a difference between an Abbe number V1 for the first lens and an Abbe number V4 of the fourth lens is defined as |V1−V4|, and |V1−V4| satisfies the relation:

$$|V1-V4|=0.$$

* * * * *